United States Patent
Elkabetz et al.

(10) Patent No.: US 11,988,805 B2
(45) Date of Patent: May 21, 2024

(54) REAL-TIME DATA PIPELINE TECHNIQUES FOR IMPROVING A FAST WEATHER FORECASTING SYSTEM

(71) Applicant: The Tomorrow Companies Inc., Boston, MA (US)

(72) Inventors: Shimon Elkabetz, Boston, MA (US); Jacob Ribnik, New York, NY (US); Itai Zlotnik, Cambridge, MA (US); Rei Goffer, Boston, MA (US); Nir Nossenson, Winchester, MA (US); Daniel Alexander Rothenberg, Salem, MA (US); Karl Ginter, Beltsville, MD (US)

(73) Assignee: The Tomorrow Companies Inc., Boston, MA (US)

( * ) Notice: Subject to any disclaimer, the term of this patent is extended or adjusted under 35 U.S.C. 154(b) by 0 days.

(21) Appl. No.: 17/681,338

(22) Filed: Feb. 25, 2022

(65) Prior Publication Data

US 2022/0187499 A1 Jun. 16, 2022

Related U.S. Application Data

(62) Division of application No. 16/181,148, filed on Nov. 5, 2018, now Pat. No. 11,294,096.

(Continued)

(51) Int. Cl.
*G01W 1/10* (2006.01)
*G01W 1/00* (2006.01)
(Continued)

(52) U.S. Cl.
CPC ............. *G01W 1/10* (2013.01); *G01W 1/02* (2013.01); *G08G 5/0065* (2013.01);
(Continued)

(58) Field of Classification Search
CPC ... G01W 1/10; G01W 1/02; G01W 2001/003; G01W 2001/006; G01W 2203/00;
(Continued)

(56) References Cited

U.S. PATENT DOCUMENTS 8,135,413 B2 * 3/2012 Dupray .................. H04W 4/02
455/456.1
8,994,591 B2 3/2015 Dupray
(Continued)

FOREIGN PATENT DOCUMENTS

CN 104656163 A * 5/2015 ............. G01W 1/00
CN 106324709 A 1/2017
KR 10-2013-0055788 A 5/2013

OTHER PUBLICATIONS

Extended European Search Report for corresponding EP17816311.9, issued Jan. 21, 2020.
(Continued)

*Primary Examiner* — Daniel R Miller
*Assistant Examiner* — Christian T Bryant
(74) *Attorney, Agent, or Firm* — Nixon & Vanderhye P.C.

(57) ABSTRACT

The system as described collects and utilizes weather data sensor information in order to rapidly collect and update weather forecasts using real-time weather data collected at high rates of frequency, and use this collected high frequency weather data to rapidly correct and update the weather forecasts generated by the system.

21 Claims, 13 Drawing Sheets

Related U.S. Application Data

(60) Provisional application No. 62/609,096, filed on Dec. 21, 2017, provisional application No. 62/581,531, filed on Nov. 3, 2017.

(51) Int. Cl.

| | | |
|---|---|---|
| *G01W 1/02* | (2006.01) | |
| *G06N 5/00* | (2023.01) | |
| *G06N 20/00* | (2019.01) | |
| *G08G 5/00* | (2006.01) | |
| *G08G 5/02* | (2006.01) | |
| *H04W 84/00* | (2009.01) | |

(52) U.S. Cl.
CPC ........... *G08G 5/0091* (2013.01); *G08G 5/025* (2013.01); *G01W 1/00* (2013.01); *G01W 2001/003* (2013.01); *G01W 2001/006* (2013.01); *G01W 2201/00* (2013.01); *G01W 2203/00* (2013.01); *G06N 5/00* (2013.01); *G06N 20/00* (2019.01); *H04W 84/005* (2013.01); *Y02A 90/10* (2018.01)

(58) Field of Classification Search
CPC .. G01W 2201/00; G01W 1/00; G08G 5/0065; G08G 5/0091; G08G 5/025; Y02A 90/10; G06N 20/00; G06N 5/00; H04W 84/005
See application file for complete search history.

(56) References Cited

U.S. PATENT DOCUMENTS

| | | |
|---|---|---|
| 9,734,220 B2 | 8/2017 | Karpištšenko |
| 2005/0197070 A1 | 9/2005 | Kaikuranta et al. |
| 2009/0160700 A1 | 6/2009 | Messer-Yaron et al. |
| 2011/0040483 A1 | 2/2011 | Marshall et al. |
| 2013/0115972 A1 | 5/2013 | Ziskind et al. |
| 2013/0234884 A1 | 9/2013 | Bunch et al. |
| 2013/0325425 A1* | 12/2013 | Rikoski ................... G01W 1/00 703/6 |
| 2014/0046598 A1* | 2/2014 | Mine ....................... G01W 1/10 702/3 |
| 2014/0108893 A1 | 4/2014 | Song |
| 2016/0178803 A1 | 6/2016 | Haas et al. |
| 2019/0293572 A1 | 9/2019 | David et al. |

OTHER PUBLICATIONS

Extended European Search Report issued in European Application No. 18893019.2 dated Sep. 7, 2021 (10 pages).
Giuli et al., "Tomographic Reconstruction of Rainfall Fields through Microwave Attenuation Measurements", American Meteorological Society, Sep. 1, 1991, pp. 1323-1340, XP055557991 (18 pages).
International Preliminary Report on Patentability for corresponding PCT/US2018/067203, issued Jun. 23, 2020.
International Search Report and Written Opinion of the International Searching Authority mailed May 1, 2019, issued in related International Application No. PCT/US18/67203, 13 pages.
Messer et al., "Environmental Sensor Networks Using Existing Wireless Communication Systems for Rainfall and Wind Velocity Measurements", IEEE Instrumentation & Measurement Magazine, Apr. 2012 (Year: 2012).
Related U.S. Appl. No. 16/102,659, filed Aug. 13, 2018.
Related U.S. Appl. No. 16/181,137, filed Nov. 5, 2018.

\* cited by examiner

REAL-TIME DATA PIPELINE TECHNIQUES FOR IMPROVING A FAST WEATHER FORECASTING SYSTEM

1 CROSS REFERENCE TO RELATED U.S. PATENTS & PATENT APPLICATIONS

The present application is related to U.S. Pat. No. 10,078,155 issued Sep. 18, 2018, which is incorporated herein by reference in its entirety and for all purposes.

The present application is a divisional of U.S. patent application Ser. No. 16/181,148 filed 11-05-2018, now U.S. Pat. No. 11,294,096; which claims benefit of U.S. Provisional Patent Application No. 62/581,531 filed Nov. 3, 2017, and U.S. Provisional Patent Application No. 62/609,096 filed Dec. 21, 2017, all of which are incorporated herein by reference in their entirety and for all purposes.

U.S. patent application Ser. No. 16/181,148 filed Nov. 5, 2018 was co-filed with IMPROVED REAL-TIME WEATHER FORECASTING FOR TRANSPORTATION SYSTEMS, U.S. patent application Ser. No. 16/181,137 filed Nov. 5, 2018, which issued as U.S. Pat. No. 10,962,680 (hereinafter "the co-filed application"), from which Ser. No. 16/669,479 filed on Oct. 30, 2019 and Ser. No. 17/176,886 filed on Feb. 16, 2021 each claim priority. Each of these is incorporated herein by reference in its entirety and for all purposes. This co-filed application and patents issuing therefrom is/are referred to below as "the co-filed application."

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2017-2018, ClimaCell, Inc.

3 BACKGROUND

3.1 Field

The exemplary, illustrative, technology herein relates to systems, software, and methods for the sensing and determination of current weather phenomena and the generation of accurate weather and precipitation forecasts, including analysis and prediction of weather based on real-time, high frequency weather sensor reading, radio frequency link or network attenuation such as terrestrial and satellite VHF/UHF/microwave transmission link data, and weather events, using automated means of collecting and pipeline processing of the information in accordance with the descriptions provided herein. The technology herein has applications in the areas of signal processing, parallel processing techniques, satellite network operations, and precipitation forecasting.

3.2 Related Art

Radio signal propagation, and in particular, radio signal attenuation, has been associated with weather phenomena for many years. In past decades, attempts have been made to correlate weather and signal attenuation and, more recently, to predict future weather based upon this information.

Fog events can have notable negative impacts on industry and safety, for example by impairing visibility at airports, thereby making takeoffs and landings difficult or impossible and causing flight cancellations and delays. Fog events impair visibility on surface roadways, causing surface transportation delays and contributing to motor vehicle accidents. Fog also negatively impacts water-borne shipping and transport. Given the significant impact that fog can have, the known art has attempted to both detect and predict fog events and to quantify potential impacts of fog on visibility, for example fog impacts on runway visible range (RVR) at airport locations. Methods in the known at typically detect fog events by direct observation, relying on dedicated fog detection or visibility measurement instruments or on reports from human observers. These known methods are capable of detecting fog where observers and dedicated instruments are located but fail to detect or predict fog beyond an effective instrument or observer range.

The known art has recognized that fog can affect radio frequency (RF) attenuation and models and algorithms have been developed for inferring the presence of fog and estimating liquid water content (LWC) of fog based on measured RF attenuation. However, levels of RF attenuation caused by fog could also be caused by atmospheric phenomena other than fog. Therefore, models and algorithms of the known art can fail to distinguish RF attenuation due to fog from attenuation due to rain, a high local atmospheric water density in the absence of fog, or a combination of fog and another atmospheric hydrometer such as a light rain. Known fog detection systems are limited in their ability to accurately detect fog, and to determine fog-dependent changes in visibility, at locations outside the range of direct observation.

Previous weather forecasting systems based upon RF attenuation are known, but do not support the processing of RF attenuation from satellite-based microwave links. In particular, the use of satellite microwave links for both geostationary and low earth orbit satellites is not well understood. The current computational load for calculating the orbital mechanics, the earth station—satellite microwave link paths, and the calculations required to reduce this information into usable weather data are not feasible for short term forecasting needs.

Weather information systems that use terrestrial microwave are known in the art, as are specific satellite uplink/downlink processing techniques. The current systems do not integrate terrestrial microwave with satellite link microwave in order to gain forecasting accuracy from the increased coverage, nor do they use pipelining techniques to optimize the complex calculations inherent in processing these types of signals. As such, the geographic coverage of terrestrial microwave links and satellite link weather prediction systems is limited.

Models and algorithms have been developed for inferring and forecasting fog and for estimating liquid water content (LWC) of tog based on microwave link attenuation measurements. These models and algorithms previously have been incapable of determining whether particular attenuation measurements are caused by fog or by some other type of hydrometer or atmospheric interference. Fog predictive models using machine learning and other predictive modeling techniques have been used to predict fog by ingesting weather parameter measurements or estimates into fog predictive models that have been trained with historic weather data. Fog predictive models have not previously been combined with or incorporated into dynamic, real time, fog inference and LWC estimation based on microwave link attenuation measurements.

Known weather information systems are also limited in their ability to process and integrate high sampling frequency data, such as information collected from onboard sensors of millions of vehicles at collection intervals measured in seconds or minutes. Typically, the temporal accuracy of existing weather system supporting the transportation industry is approximately 20 minutes, causing low fidelity forecasts that do not take into account more accurate data collected from vehicles and other high frequency data sources. Also, current forecasting systems are unable to keep up with the large data rates that can be collected from these high frequency data sources, causing the forecasting systems to slow down either during data collection as large number of input data points are collected and processes, or during the forecast calculation when millions of real time data points are being applied to the forecast models.

Rapidly changing weather phenomena, including fog and squall lines, disproportionally effect transportation systems due to the transportation systems reliance upon known weather in operational planning. The situation is particularly acute in aviation, where aircraft are moving at hundreds of miles per hour for a destination that may or may not be accessible due to weather conditions at the destination. Weather forecasts that lag real time or are not rapidly updated when the weather rapidly changes further this disruption. Taken together, these challenges mean that existing systems fail from an information handling perspective in their ability to support real-time prediction of precipitation amounts.

Taken together, these challenges mean that existing systems fail from an information handling perspective in their ability to provide comprehensive real-time prediction of precipitation amounts for classes of microwave link networks and making that information available in real time for use in weather forecasting. Prior an approaches collectively demonstrate notable deficiencies when applied to current and planned microwave-based network topologies or inputs that use high frequency weather data sensor readings. They are limited with respect to the data sources used, as these data sources have built in inaccuracies due to limits in the underlying models, and are based upon unchanging configurations of networks and data sources. Accordingly, they are non-generalizable and are insufficient to support real-time analysis and prediction of weather-related phenomena. New methods of collecting and processing information are needed in order to produce the desired real-time analysis and prediction capabilities.

4 SUMMARY

The technology herein provides such advances and improvements. In one aspect, the example non-limiting technology features computerized methods of and apparatus for weather modeling.

5 BRIEF DESCRIPTION OF THE DRAWINGS

The features of the present technology will best be understood from a detailed description of the technology and example embodiments thereof selected for the purposes of illustration and shown in the accompanying drawings in which.

Figure 13A:
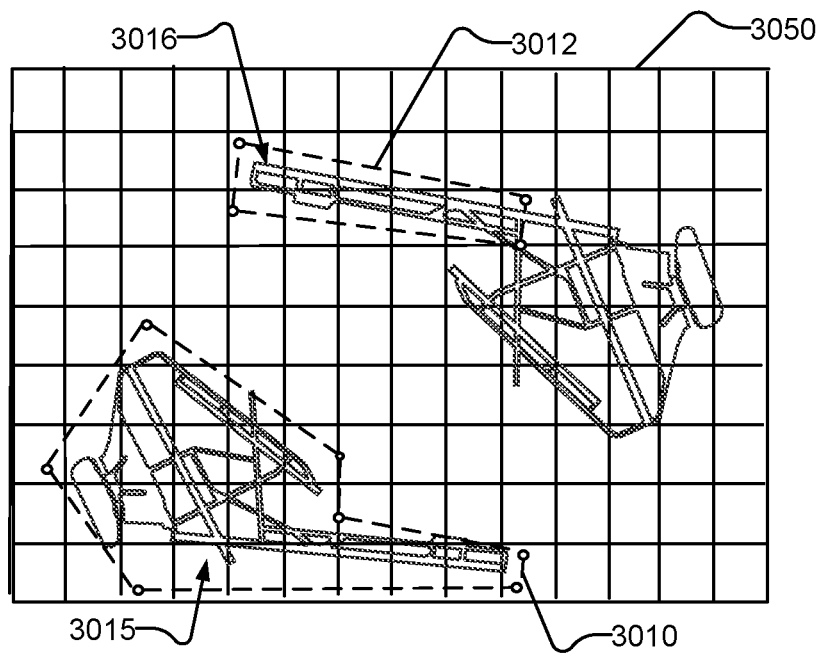
Figure 13B:
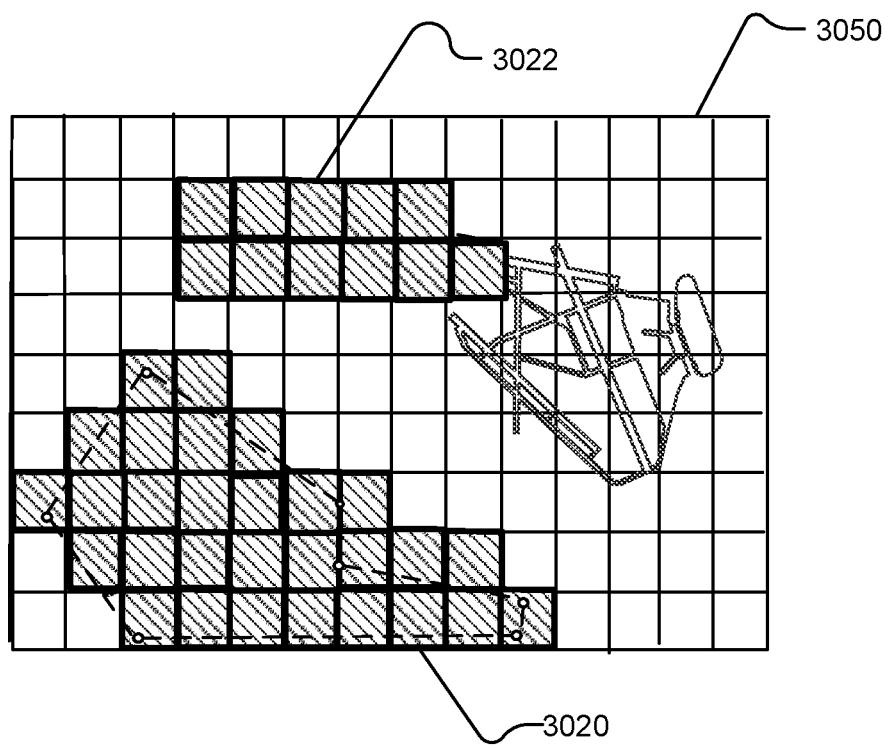

FIGS. 13A-B depict illustrative mapping of runways/airports to tiles, according to an illustrative embodiment.

6 DESCRIPTION OF SOME EMBODIMENTS

6.1 Overview

The systems and methods described herein provide a mechanism for collecting information from a diverse suite of sensors and systems, calculating the current precipitation, atmospheric liquid water content, or precipitable water and other atmospheric-based phenomena such as fog based upon these sensor readings, and predicting future precipitation and atmospheric based phenomena. The described system and methods provide improved data collection and augmentation, dynamically updated data sets, significant accuracy improvements, and real-time projections.

"Real time" meteorology equipment, such as weather sensors, provides precipitation maps showing precipitation intensities and locations on a short time interval, e.g., less than a fifteen minute interval, or optionally less than a five minute interval, or optionally a one minute interval or thereabouts.

Diverse meteorological phenomena have diverse temporal evolution (e.g., humidity changes much more slowly than does precipitation intensity). Accordingly the definition of "real time" or "most current data" may depend on the meteorological phenomena being measured and reported.

The system described herein supports a dynamically defined network of microwave links, including continually changing microwave link presence, link length, and microwave signal frequency characteristics, with high temporal resolution of microwave link signal attenuation measurements, from a plurality of information sources that asynchronously provide updated microwave signal attenuation measurements and other information to the system. The microwave links supported include terrestrial microwave links (including point-to-point and mobile links), satellite microwave links (for geostationary and LEO satellites), or a combination of these types of microwave links. These microwave link networks are characterized by computational complexity and the large amount of data that they produce.

The system further supports the collection and use within forecasts of high frequency weather sensor data from a plurality of types of weather sensors, such as fixed roadway sensors, and mobile sensors, such as aircraft, drone, vehicle-mounted sensors and mobile or handheld sensing devices. High frequency data sources produce large amount of data because of their high reporting frequency.

The system implements a parallel processing pipeline that provides pre-processing of microwave link attributes which support an order of magnitude reduction in the system compute requirements. The pre-processing steps include creating transforms and filters to automate and reduce the computational complexity for the processing steps to convert microwave link collected data into weather data such as precipitation, atmospheric liquid water content, and fog estimates, transforms and lookup tables that permit static network attenuation analysis to be performed upon dynamically changing network topologies, and ongoing accuracy improvement analysis that permits the system to make effective tile layer blending selections that integrate one or more types of weather data in order to improve the accuracy of resulting forecast generated data by between 30 and 70%.

Pre-computed transforms provide an efficient way to capture and optimize the required computing steps that are performed repeatedly as a single computation, significantly reducing the amount of computation required. For example, by precomputing an attenuation transform for a satellite microwave link network, we are able to calculate the effect of a specific link attenuation value at a number of different map points through which the microwave link travels between a base station or other earth station and the satellite. By combining the complex set of calculations into a single transform, the received attenuation data for a link may be passed through the transform once and precipitation, atmospheric water vapor, and fog-related values for each affected map coordinate obtained from the single calculation. In a similar manner, we are able to pre-compute an attenuation transform through which received attenuation data from a plurality of microwave links, including in some implementations both satellite and terrestrial microwave links, may be passed to obtain, from a single calculation, precipitation, atmospheric liquid water content, and other attenuation-based weather parameter data values, including values based on multiple attenuation measurements at affected map coordinates where microwave links overlap. This type of processing, when combined with the processing architectures described herein, enables the near real-time calculation of weather parameter data and forecast weather data.

The system supports the creation of static and dynamic pre-computed filters, which eliminate from consideration erroneous or duplicative data from collected data sets. As the computational requirements increase as the number of collected data points increases, these filters provide a mechanism that substantially reduces the computational workload of the system. The system further supports the collection, pipelined processing, and use within forecasts of high, frequency weather sensor data from a plurality of types of weather sensors, such as fixed roadway sensors, and mobile sensors, such as aircraft, drone, vehicle-mounted sensors and mobile or handheld sensing devices.

The system also supports the ongoing asynchronous collection of input data, so forecast modeling cadence is separated from the collection cycles, which permits the asynchronous updates of forecasts with different types and sources of data. The system further implements a massively parallel collection processing and independent cadence-based forecasting component in order to produce a precipitation (and related weather phenomena) forecast model in near real time for the system users, and to update the forecasting models in real time or near real time with the most recent observation data, thereby improving the ongoing forecasts.

These and other aspects and advantages will become apparent when the Description below is read in conjunction with the accompanying Drawings:

6.2 DEFINITIONS

The following definitions are used throughout, unless specifically indicated otherwise:

| TERM | DEFINITION |
|---|---|
| Microwave Link | A microwave link is a wireless signal connection between two separate antennas, typically either satellite earth station to satellite, point-to-point, static, or dynamic, operating in the microwave or millimeter frequency range. |
| Microwave link, satellite | A microwave link between a satellite in orbit and an earth station, either uplink, downlink, or bi-directional. |
| Microwave link infrastructure data | Microwave link infrastructure data refers to information that identifies and characterizes terrestrial and satellite link endpoints and the microwave links between endpoints. Microwave link infrastructure data includes terrestrial microwave network topology, terrestrial microwave tower and signal characteristics, satellite microwave link location and characteristics data, and satellite microwave link ephemeris data. |
| Microwave link, satellite, static | A microwave link between a satellite in orbit and an earth station (uplink, downlink, or bi-directional), characterized by |

-continued

| TERM | DEFINITION |
| --- | --- |
| | the static nature of the spatial relationship between the satellite and the earth station. These types of links are typically found between earth stations and geosynchronous satellites. |
| Microwave link, satellite, dynamic | A microwave link between a satellite in orbit and an earth station (uplink, downlink, or bi-directional), characterized by the changing nature of the spatial relationship between the satellite and the earth station (e.g. at least one endpoint moving in relation to the other). These types of links are typically found between mobile earth stations and/or low earth orbit (LEO) satellites. |
| Ground level satellite microwave link | Projection of a satellite microwave link or a segment of a satellite microwave link onto ground level, for example onto a ground level static microwave link grid. In some embodiments, a ground level satellite microwave link is a projection, to ground level, of one or more segments of a pro forma satellite microwave link, for example segment of link passing through a lowest strata of the atmosphere, e.g. thourh the lowest 500 m of the atmosphere. |
| Microwave link, point-to-point | A microwave link between two microwave transceivers, with fixed link attributes. |
| Microwave link, static | A microwave link characterized by both endpoints having relatively static locations. |
| Microwave link, dynamic | A microwave link characterized by at least one endpoint location moving regularly. |
| Microwave | Radio signals in the 1.8 GHz to 60 GHz frequency range. |
| Millimeter wave | Radio signals used for communication above the 60 GHz frequency range. |
| Location of interest | One or more geo-located points or polygons for which a user desires forecast generated data. |
| High frequency | Relating to a system in which input data is collected and processed rapidly, typically at intervals of 1, 5, 10, 30, or 60 seconds. For some types of input data, the collection interval is less than 1, 2, 3, or 5 minutes. |
| Real-time | Relating to a system in which input data is processed and made available as it is received, typically within seconds, so that it is available virtually immediately for further use or computation. |
| Data source | Sources of collected data including various satellite (340a) and terrestrial (340b) data sources, Numerical Weather Prediction (NWP) model data sources (341), RVR ancillary data sources (343), weather radar data sources (344), weather sensor data sources (346) including sources of data from stationary and vehicle-mounted weather sensors, map data sources (348), and other info data sources (347) (i.e., any sources of data that do not fall into any of the other data categories) |
| Vehicle weather sensor data | Collected data from weather sensor data sources that provide data collected from weather sensors on manned or unmanned vehicles, including ground vehicles, ocean or fresh water vehicles (boats), and air vehicles (airplanes, UAV, balloons). Includes data collected by mobile weather data sensors (their location can change each time a reading is taken). The weather sensor data that is collected can include weather parameter data such as measured values of outside temperature, moisture, and humidity, or may include data from which generated collected data is derived such as attenuation of vehicle-mounted radar devices. |
| Collected data | Includes weather parameter data and information related to the weather parameter data collected from one or more data sources. Collected weather parameter data includes, for example, weather parameter data values reported by a weather sensor data source and information about the weather sensors that generated the weather parameter data values. Collected data includes, for example, terrestrial and satellite microwave link attenuation measurement values and information about microwave links and endpoints associated with the microwave link attenuation values. Collected data may be filtered and transformed in order to produce processed collected data, or used to calculate or derive generated collected data. |
| Processed collected data | Collected data that is pre-processed using one or more preprocessing programs that may use predefined filters and data transforms in order to make the data ready for use by the forecasting systems. Processed collected data includes collected data transformed and tagged for use in cadence-based processing. |

| TERM | DEFINITION |
| --- | --- |
| | Processed collected data is stored, organized by data type, cadence cycle, and tile layer in the system database. Processed collected data includes, for example, weather sensor processed data (622), e.g, humidity, air temperature, and atmospheric pressure from ground and mobile weather sensors; NWP processed data (619), for example HRRR data; microwave link processed data (625a, b); map processed data (628); and other info processed data (622) |
| Generated data | Data generated by the system, either as new data, forecast data, or derived from one or more other data such as collected data and processed collected data. |
| Generated collected data | New data derived, calculated, or interpolated from the collected data or processed collected data (such as calculating rainfall from attenuation data) and stored in a system database. Generated collected data includes: microwave link precipitation, atmospheric water vapor, and fog LWC estimates (e.g., 626a, b) |
| Weather parameter data | Data representing values of weather parameters including precipitation intensity, air temperature, atmospheric pressure, humidity, wind velocity, and wind direction. Weather parameter data includes processed collected and generated collected data that includes values of weather parameters, for example processed collected temperature and humidity data and generated collected precipitation estimates. |
| Forecast generated data | Data generated during the forecast cycles of the cadence instance, stored in a system database, and typically represented as a set of one or more tile layers (typically one tile layer for each forecast data type, each tile, and each tile layer associated with a timestamp) for each forecast cycle. The timestamp corresponds to increments in the forecast time (e.g. tied to the time of each forecast cycle). Thus, forecast generated data set (and timestamp) $F_0$ is the current time at which collection completes for the cadence instance (e.g. the time that the cadence index is incremented), $F_1$ is current time + forecast interval, $F_2$ is current time + 2 * forecast interval, etc.), repeating out to the forecast limit. Forecast limits are tunable for the system; typical values are between 2-6 hours for short term, high resolution (NowCast) forecasts, and 1-10 days for long term, lower resolution forecasts. |
| Processed data | Comprises processed collected data that has been previously associated with a cadence instance and has been further processed by one or more data processing programs of the system, with results of that processing stored in a system database. Processed data can include microwave link data and attenuation data, current radar reflectivity and precipitation data, wind characteristics, temperature, humidity, dew point, vehicle sensors, and other conventional weather related information that has been collected, formatted, and stored in the various databases. Processed data may include additional refinements to collected data, generated collected data, additional information derived from processed collected data, processed generated data, or forecast generated data, or data that is calculated by other systems and associated with one or more cadence instances. A further example of processed data includes forecast generated data blended with processed data, for example NowCast data blended with NWP forecast data. |
| Post-processed data | A data instance further comprises post-processed data which is data derived from processed data. |
| Cadence index | Typically an increasing number that is used to reference a current (or specific) cadence instance. Alternatively, the cadence index may be any unique ID. |
| Tagging | Collected data is associated with a one or more cadence instance(s) and forecast cycle using a cadence index value (the (i) of $M_i$) and optionally a forecast cycle ID (the (j) for $M_iF_j$). Making this association is referred to as "tagging", and the any tile data may be tagged with one or more tags (e.g., cadence instance IDs, forecast cycle IDs, tile layer names), and additional tags may be added or removed during subsequent processing. |

6.3 EXEMPLARY SYSTEM ARCHITECTURE

An illustrative, non limiting, computing system that implements aspects of the technology(ies) is structured with one or plural general processing components (i.e., servers), based in part upon the nature of the information being processed) and the pipelined manner in which the information is processed in order to enable near real-time determination of the nature of weather conditions of a geographic region and to forecast weather conditions over the geographic region.

The one or plural logical servers (e.g., including data processing components), include in one example embodiment:

a first server (including a data processing component) is an information collection and normalization component;

a second server (including a data processing component) is an offline/background processing component;

a third server (including a data processing component) is a modelling and prediction component; and a fourth server (including a data processing component), is art information distribution and alerting component.

The system as described collects and utilizes weather data sensor information in order to rapidly collect and update weather forecasts using real-time weather data collected at high rates of frequency, and use this collected high frequency weather data to rapidly correct and update the weather forecasts generated by the system. This functional organization of components is provided for illustrative purposes; it is contemplated that other functional organizations may be implemented using the techniques described herein.

Figure 1:
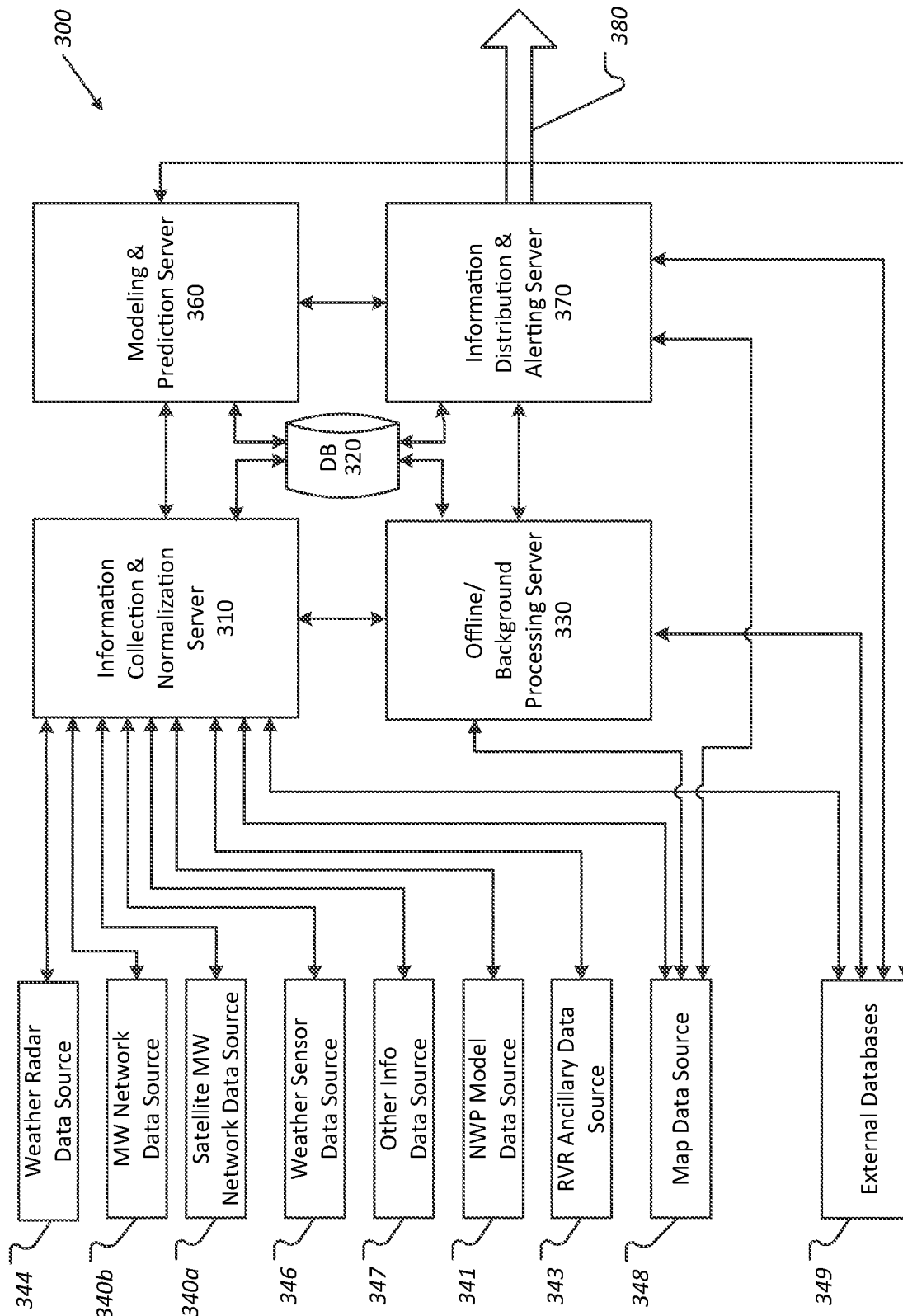
FIG. 1 depicts an exemplary systems diagram of a computing apparatus supporting aspects of the described system, according to an illustrative embodiment.

FIG. 1 illustrates, by example, a precipitation modeling and forecasting system (300) comprising four computing servers (310, 330, 360, and 370) performing the data processing tasks appropriate to the server architecture, with each server operating as a different one of the logical processing components. The servers share information directly, or through a system database (320), or external databases (349).

Each of the four computing servers (310, 330, 360, and 370) has access to external data sources (340-348) and internal or system data sources from the system database (320) or from databases operating on one or more of the four servers as is required to perform the necessary data collecting, data clean up and pre-processing, precipitation modeling, forecast modeling, forecast generation, and the like. Input and output data is processed and modeled in real time, in a time delayed mode, and in batch mode, respectively, either simultaneously or asynchronously, and shared between system comps tents on various servers using network communications, notifications, messages, common storage, or other means in common use for such purposes. The described architecture segregates programs and processes that have different attributes, including the programs and processes that are periodically performed on a scheduled routine or basis, batch collection and loading of data, computation intensive and parallel processing modeling, and user interface, onto separate servers for purposes of clarity of presentation. Alternatively or in addition, other processing arrangements may be used to implement the systems herein.

The functions of the servers may be combined into fewer servers, or expanded so that there are a plurality of physical servers without deviating from the described system. According to the described technology, each exemplary server may be implemented as an individual computer system, a collection of computer systems, a collection of processors, or the like, either tightly or loosely clustered, a set of interacting computer systems that are not clustered, or other arrangement as deemed appropriate by those with skill in the art. Computer systems can be implemented using virtual or physical deployments, or by using a combination of these means. In some implementations, the servers may be physically located together, or they may be distributed in remote locations, such as in shared hosting facilities or in virtualized facilities (e.g. "the cloud").

Additionally, other components of the system comprise external data sources and external databases.

Figure 2:
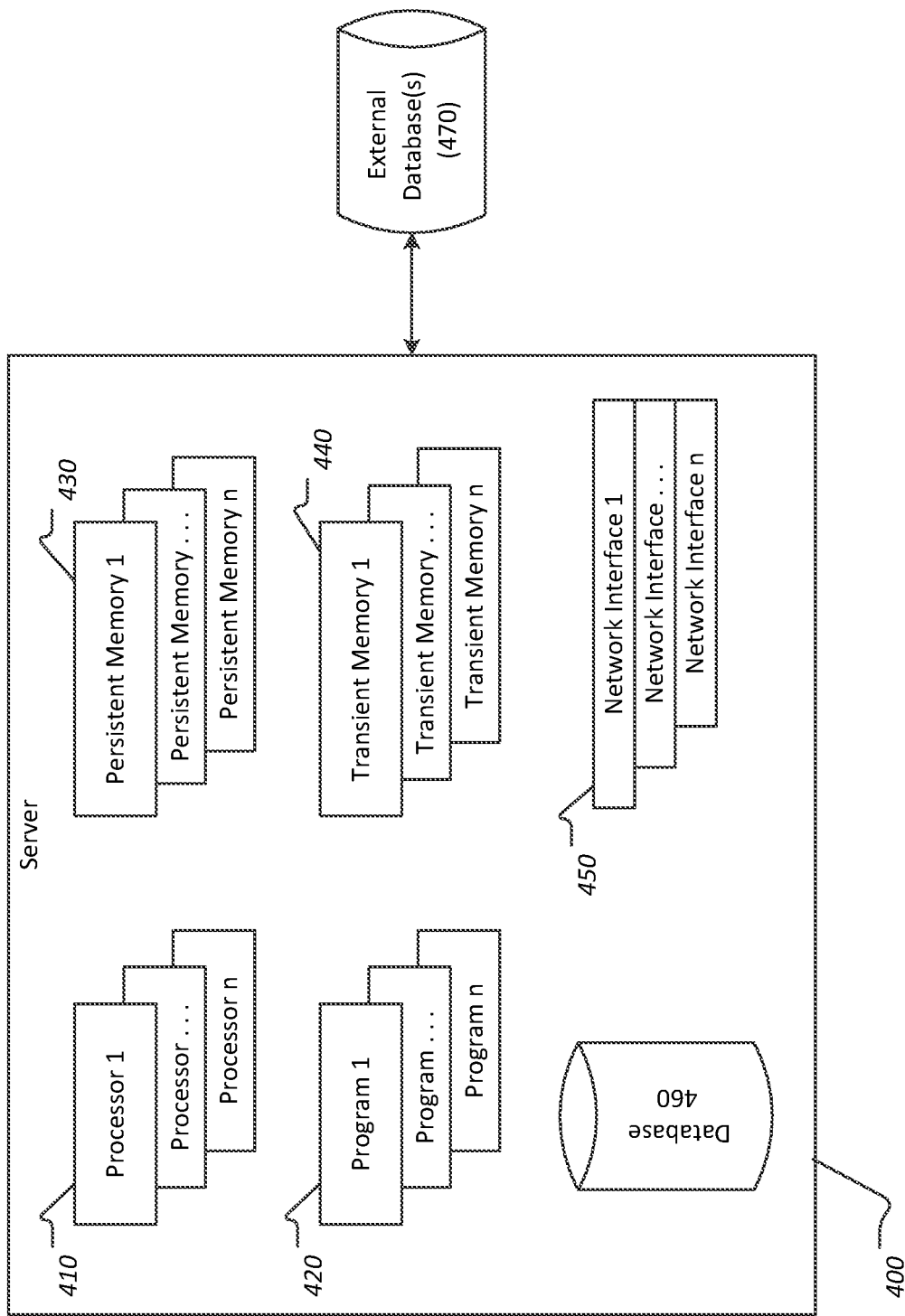
FIG. 2 depicts an illustrative exemplary computer server that supports the described system, according to an illustrative embodiment.

An exemplary computer server (400) is illustrated in FIG. 2. Each exemplary server comprises one or more processors or data processing components (410), operably connected to memories of both persistent (430), and/or transient (440) nature that are used to store information being processed by the system and to additionally store various program instructions (collectively referred to herein as "programs") (420) that are loaded and executed by the processors in order to perform the process operations described herein. Each of the processors is further operably connected to networking and communications interfaces (450) appropriate to the deployed configuration. Stored within persistent memories of the system may be one or more databases used for the storage of information collected and/or calculated by the servers and read, processed, and written by the processors under control of the program(s). Database 460 is an internal instance of at least a portion of the system database (320). A server may also be operably connected to an external database (470) via one or more network or other interfaces. The external database may be an instance of the system database that is provided on another server, or may be a network connected database that is a commercial or other external source (349).

6.3.1 information Collection and Normalization Server (310)

Figure 3:
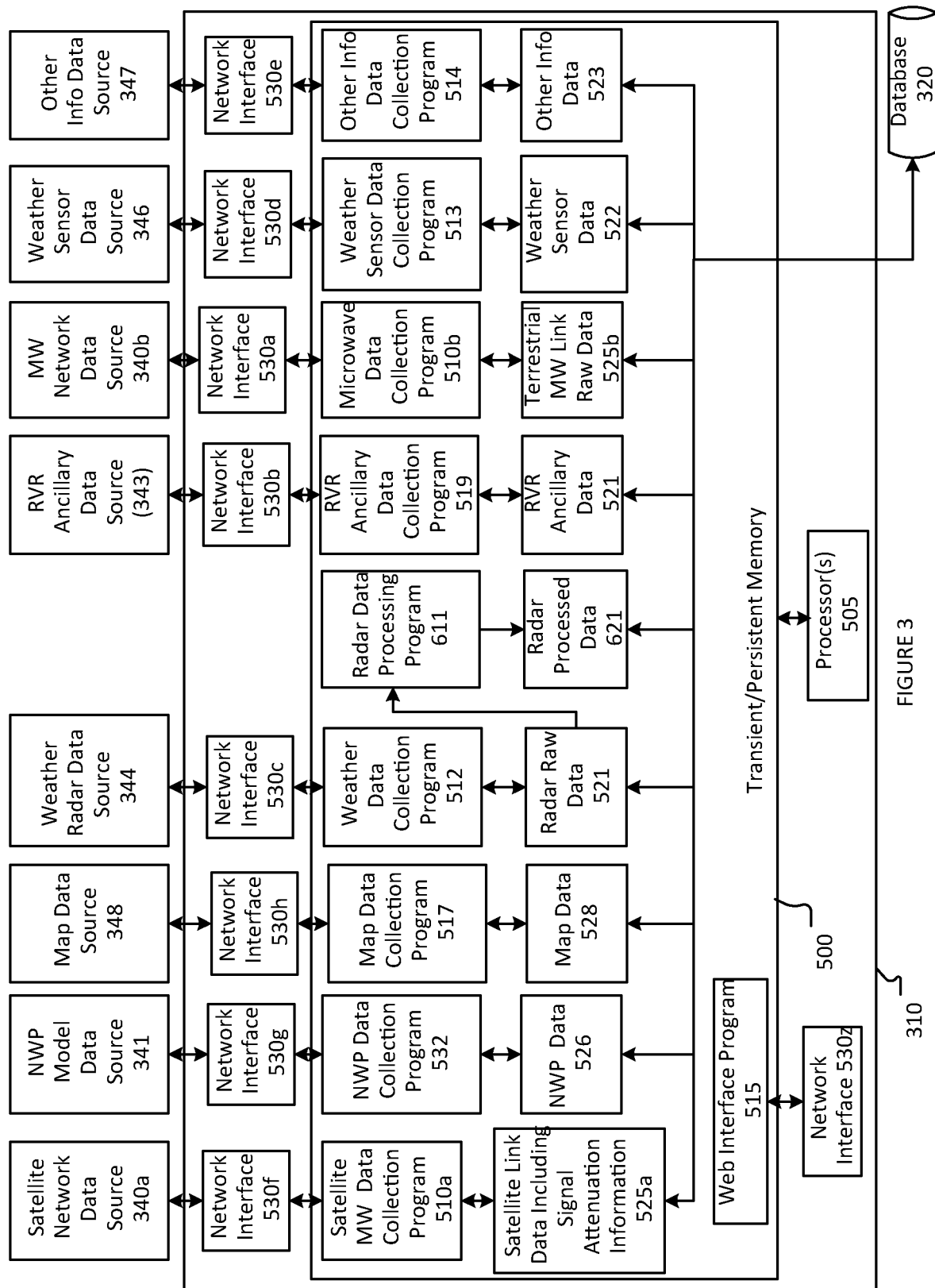
FIG. 3 depicts an illustrative Information collection and normalization server of the described system, according to an illustrative embodiment.

Referring to FIG. 3, the first server (including a data processing component) is an information collection and normalization component (310) that interacts with external data sources (340-348), collects relevant information from these data sources, and then pre-processes the collected data in order to change the data into a format that is usable by other processes of the precipitation modeling and forecasting system (300) by filtering, error-correcting, reducing redundancy, improving the accuracy of, and normalizing the collected data, for example by reconciling different data source reporting formats, e.g. measurement units and reporting intervals, to common system formats, thereby creating processed collected data. The server selects from a plurality of predefined data conversion techniques, including pre-calculated filters, pre-calculated transforms, pre-defined data filters, and pre-defined trained machine learning models.

The information collection and normalization server applies pre-calculated and re-calculated data filters to collected information to remove data that is extraneous, erroneous, distorted, or otherwise unreliable in order to improve accuracy of the remaining data. In some implementations, the information collection and normalization server farther applies pre-calculated transforms to efficiently convert data from one type or format to another, or to map data from an input format to tile layer. In other implementations, the server uses pre-defined trained machine learning models during the processing of the collected data. Processing is carried out by one or more processors of the server using one or more programs and pre-defined filters (Table 8) specific to the type of information being processed. The programs are stored in or executed in transient or persistent memory of the server, and carry out the processing required on data stored in or executed in transient or persistent memory and/or system database (320). Data located in a persistent memory or a system database are said to be in a data store of the described system.

The information collection and normalization server stores the collected data and processed collected data into one or more databases tagged in ways that automatically associate the stored data with the cadence and tile layer structures used by the forecasting components. In this way, the stored data is identified and formatted in a manner that allows more efficient further processing of the stored data and provision of a more accurate precipitation, atmospheric water vapor, and fog model and forecast model.

6.3.1.1 Data Sources of the Information Collection and Normalization Server

The information collection and normalization server (310) interacts with external data sources (340-348) and collects, relevant information from these sources for use by the precipitation modeling and forecasting system (300).

Data from Terrestrial Microwave Network data sources (e.g. point-to-point microwave and cellular networks), including terrestrial microwave link infrastructure data and microwave link attenuation collected data, is received and processed from a microwave network data source (340b), using one or more microwave data collection programs (510b), writing terrestrial microwave link data (525b) to a database of the system database. Terrestrial microwave network data processing and the use of processed terrestrial microwave network data are described in U.S. Pat. No. 10,078,155.

The satellite network data source (340a) is an interface to one or more satellite network data sources each providing satellite-based microwave link infrastructure data including wireless network topology information and microwave link information relating to one or more satellite-terminated microwave links. Satellite network data sources are typically provided by satellite network operators, such as Verizon, Comsat, Intelsat, and Inmarsat.

Satellite network data sources typically provide satellite microwave link infrastructure data regarding satellite uplink/downlink networks including: link information associated with satellite-to-earth station microwave links; whether uplink (from earth station to satellite), downlink (satellite to earth station), or bi-directional satellite links. The microwave link infrastructure data provided by satellite communication providers includes link frequencies and polarization, earth station locations and earth station antenna characteristics, satellite IDs, satellite ephemeris data, and transmit and receive signal levels.

Satellite microwave link infrastructure data may be received from a plurality of locations and a plurality of network providers over large geographic regions, such as from satellite network operators operating a plurality of separate earth stations (either mobile or stationary). Each satellite network data source can provide individual sets of data from a single earth station (including the location of the earth station), data from a plurality of earth stations, or a combination of data from several network operators.

The satellite microwave link infrastructure data provided may optionally include identity and location of stationary (geosynchronous) and low earth orbit (LEO) satellites and identify these connections as dynamic or static links each having a satellite link ID and an activity indication, such as the last time the satellite communicated with the earth station. The operating information included in the microwave link infrastructure data may include information regarding both static and dynamic satellite microwave links, as shown in Table 1. The data source may also provide additional information related to the satellite network, the earth station topology, and its operations. The satellite microwave link infrastructure data can be provided in the form of one or more CSV tiles (or in other formats) and may include static network topology information, such as the location and altitude of earth stations.

Data collected from satellite network data sources (340a) are typically acquired by communicating with a management server of one or more satellite networks or by communicating directly with one or more earth stations. An information collection and normalization server (310) can send requests for data or receive pushed data from one or more earth stations and network management servers. The information collection and normalization server includes an alerting function wherein a satellite network data source is notified if data reporting errors occur; for example if an earth station or network management server stops reporting data or if received data includes missing information, as compared to previous data, or zero value measurement reports.

A nonlimiting example of the types of microwave link infrastructure data, provided by a satellite network data source (340a) is provided in Table 1 below:

TABLE 1

| Microwave Link Infrastructure Data Types Provided by a Satellite Network Data Source | | |
|---|---|---|
| Earth stations | | |
| Earth station ID | Unique ID of the earth station. | |
| Location | Latitude and Longitude of earth station or GPS coordinate of earth station. | |
| Type of equipment | Type and characteristics of the earth station equipment | |
| Antenna characteristics | Characteristics that affect attenuation (e.g., antenna gain, effective transmitting/receiving area) | |
| Satellite Microwave Links | | |
| Satellite ID | Satellite unique ID. | |
| Earth station ID | Earth Station ID for reading/link | |
| Timestamp | Timestamp of last reading. | |
| Frequency | Frequency of the link (may change regularly, depending upon signaling protocol). | In GHz |
| Quantization | Quantization of link measurements. | e.g. 0.1, .5, 1 dB |
| Orientation | Orientation of the earth station antenna (if stationary link). | |

TABLE 1-continued

| Microwave Link Infrastructure Data Types Provided by a Satellite Network Data Source | | |
|---|---|---|
| Polarization | Polarization characteristics of satellite to earth station and/or earth station to satellite link. | |
| Satellite location | Current position of the satellite (e.g. latitude, longitude, altitude for earth-centric position). | Computed or read |
| Link Length | Length of the link (in meters). | Computed from satellite and earth station locations |
| TX/TSL Level | Transmission level (reported by link), 0 if not operating or receive only. | In dB |
| RX/RSL level | Receive level (reported by link). | In dB |
| Attenuation | The amount a signal is reduced by transmission between the two endpoints. | In dB |
| Adjusted signal attenuation | Signal attenuation adjusted for zero-value. | Calculated from signal attenuation |
| Signal propagation time | Amount of time for a signal to travel between link endpoint antennas. | |
| Adjusted signal delay | Propagation time adjusted for zero-level. | Calculated from signal propagation time |
| Antenna characteristics | Characteristics that affect attenuation (e.g., antenna gain, effective transmitting/receiving area) | |

Weather sensor data sources (346) provide data from individual static weather sensors operating at wound weather stations located at or near ground level at various geolocations such at land and sea based weather stations, at airports and sea ports, on top of buildings and mountains at various altitudes. Weather sensor data (522) from ground weather stations and other static weather sensors may be provided by one or more networks of weather stations and weather sensors such as those provided commercially by the Weather Company.

Weather sensor data sources also include individual weather sensors mounted to mobile platforms, or other types of sensors from which weather data can be inferred. Weather sensor data sources that provide weather sensor data from mobile weather sensors include data sources that collect, package, and distribute weather-related data generated by sensors mounted on one or more mobile platforms, typically manned or unmanned vehicles. These sensors are characterized by their mobility (e.g. a changing geolocation), and small temporal resolution (very high data rate). As such, they provide particular challenges for integrating their data with weather forecast models. Mobile weather Sensors can be mounted on ground vehicles such as cars, trucks, buses, and trains, on ocean or freight and passenger ships, and air vehicles including, for example, air planes, UAVs, and balloons. Vehicle-based weather data sources can include interfaces data from of individual vehicles, or the data source may aggregate data from multiple vehicles, for example, to anonymize the data received front one or more vehicles or to systems and/or networks that collect this data from vehicles.

Data from vehicle-mounted weather data sources can include the current vehicle location (latitude, longitude, and altitude), directly measured weather parameter data such as outside temperature, atmospheric humidity, or moisture measured by vehicle-mounted moisture sensors, or from engine control sensors that measure conditioned air flowing to an engine. Mobile weather sensor data includes derived or estimated weather data calculated from vehicle-mounted sensors (or data used to derive or estimate weather sensor data taken from these sensors).

A partial list of mobile weather sensors and related weather sensor data that may be obtained from various external weather sensor data sources, such as aircraft data collected from flying vehicles (e.g, aircraft, UAV, balloons), ground vehicle data collected from various types of ground vehicles (e.g. cars, trucks) is provided in Table 2 below.

TABLE 2

Mobile Weather Sensors
Vehicle-mounted Data Sensor or Measured Data Type

Rain/Precipitation sensor (wiper moisture sensor, change in capacitance of windshield; change in transmissiveness or reflectance of windshield; Radar-based; short range electromagnetic radiation transceiver; LED-based)
Outside (Ambient) Temperature sensor (e.g. resistance temperature detectors, thermocouples, IR temperature sensors)
Wind speed and direction sensor
Ambient barometric pressure sensor
Humidity sensor
Commercial aircraft data (e.g. AMDAR): Temperature sensor; Wind speed sensor; Vertical wind gust sensor; Turbulence sensor (can be different from one airplane to another); Humidity and/or water vapor sensor; Cloud cover (Top/ Base); Sky Coverage Key; Icing indicator
Ground vehicle sensors (e.g. Vehicle Data Translator): Anti-collision radar; Wiper status; Wiper rate; ABS status; Exterior lights (head lights, fog lights); Stability control status; Traction control status; Vehicle speed/direction; Steering wheel angle; Steering wheel rate of change; Impact sensor; Brake status; Brake boost; Braking data; Accelerometer data; Hours of operation; Heading/GPS location/altitude; Throttle position; Engine speed; Engine torque; Exhaust diagnostics; Pitch/roll Yaw; Differential wheel speed; Horizontal acceleration latitudinal, longitudinal; Ambient noise level; Smart tire sensor TABLE 2-continued Mobile Weather Sensors
Vehicle-mounted Data Sensor or Measured Data Type Road condition sensors: Liquid material freeze point sensor; Conductivity detector; Friction
measurement devices; vehicle-mounted Material analysis system (e.g., spectrographic analysis
system); Pavement/road surface temperature sensor (e.g. IR thermometer)
Data from early collision detection/warning, adaptive/automated/autonomous cruise control
(distance control), backup or parking assist radar systems, and V2V radar communication systems
Vehicle-mounted weather radar (e.g., On-board ultra-wide band Doppler radar or any other suitable
electromagnetic radiation (EMR) emission and detection system)
Seas conditions
Sensor to detect phase shifts in data transmissions (GPS and Iridium satellite telephone signals)
Laser detection and ranging (LADAR) sensor
Radio frequency (RF) occultation sensor
Close proximity electromagnetic radiation (EdM) transmitters
Laser based range finder
Digital lightning sensor
Radio receiver (to detect electrical interference)
Imaging device to collect weather-related images
Pyranometer/sun sensor; Light sensor
Air quality sensors; Chemical sensors; ozone sensors
Laser Induced Breakdown Spectroscopy (LIBS) system Numerical Weather Prediction (NWP) model data sources (341) include sources of weather data derived from numerical modeling programs, for example the National Oceanic and Atmospheric Administration (NOAA), which is a source of NWP data (526) including, for example, high resolution rapid refresh (HRRR) forecast data.

Weather radar data sources (344) include, for example, the National Oceanic and Atmospheric Administration (NOAA) data sources, which provide NEXRAD radar data including pre-processed Level III radar data, including base reflectivity in dBz. Additional exemplary radar data sources include the National Severe Storms Laboratory (NSSL) data sources, which provides data generated by the Multi-Radar Multi-Sensor (MRMS) project including mosaiked data composited from multiple data sources including multiple individual radar sensors.

Map data sources (348) are providers of map and Geographic Information System (GIS) data, which includes geo-information such as topographic and general reference map information related to the shape and geolocation of ground landmarks such as hills, mountains, shorelines, or the like, and may further provide data, e.g. geolocation of roadways, railways, airports, seaports, levies, retaining walls, dams, and any other manmade structures as may be required.

Other info data sources (347) are any sources of data that do not fall into any of the other data categories (e.g., 340-348) and can include, for example, weather satellite data sources and weather radar data sources.

6.3.1.2 Interface Programs of the Information Collection and Normalization Server Each information source that is utilized by the information collection and normalization server typically has a dedicated interface program present on the information collection and normalization server that operates to (a) connect to the information sources over a network, (b) interact with the information source using well defined interfaces, (c) retrieve selected data from the information source, (d) process that retrieved data in accordance with information source specific algorithms, and (e) write the processed data to one or more persistent memories of the system. Different programs are used depending upon the type of information source accessed, its defined interface, and the nature of the processing required.

Data collection programs may include features of the corresponding data processing programs of the offline/background processing server when these features do not slow the processing pipeline. For example, a data collection program may be extended to use a pre-computed filter or pre-computed transform to completely process collected data at the time of collection instead of incurring the costs of saving the interim results to the system database and then starting a second program that reads the data and performs the filtering and/or transforms.

6.3.1.3 Satellite Microwave Data Collection Program (510a)

The satellite microwave data collection program (510a), operating on the information collection and normalization server (310), receives collected data from one or more satellite network data sources (340a) through network interface (530f) and processes and stores the received microwave link data including signal attenuation data to a satellite microwave link attenuation database (352a) as satellite microwave link raw data (525a). The collected data includes satellite link data from multiple satellite-ground station microwave links. Alternatively, the satellite microwave data collection program receives continuously updated satellite link data. In some embodiments, the satellite microwave data collection program may receive reports that include aggregate measurements over a period of time, for example over 15 minute, 30 minute, or one hour intervals. Received data includes TSL and RSL values, and signal polarization information for each of the multiple microwave links. In some embodiments, the satellite microwave data collection program receives reports that include updated satellite microwave link infrastructure data, for example satellite and ground station configuration or status changes. Collected data can include information listed in Table 6.

The satellite microwave data collection program parses the collected data to extract TSL and RSL values, metadata, and ancillary data. Parsed data includes at least TSL and RSL values indexed with link endpoint identification. In an exemplary embodiment, the satellite microwave data collection program applies one or more pre-configured filters, for example a microwave link frequency or received signal strength filter listed in Table 8, to exclude collected data points below a threshold frequency or having an attenuation measurement value below a threshold amount, from further processing. Parsed and filtered data is then associated with the current cadence instance Mi, and tagged. Parsed and filtered satellite microwave link data is stored in satellite microwave link attenuation database (352a). Satellite ephemeris data and other satellite microwave link location and characteristics data can be stored in satellite microwave link ephemeris information database (390).

In some embodiments, the link precipitation calculations are included in the link attenuation processing, further reducing the computing overhead. In these cases, the terrestrial microwave data collection program (510b) and the satellite microwave data collection program (510a) perform the function of various microwave link data processing programs (e.g. 654a) and uses pre-calculated transforms and filters to calculate satellite microwave precipitation and atmospheric water estimate data (626a) from satellite microwave link processed attenuation data (625a) and to transform the collected data directly to satellite microwave precipitation and atmospheric water vapor tiles or to LWC tiles. For example, in some embodiments the satellite microwave data collection program performs satellite microwave link snap to grid process (40000) to associate collected TSL and RSL values with satellite microwave pro forma links.

6.3.1.4 Microwave Data Collection Program (510b)

In a similar manner, terrestrial microwave data collection program (510b) collects, parses, and filters collected terrestrial microwave link attenuation data, tags: the data, and stores it as terrestrial microwave link raw data (525b) in microwave link attenuation database (352b).

6.3.1.5 NWP Data Collection Program (532)

NWP data collection program (532) receives data generated by NWP models and programs from NWP model data source (341). The NWP data collection program parses NWP model data, associates it with the current cadence instance Mi, tags the data, and stores the parsed data as NWP data (526) to NWP ground weather database (353) and NWP model atmospheric database (329).

6.3.1.6 Map Data Collection Program (517)

Map data collection program (517) receives map from map data source (e.g. 348). Map data received by the map data collection program may include elevation data as well as GIS and topographic map data. The map data collection program parses received GIS, elevation, and topographic map files in order to extract specific map data, such as, for example elevation, ground cover such as vegetation and vegetation types, water features, and building or other structures at map coordinate locations, for example at specific latitude and longitude locations. Parsed map data is stored as map data (528) in map database (880).

6.3.1.7 Weather Radar Data Collection Program (512)

Weather radar data collection program (512) receives data files containing weather radar data from a weather radar data source (344), parses the received data files to extract collected data, for example reflectivity readings at discrete location points, associates the collected data with the current cadence instance $M_i$, for example by tagging the data with the cadence instance identifier Mi and with the cadence time stamp, and saves the measurements as radar raw data (521) to radar database (321). Data collected from radar data sources and saved to the radar database includes, for example, Composite Reflectivity, Reflectivity at Lowest Altitude, Base Reflectivity, Echo Tops (at multiple dBZ levels), Storm Relative Helicity, Probability of Severe Hal, Maximum Expected Hail Size, Lightning Density, Vertically Integrated Liquid, and Bright Band Top/Bottom.

6.3.1.8 Radar Data Processing Program (611)

The radar data processing program (611) processes raw radar data (521), including transforming the collected radar data to a radar tile layer of collection data tile stack $M_i$, to generate radar processed data (621). The radar data processing program transforms radar data from radar source grid coordinates to system tile layer coordinates, including interpolating or morphing the data to tile coordinates if radar and tile coordinates are not the same. For example, the radar data processing program transforms radar reflectivity data to a $M_i$ radar reflectivity tile layer. The radar processed data is tagged with its own native time stamp, i.e. with a time stamp associated with the data by a weather radar time stamp. If more than one set of a particular type of radar data, for example two or more composite reflectivity data sets, in some exemplary embodiments the weather radar processing program processes the collected data set with a native time stamp closest in time to the cadence time stamp, including transforming the data to a radar tile layer, and discards older collected data sets. The radar processing, program tags the processed collected radar data with the cadence identifier $M_i$ and saves it as radar processed data (621) to radar database (322). In some exemplary embodiments, the radar data processing program performs additional pre-processing on the radar processed data, for example to extract storm objects or precipitation fields from reflectivity data. In a particular example, the radar data processing program generates storm object data from radar reflectivity data, e.g. using an image processing technique, tags the storm objects data with cadence identifier $M_i$ and saves it as storm objects database (350).

6.3.1.9 RVR Ancillary Data Collection Program (519)

RVR ancillary data collection program (519) collects RVR ancillary including location-specific values of parameters that are used for calculating $V_a$ and $V_k$ such current runway light luminosity (I), current and historical $V_k$ measured by RVR sensors at the airport, and background light intensity (BL), and stores the data and RVR ancillary data (529) to the RVR location and ancillary data database (997).

6.3.1.10 Weather Sensor Data Collection Program (513)

The weather sensor data collection program (513) receives weather sensor data from one or more weather sensor data sources (346), which includes providers of weather-related collected data measured or otherwise gathered by an external weather sensor. External weather sensors can include weather sensors such as, for example, those listed in Tables 7 and 8. Exemplary weather sensor data sources include ground weather stations, aggregators of ground weather station data, connected vehicle fleet data collection and management systems, commercial airlines, and any other aggregator and/or supplier of data from external weather sensors. Additionally, or alternatively, the weather sensor data collection program collects weather sensor data directly from a plurality of ground stations or from other stand alone external weather sensor data sources. The weather sensor data collection program parses received weather sensor data to extract weather sensor collected data, for example collected data including temperature or humidity values generated by weather sensors. In some embodiments the weather sensor data collection program uses snap to grid to normalize one or more weather sensor locations to a pro forma location. The weather sensor data collection program applies pre-calculated filters and transforms, for example one or more filters listed in Table 8, to collected weather sensor data in order to reduce volumes of data that are saved to system databases. In this way, the weather sensor data collection program filters out collected data points that are not required for further processing and aggregates large volumes of collected data points into statistical representations. These data set size reductions significantly reduce the amount of calculations required in subsequent forecasting by permitting forecast optimizations to be used. The parsed and filtered data is associated with the current cadence instance Mi, tagged, and stored as weather sensor data (522) to the weather sensor database (323).

6.3.1.11 Additional Data Collection Programs

In addition to the exemplary types of data collected from exemplary data sources discussed herein, the system can collect and process data from any data source, referred herein as other info data source (347), that is configured to provide data. Other info data collection program (514) receives other information from other info data source, parses the collected data, associates it with the current cadence instance Mi, tags the data, and stores the parsed data as other info data (523) to other info database (324)

6.3.2 Offline/Background Processing Server (330)

Figure 4:
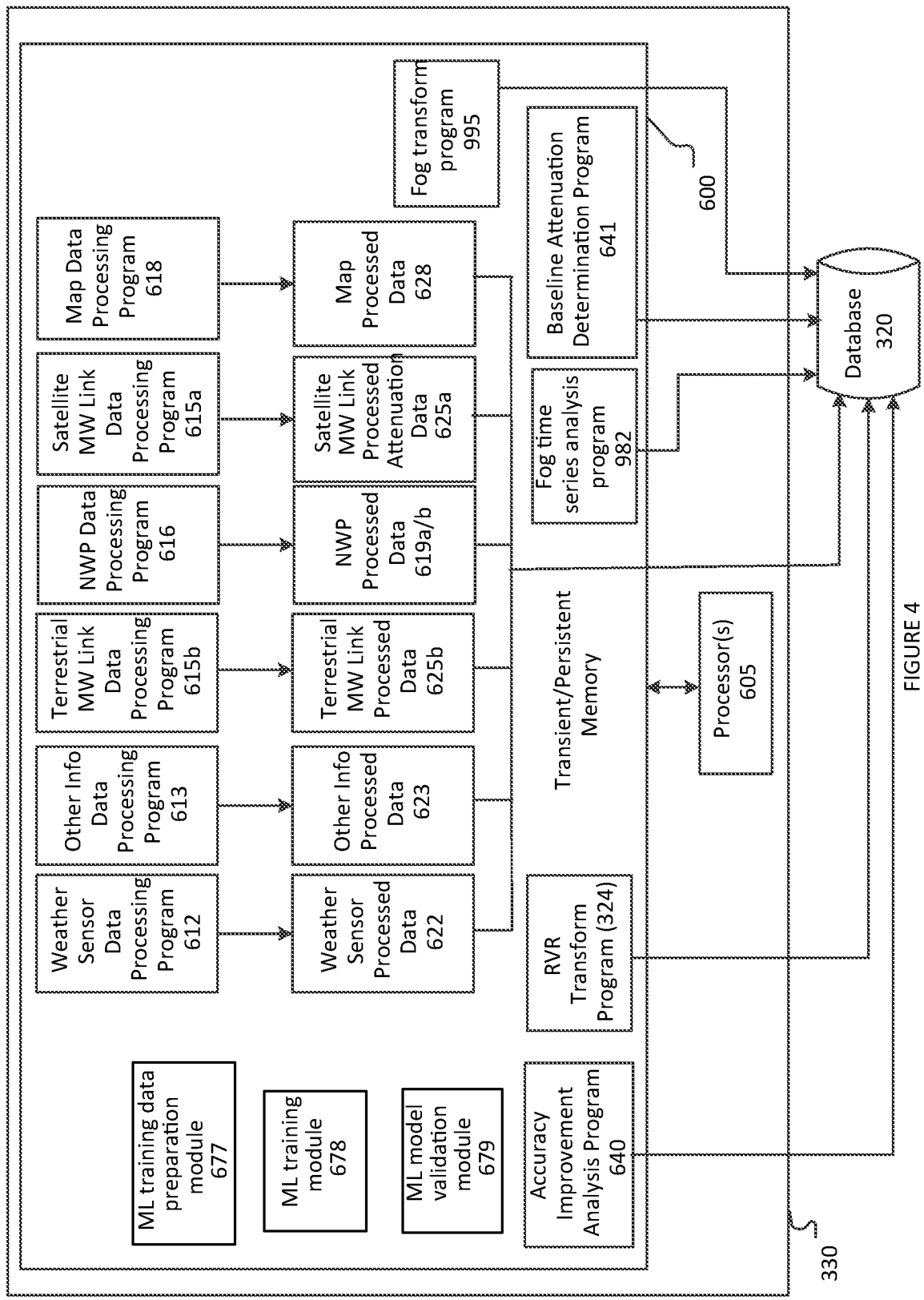
FIG. 4 depicts an illustrative offline/background processing server of the described system, according to an illustrative embodiment.

Continuing to refer to FIG. 1, a second server (including a data processing component) is an offline/background processing component that retrieves updates from the information collection and normalization server (310), from the system database (320), and from external databases (349). The offline/background processing server (330), as illustrated in FIG. 4, comprises one or more computer systems similar to the exemplary server illustrated in FIG. 1. The server executes processes and programs to generate transforms, time series rules ML models, and trained predictive models that other servers implement to calculate and forecast weather data. The server executes processed and programs to generate and update filters and filter parameters that the server and other servers use to filter out erroneous, erroneous, or otherwise unneeded collected data points and to aggregated collected data points to reduce data volumes. The offline/background processing server executes a series of background and scheduled programs that recalculate and/or update information related to the transforms, filters, and the underlying reference tables that these models rely upon. The server performs non-time critical processing of collected data and non-time critical updating of low-temporal resolution calculations and modeling. This server performs non-time-sensitive data processing on collected information, and periodic processing to update longer term models. The offline/background processing server also pre-calculates and updates pre-calculated filters and pre-calculated transforms for translating collected information into formats usable by other servers and programs of the system; the process of generating transforms and filters is discussed below. The offline/background processing server also pre-calculates filters that are used to exclude erroneous data points and to reduce data volumes that are saved to databases.

Processing is carried out by one or more processors (605) running specialized programs as described below. The programs are stored in or executed in transient or persistent memory (600). The data generated by these executing programs are written back to the system database and are shared with the other servers in the system either directly or through the database.

6.3.2.1 Programs of the Offline/Background Processing Server

Programs operating on the offline/background server pre-calculate filters and transforms used by programs operating on the same and other servers to rapidly process collected data to filter data, transform data to system coordinates and tiles, map microwave link endpoint locations and mobile weather sensor locations to pro forma location, locations to pro-forma locations, map microwave links to pre-calculated pro forma links, and calculate generated collected data, for example precipitation and atmospheric water vapor estimates.

Other programs process collected data into other forms, as described herein. These processing programs may be integrated into the data collection programs of the information collection and normalization server (310), may be executed as stand-alone programs on the of processing server (330), or may be executed as part of the cadence pre processing on the modelling and forecasting server (360).

6.1.2.1.1 Weather Sensor Data Processing Program (612)

The weather sensor data processing program (612) reads weather sensor data (522) from weather sensor database (323) and pre-processes the data to produce weather sensor processed data (622). The weather sensor data processing program pre-processes weather sensor data to associate the collected data with metadata and ancillary data, for example weather sensor location or a pro forma grid location.

The weather sensor data processing program uses pre-calculated weather sensor data transforms to transform data from weather sensor locations to system-derived tiles. Transforming the data to tiles can include snapping, weather sensor measurements to nearest ground level microwave grid points, binning measurements at locations, and interpolating location-specific collected data to tile locations.

In an embodiment, the weather sensor data processing program filters out possibly erroneous mobile weather sensor data by comparing weather parameter data collected from vehicle mounted weather sensors to current predicted weather parameter data and excluding collected data measurements from vehicle-mounted weather sensors that are out of phase or inconsistent with collected or predicted data. This filtering reduces the amount of data that must be subsequently processed, thereby reducing the computational complexity m the modelling and forecast server.

In an embodiment, the weather sensor data processing program filters out erroneous data by excluding weather parameter data collected from vehicle-mounted weather sensors under conditions that are known to produce unreliable or potentially erroneous measurement results. For example, if a vehicle-mounted outside temperature sensor is inaccurate when the vehicle is traveling at less than 25 mph, the weather sensor data processing program filters out measurements from the sensor that were recorded when the vehicle was moving at less than 25 mph. In further embodiments, the weather sensor data processing program filters out other erroneous or distorted vehicle weather sensor data measurements, based upon the operational characteristics of one or more of current vehicle-mounted sensor readings, past vehicle-mounted sensor readings, collected weather data from other sources, and forecast weather data from the forecasting algorithms of the system.

In an embodiment, the weather sensor data processing program can use one or more ML models, trained by the ML training module (678), as filters or filtering parameters generated by a trained ML model to identify for filtering out of normal range data.

A partial list of filters that can be used by the weather sensor data processing program to filter vehicle weather sensor data that may be obtained from various external data sources is provided in Table 3 (below) and Table 8. The filters are pre-configured or calculated, and in some embodiments re-calculated, by the weather sensor data processing program (612).

TABLE 3

Filters Used by Weather Sensor Data Processing Program

| Sensor/Sensor data Type | Filter |
| --- | --- |
| Multiple or unspecified ground vehicle-mounted weather sensors | Filter out measurements made inside tunnels or in other confined spaces |
| Multiple or unspecified vehicle-mounted weather sensors | Filter out observations that could be affected by geographically-located microclimates (known non-atmospheric heat sources or sinks) |
| Multiple or unspecified vehicle-mounted weather sensors | Filter out observations that fall outside of location-specific climatological or historical ranges |
| Multiple or unspecified ground vehicle-mounted weather sensors | Filter out observations that differ from nearest ground stations by an amount greater than dynamic threshold (e.g. fdter out observations that do not fall with 2.5 std dev of mean for standard 1 mile road segment) |
| Multiple or unspecified vehicle-mounted weather sensors | Filter out observations that disagree with remote observations (e.g., satellite, radar) by a threshold amount |
| Multiple or unspecified vehicle-mounted weather sensors | Filter out observations that differ from NWP values by a threshold amount |
| Multiple or unspecified vehicle-mounted weather sensors | Filter out observations that differ from observations made by nearest vehicle(s) by an amount greater than dynamic threshold |
| Multiple or unspecified vehicle-mounted weather sensors | Filter out anomalous data detected based on pattern analysis |
| Multiple or unspecified vehicle-mounted weather sensors | Filter out observations that are outliers compared to other recent measurements made by same sensor |
| Multiple or unspecified vehicle-mounted weather sensors | Persistence check filter to determine if mobile observation is stuck on a value |
| Multiple or unspecified vehicle-mounted weather sensors | Filter out-of-band/out-of-range data (e.g. Anticipated Range Test (ART)) |
| Outside (Ambient) Temperature sensor | Calculate running mean and standard deviation of last 20 measurements; filter out new reading that is outside threshold of mean value +/−5 standard deviations |
| Multiple or unspecified ground vehicle-mounted weather sensors | Filter based on time to warm up |
| Outside (Ambient) Temperature sensor (ground vehicle) | Filter out readings for vehicle traveling less than 25 miles per hour |
| Digital lightning sensor | Hardware or software algorithms to discriminate against false indications caused by impulse or burst-type electrical interference commonly experienced with vehicle electrical systems |
| Data from ground vehicle early collision detection/warning, adaptive/autonomous cruise control (distance control), backup or parking assist radar systems, and V2V radar communication systems | Filter out reflected signal component caused by reflected object (.e.g., by detected vehicle) to isolate reflected signal component caused by precipitation. |
| Outside (Ambient) Temperature sensor; Ambient barometric pressure sensor; Wiper status; ABS status; Exterior lights (head lights, fog lights); Stability control status; Traction control status; Vehicle speed/direction; Steering wheel angle; Steering wheel rate of change; Brake status; Brake boost; Yaw; Horizontal acceleration (latitudinal and longitudinal) | Filter out readings outside of sensor hardware range |

The weather sensor data processing program (612) completes processing of the weather sensor data (346) by transforming the filtered, corrected, and location-binned data to tiles of one or more weather sensor collected data tile layers. The weather sensor data processing program uses mobile weather sensor data transforms, for example a vehicle weather data to tile transform, to transform data from mobile sensor data measurement locations to system-derived tiles. In a particular exemplary embodiment, the weather sensor data processing program transforms mobile sensor data to tiles using a mobile weather sensor data transform that encodes multiple pro-forma locations. In this embodiment, the weather sensor data processing program replaces the geographic location of the weather sensor data with a pro forma geographic location in order to bin the data by geographic location. Binning of weather sensor measurements to tiles can include pruning measurements to retain only as many measurements as are needed to achieve a specified level of confidence in a parameter value for each tile and discarding unneeded measurements, thereby reducing the amount of information that is saved and further processed.

Weather sensor processed data (622) and associated metadata and ancillary data are stored to weather sensor database (323). This information is then made available to weather prediction and forecasting system, as well as statistical, regression, and correlation components of the various processing modeling, forecast, and prediction programs of the system.

In an alternative exemplary embodiment, one or more of the weather sensor filtering and processing operations described in this section in relation to the weather sensor data processing program are carried out by the weather sensor data collection program prior to saying collected weather sensor data to the weather sensor database (323).

6.3.2.1.2 Other Information Data Processing Program (613)

Other info data processing program (613) pre-processes other info data and stores processed data as other info processed data (623) to other info database (324). Preprocessing of other info data can include using a pre-calculated transform to transform data from other info data coordinates to system-determined tile locations including determining averaged or interpolated tile data values from other info data coordinate values if tile resolution is different (either lower or higher) than the other info data coordinate resolution.

6.3.2.3 Satellite Microwave Link Data Processing Program (615a)

The satellite microwave link data processing program pre-processes satellite link collected data (525a), which includes signal attenuation values, to produce satellite microwave link processed attenuation data (625a). The satellite microwave link data processing program preprocesses the satellite microwave link collected data to associate attenuation values with any missing metadata and or ancillary microwave link infrastructure data including satellite antenna IDs, ground station IDs, ground station locations including latitude and longitude, and satellite microwave signal transmit frequency, bandwidth, and polarization. Any required microwave link infrastructure data, e.g., ancillary data or metadata, that was not included in data received from a satellite network data source (340a) is requested from the source by the information collection and normalization server (310), or is obtained from one or more system databases (320). The satellite microwave link data processing program carries out satellite microwave link snap to grid process (40000) to map satellite microwave link endpoints with pro forma locations and a pre-calculated pro forma satellite microwave link and to associate link TSL and RSL values with the pro forma link. The satellite microwave link data processing program also normalizes collected data to reconcile disparate and RSL measurement reporting formats used by the data suppliers.

The satellite microwave link data processing program error checks satellite microwave link collected data to remove invalid or inconsistent information, and to filter link information that is not usable in subsequent processing. For example, the satellite microwave link data processing program retrieves a satellite microwave link frequency filter from the transform and filter database (393) and uses it to filter out collected data from links that are transmitting on a frequency channel that is not a microwave channel. In another example the satellite microwave link data processing program retrieves a satellite microwave link received signal strength filter from the transform and filter database and uses the filter to filter out satellite microwave link collected data with received signal strength below a specified threshold. This filter removes inactive links and links for which the signal strength was not properly measured. In another example, the missing data or data including received signal strength below the specified threshold is replaced with historical data. An expiration time period is associated with historical data and data that is older than a specified time interval, for example, data that is older than 5 minutes or data that is older than ten minutes is considered expired and is not used to substitute missing data.

The satellite microwave link data processing program (615a) carries out a baseline creation process to pre-calculated baseline transforms that can be applied to satellite microwave link attenuation data (625a) to calculate the dry attenuation for the link. The satellite microwave link data processing program periodically performs satellite microwave link transform creation process (30000), described below, to generate satellite microwave link transforms that include equations to calculate and map satellite microwave link attenuation-based atmospheric weather parameter data, for example one or more of precipitation, LWC, and atmospheric water vapor estimate data to tiles using satellite microwave link processed attenuation data (625a). In some embodiments the satellite microwave link data processing program caries out combined terrestrial and satellite microwave link transform creation process to pre-calculate transforms that include equations to calculated weather parameter data using both satellite and terrestrial processed microwave link attenuation data (625a, 625b). In some embodiments, the satellite microwave link data processing program also pre-calculates transforms and filters for pruning erroneous or non-useful measurements. In some embodiments the satellite microwave link data processing program carries out fog transform creation process (4000) to pre-calculate transforms and filters useful for converting microwave attenuation collected data to weather parameter data including, for example, atmospheric water vapor and LWC estimates on or more system tile layers.

The satellite microwave link data processing program optionally performs additional pre-processing to isolate non-baseline attenuation in link attenuation collected data using the pre calculated baseline transforms. In art exemplary embodiment, the satellite microwave link data processing program loads a pre-calculated satellite microwave link baseline transform and uses the baseline transform to determine non-baseline or wet attenuation (i.e. attenuation caused by atmospheric water vapor, precipitation, some other hydrometer, or other interference). In a particular embodiment the satellite microwave link data processing program compares wet attenuation to a wet attenuation threshold, encoded in a wet attenuation filter, and discards a collected data point if wet attenuation of that data point is below the threshold. In this manner, the satellite microwave link data processing program removes links with insufficient wet attenuation to be useful for predicting atmospheric water vapor or precipitation intensity values. Filtered and transformed data is stored as satellite microwave link processed attenuation data (625a) in the satellite microwave link attenuation database (352a).

In some exemplary embodiments, the satellite microwave link data processing program carries out microwave precipitation, atmospheric water vapor, and LWC estimate calculation method of the co-tiled application to calculate microwave precipitation, atmospheric water vapor, and LWC estimates.

6.321.4 Terrestrial Microwave Link Data Processing Program (615b)

The Terrestrial Microwave Link Data processing program (615b) is described in previously referenced U.S. Pat. No. 10,078,155. In some embodiments the Terrestrial Microwave Link Data processing program carries out a combined terrestrial and satellite microwave link transform creation process to pre-calculate transforms for generating weather parameter data from a combination of satellite and terrestrial processed attenuation data (6250), as described herein. In some embodiments the terrestrial microwave link data processing program carries out fog transform creation process (4000) to pre-calculate transforms and filters useful for converting microwave attenuation collected data to weather parameter data including, for example, atmospheric water vapor and LWC estimates on or more system tile layers.

In some exemplary embodiments, the terrestrial microwave link data processing program carries out microwave precipitation, atmospheric water vapor, and LWC estimate calculation method of the co-filed application to calculate microwave precipitation, atmospheric water vapor, and LWC estimates.

6.3.2.1.5 Baseline Attenuation Determination Program (641)

The baseline attenuation determination program (641) is described in United States previously referenced U.S. Pat. No. 10,078,155. The Baseline Attenuation Determination program can carry out a baseline attenuation determination method to pre-calculate satellite microwave link baseline attenuation, as described herein.

6.3.2.1.6 NWP Data Processing Program (616)

The NWP data processing program (616) pre-calculates transforms to transform NWP data from data source coordinates to system tile layers. The NWP data processing program (616) pre-processes NWP collected data, using one or more pre-calculated transforms, to transform data from NWP data coordinates to system-determined tile locations, tags, and stores processed NWP data (526) model database (329).

6.3.2.1.7 Map Data Processing Program (618)

The map data processing program (618) pre-processes map data (528) to associate the map data with metadata and ancillary data, applies one or more pre-calculated transforms in order to convert data from map coordinates to system-determined tiles. The transformed and converted data, called map processed data (628) along with any associated metadata and ancillary data are stored to a database such as map database (880).

Fog Time Series Analysis Program (982)

The fog time series analysis program (982) which is executed out of phase with fog prediction and forecasting (i.e. as an offline process that creates the time series rules ML models prior to fog forecasting) to produce time series rules ML models, in a particular exemplary embodiment, referring to FIG. 4, the fog time series analysis program includes a machine learning model training module (678) which is configured to process machine learning training data including, for example historical fog detection data and historical microwave link attenuation data, and produce one or more fog time series rules ML models. In an exemplary embodiment, the fog time series analysis program communicates with the system database to retrieve historical fog detection data, for example weather sensor processed data (622) including fog detection indications of confirmed fog events generated by a fog detection sensor. In an exemplary embodiment, the fog time series analysis program retrieves historical microwave link attenuation data from one or more microwave link attenuation databases (352a,b). The fog time series analysis program causes the machine learning training module to apply time series analysis to the retrieved training data (e.g. to retrieved historical fog detection data and historical weather parameter data) to determine trends or patterns in the time varying characteristics of, for example, measured attenuation that correspond to either confirmed fog or precipitation events. In an alternative embodiment, fog time series analysis program causes the machine learning training module to use time series analysis to determine trends or patterns in historic precipitation determinations and fog inferences that correspond to correct or incorrect fog inference.

The fog time series analysis program causes the machine learning training module to create, and in some implementations, to periodically update, fog time series rules ML models (984) which are used by the fog inference program of the system to confirm a preliminary fog inference and determine a confirmed fog inference (or in the absence of a confirmation, refute the preliminary fog inference). The fog time series rules ML model encode patterns of attenuation magnitude that are indicative of whether or not fog is likely. The encoded patterns of attenuation magnitude are identified, by the time series analysis program, using time series analysis of a series of historic attenuation magnitudes preceding a confirmed fog event. Confirmed fog events can include fog events detected by known fog detection methods including, but not limited to, human observers, visibility measurements, or specialized fog detection instruments or sensors. The fog time series analysis program stores the fog time series odes ML models in the fog time series odes database (986).

In an embodiment, a fog time series rule ML model includes a mask that encodes a shape corresponding to a plot of fog LWC estimate magnitude on a vertical axis and time on a horizontal axis wherein the shape of the plot is derived from one or more time series of historic fog LWC magnitudes that preceded and/or included a confirmed fog event. The fog inference program can infer a presence or absence of fog by comparing the mask to a plot of historic fog LWC magnitudes preceding a current, or real time, fog LWC estimate and determining a measure of correlation between the mask and pattern of fog LWC estimate values. In an exemplary embodiment, the fog inference program maintains, in working memory, a time series of recent fog LWC estimate values, for example a series of fog LWC estimate values measured during one or more cadence instances of the 30 minutes preceding a current cadence instance. If the pattern of previously calculated and current fog LWC estimate magnitude is similar in shape to the mask encoded by the fog time series rule ML model, the fog inference program can infer that fog is likely to be present.

Fog generally develops slowly while initiation of a significant precipitation event can be sudden. Therefore a rapid increase in estimated fog LWC magnitude relative to a baseline can indicate that precipitation is more likely while a gradual increase in fog LWC magnitude can indicate that fog is more likely. A first illustrative fog time series rule ML model includes predicting that fog is not present and making no fog (i.e. precipitation) inference determination if an increase in fog LWC magnitude greater than a threshold amount occurs over a particular time period. A second illustrative fog time series rule ML model includes predicting fog and making a fog inference determination if fog LWC estimate is part of a time series of fog LWC estimates characterized by a pattern of gradually increasing LWC magnitude. A third illustrative fog time series rule ML model includes a mask having a shape representing gradually increasing fog LWC magnitude over time.

In another embodiment, a fog time series rule ML model can include patterns of fog versus precipitation (or "fog/no fog") determinations that are indicative of a possible fog inference false alarm. For example, a time series pattern that includes multiple precipitation inferences followed by a single fog inference could predict that the single fog inference is incorrect since it is unlikely that precipitation will abruptly change to fog. A corresponding fog time series rule ML model requires that, if multiple previous inferences indicate precipitation, then multiple consecutive fog, inferences must be made before a fog inference is confirmed. In a similar manner, a time series that includes multiple consecutive fog inferences followed by a precipitation inference could be predictive of a those inference of a cessation of a fog event. A corresponding fog time series rule ML model requires multiple consecutive precipitation or no fog, inferences before a no fog inference is confirmed

6.3.2.1.8 Fog Transform Program (995)

The fog transform program (99) carries out fog transform creation process (4000) to pre-calculate transforms and filters useful for converting microwave attenuation collected data to weather parameter data including, for example, atmospheric water vapor and LWC estimates on or more system tile layers.

6.3.2.1 RVR Transform Program (324)

The RVR transform program (324) carries out RVR transform creation process (2300) to pre-calculate transforms and equations for determining RVR at locations of interest retrieved from a location of interest database (391). The pre-calculated RVR transforms are used by the RVR forecasting program of the co-filed application.

6.3.2.1.10 Machine Learning Training Data Preparation Module (677)

The machine learning (ML) training data preparation module (677) retrieves weather parameter data, for example data comprising features or predictors and corresponding outputs, from a system database (320) and processes the weather parameter data to generate machine learning model training, validation, and testing data formatted as a data frame suitable for processing into one or more ML models. The ML training data preparation module is configured to generate training data useful for initial training of a machine learning model and training data useful for retraining; or updating a previously trained machine learning model. Exemplary weather parameter data retrieved by the machine learning data preparation module includes processed collected and generated collected data, for example humidity processed collected data and fog LWC estimates, from current and previous cadence instances as well as previously calculated forecast generated data. The ML training data preparation module stores ML training, testing, and validation data in ML training data store (683). Processing of the retrieved data can include cleaning the data to remove outliers, interpolating or otherwise filling in missing data points, and removing erroneous or otherwise unneeded data and formatting the data in a date frame. In some embodiments, one or more these data cleaning operations are be carried out by other processes, for example MW link data collection programs (510a,b) and ML link data processing programs (615a,b). In some embodiments, the ML training data preparation module generates and pushes, or otherwise makes available, filters usable by the data collection and processing programs to perform data cleaning and formatting operations.

6.3.2.1.11 Machine Learning Training Module (678)

The ML training module (678) retrieves an untrained, partially trained, or previously trained ML model from the system database (320), retrieves ML training data from the ML training data store (683), and uses the training data to train or retrain the ML model, thereby generating a trained ML model, which it stores in the system database (320). The stored ML model includes algorithms from commercially available ML toolkits as well as custom algorithms and models. Some examples of types of predictive models include (without limitation) regression models (e.g., linear regression, logistic regression), classification and regression tree models, multivariate adaptive regression spline models and other machine learning models (e.g. Naïve Bayes, k-nearest neighbors, Support Vector Machines, Perceptron, gradient boosting, and random forest regression). In an exemplary embodiment, the ML model training module re-trains or updates a trained ML model by retrieving the trained model from a trained model store or the system database, retrieving training, data from the ML training data store, and using, the training data to perform additional model training. In further embodiments, the ML training module also directly retrieves data corresponding to features of a trained or untrained ML model from a system database. This retrieved data includes, for example, recent processed collected data and generated collected data. ML training module can incrementally improve the training of a model as the newly collected, processed, and generated data becomes available. The re-trained or updated ML model is stored in the system database. The ML training module is configured to execute a trained ML model to generate and update rules ML model(s) usable by one or more programs executed by the system. For example, fog time series analysis program (982), comprises a ML training module that is configured to execute a time series ML model with fog-related training data to generate fog time series rules ML model(s). In some embodiments, an offline/backend server (330) includes multiple ML training modules (i.e, ML678a, ML678b, etc. (not shown)) which are each configured to execute, train, and retrain one or more ML models.

The ML training module trains and, in some exemplary embodiments, periodically retrains, a fog predictive model to recognize sets of conditions and trends that occurred when attenuation-based fog inferences are likely to be correct or incorrect. The fog prediction model is a machine learning model or algorithm, for example a neural network algorithm, that is trained using fog-related weather parameter data and fog detection data to predict fog/no fog based on a particular set of current or forecasted weather parameter inputs. The fog predictive model. In an embodiment, the ML training module trains the fog predictive model with historic fog-related weather parameter data and data indicating locations of verified fog events. Fog-related weather parameter data includes static data and/or trends in data for atmospheric and other measurable parameters that can be related to or influence fog formation, for example: air temperature; ground temperature; water temperature; wind speed; wind direction; advection conditions; cloud cover; time of day; terrain characteristics; soil type; soil moisture; and vegetation characteristics.

The ML training module (678) trains one or more ML models usable for filtering collected data, for example usable by weather sensor data processing program (612) to filter collected or processes collected data. The ML training module trains the one or more ML models using historical weather parameter data and, in some embodiments, historical forecast data, retrieved from one or more system databases. In some embodiments, the ML training module executes a trained ML model to generate filtering parameters usable by other programs, for example by weather sensor data processing program (612), to filter collected or processes collected data. The ML training module saves the trained ML models and filtering parameters to system database (320).

6.3.1.1.12 Machine Learning Validation Module (679)

The ML model validation module (679) retrieves a trained ML model from the system database (320), retrieves evaluation data (i.e. testing, and validation data) from the ML training data store, and performs testing and validation operations using the trained model and the retrieved testing and validation data. In some exemplary embodiments, the ML validation module generates a quality metric, e.g., a model accuracy or performance metric such as variance, mean standard error, receiver operating characteristic (ROC) curve, or precision-recall (PR) curve, associated with the trained. ML model. For example, the ML model validation model generates the quality metric by executing the model and comparing predictions generated by the model to observed outcomes. The ML model validation module stores model quality metrics in the system database (320), associated with the trained ML model, and the system may not include a ML model validation store. In some exemplary embodiments, the ML model validation module periodically tests trained ML models using training data derived from processed collected or generated collected data and recalculates quality metrics associated with the trained ML models. In some embodiments, the ML training, module retrains a trained ML model if the system determines that an associated quality metric has deteriorated below a threshold amount. In some embodiments, trained ML models are retrained on a periodic schedule 6.3.3. Modeling and Prediction Server (360)

Also referring to FIG. 1, a third server (including a data processing component) is a modeling and prediction component that performs parallel computations for blending a plurality of weather data tile layers, generating precipitation estimates, fog inferences, and for preparing precipitation and fog forecasts. The server (360) retrieves weather parameter data, including processed collected data, generated collected data, and previously forecast data from the system database (320) and from other sources of processed data provided by the precipitation modeling and forecasting system. The modeling and prediction server executes one or more programs to perform various complex and processor intensive modeling and prediction algorithms and data manipulations used to prepare one or more precipitation estimates, fog inferences, and precipitation and fog forecasts which may be projected onto geographic maps in order to produce a real time precipitation map. In some embodiments, the server blends weather data from two or more tile layers in order to produce a generated tile layer of increased accuracy. The resulting generated data are written back to the system databases for later use and for sharing with the other servers of the precipitation modeling and forecasting system. The modelling and prediction server also implements the cadence manager, which controls the operation of the cadence-based programs. Alternatively, one or more of the newly generated forecast generated data are sent directly to the information distribution and alerting server (370) for use in notifying a user.

6.3.4 Information Distribution and Alerting Server (370)

Also referring to FIG. 1, a fourth server (including a data processing component), is an information distribution and alerting component (370) that retrieves information from the system database (320), or directly from the modeling and prediction server (360), and processes the data received therefrom. In some implementations, the information distribution and alerting server blends the information from the system database with map data to present a real time weather data (including precipitation) map. The information distribution and alerting server also provides a user interface by which a user can parameterize one or more aspects of the data collection and forecasts provided by the system.

6.3.5 System Database (320)

The system database (320), as depicted in FIG. 1, may include one or more individual databases (e.g. stored on each of the servers of the precipitation modeling and forecasting system (300)), and/or may include a centralized database server, including one or more logical databases, used to store data used to generate precipitation estimates and precipitation forecast models and or maps. The system database may also include an external database server or database service such as a cloud-based data storage service. Individual databases of the system identified throughout this document are part of the system database. These individual logical databases are listed in Table 4 below and are omitted from the drawings for clarity.

TABLE 4

Logical Databases (within System Database)

| Number | Name | Description |
| --- | --- | --- |
| 322 | Radar database | Contains radar processed data (621) including radar reflectivity data (545) and radar precipitation data (546) |
| 323 | Weather sensor database | Contains weather sensor data (522) and weather sensor processed data (622) |
| 324 | Other info database | Contains other info data (523) and other info processed data (623) |
| 325 | Precipitation forecast database | Contains forecast precipitation data (902) generated by precipitation forecasting program (915) |
| 329 | NWP model database | Contains NWP data (526) and NWP processed data (619) including, for example HRRR data |
| 350 | Storm objects database | Contains storm object data (548) generated from collected data, for example storm objects generated from radar reflectivity data (545) or radar precipitation data (546) by a radar data collection program (512) or by a radar data processing program (611). |
| 352a | Satellite microwave link attenuation database | Contains satellite link data including signal attenuation data (525a) and satellite microwave link processed attenuation data (625a) |
| 352b | Terrestrial microwave link attenuation database | Contains terrestrial microwave link data (525b) and terrestrial microwave link processed attenuation data (625b) |
| 355 | Forecast skill database | Contains calculated forecast skill metric data |
| 356a | Satellite microwave precipitation and atmospheric water vapor database | Contains satellite microwave precipitation intensity, atmospheric water vapor, or LWC estimates (626a) generated by satellite microwave link precipitation program (654a). |
| 356b | Terrestrial microwave link precipitation database | Contains terrestrial microwave link precipitation or LWC estimates (626b) generated by terrestrial microwave link precipitation program (654b) |
| 391 | Location of interest database | Contains locations of interest information, e.g. flag locations, polygon location and boundary definitions, and configuration information associated with locations of interest. |

TABLE 4-continued

Logical Databases (within System Database)

| Number | Name | Description |
|---|---|---|
| 392 | Accuracy Improvement database | Accuracy improvement details for precipitation sources by location. |
| 393 | Transform and filter database | Contains stored transforms and filters |
| 633 | Vehicle weather instrument characteristics database | Contains characteristics of vehicle weather instruments |
| 657 | Terrestrial microwave link topology database | Contains terrestrial network link endpoint locations, Tower ID's, transmitter and receiver characteristics, etc. Also includes satellite link endpoint locations (e.g. earth station locations). |
| 880 | Map database | Contains map data (528) and map processed data (628) |
| 923 | Forecast RVR database | Contains Forecast RVR data (922) |
| 929 | RVR location and ancillary data database | Contains locations at which RVR forecasts are desired and data useful for RVR calculations, such as runway light intensity, corresponding to the RVR locations |
| 997 | Fog predictive data model database | Contains fog predictive model data (996) generated by fog predictive model program (926) including predicted locations and intensity of fog based on atmospheric data |
| 998 | Fog inference data database | Contains fog forecast data (991) and fog inference data (999) including fog yes/no or probabilistic inference and, in some embodiments, fog LWC estimates. |

It should be noted that the physical processing and storage system have the data being read and written directly to one or more system databases, and organized within those databases so that the subsequent data access steps are efficient.

6.3.6 External Databases (349)

The system (300) as depicted in FIG. 1 may also access and use external databases (349), which are accessed by the information collection and normalization server (310) as appropriate. The information collected by the information collection and normalization server may be processed further by the server, and then written to one or more system databases (320), and the information is then shared with the other servers (330, 360, and 370) in the system, either directly or through the system database(s), for use in various weather related processing steps.

6.4 CADENCE 6.4.1 Cadence Cycles and Cadence Instances as Logical Processing Flow and Data Models The system described, herein operates a cadence cycle, a series of repeating processing steps that perform one or more of the following actions for each iteration: asynchronous collection and filtering of collected data, pre-processing collected data into weather parameter data, generating forecast weather data, and post-forecast processing. A group of related cadence cycles is called a cadence series. The system can support more than one set of cadence series at a time. The system manages sequence of cadence instances, one for each cadence cycle of a cadence series that is performed by the system. Cadence management and processing is described in more detail in the co-filed patent application.

Data collection and pre-processing is performed as to the forecast processing in the cadence cycle, with collected and processed data being associated with one or more cadence instance(s) at the time the data is written to a system database.

The data collection and processing for each cadence cycle iteration are represented by a data construct called a cadence instance. In an embodiment, each cadence instance is represented by a cadence instance data structure stored in a system database that serves as a "master control record" for cadence cycle processing. Data collected or generated during the processing of the cadence cycle is associated with at least one cadence instance data structure. For ease of understanding, we refer to a cadence instance by the abbreviation $M_i$, where (i) is the cadence instance ID. The cadence instance ID can be a unique identifier, or simply a constantly increasing number such as a system clock count or even a monotonically increasing value.

A cadence instance comprises multiple tile layers, generally one tile layer for each type of data collected during a cadence cycle. A tile layer is a structure for organizing data associated with a cadence instance. Each the layer has a set of defined characteristics, represented as a series of "tiles." Tile layers are logically grouped into tile layer stacks, based upon the stage of the cadence cycle that they are created, e.g. a collection data tile stack, a forecast data rile stack, a post-forecast data tile stack. Each tile layer and tile layer stack (and the data comprising those tile layers) includes identifying labels and/or timestamps, as well as an indication of the processing program that created it. The data is tagged with these identifying labels. The cadence timestamp represents the time at which the cadence index was incremented and is used in the cadence cycle process to adjust for collection delays. The forecast timestamp represents the time at which a forecast cycle was started or stopped.

Each collected data stack Mi includes a cadence timestamp, cadence instance number (i.e. the i of Mi) and cycle timestamp. Each forecast stack includes forecast cycle timestamp and is identified by cadence instance (Mi) and forecast cycle number (i.e. the j of MiFj). The collection data stack Mi includes a collection data tile layer corresponding to each type of weather parameter data generated from collected data during processing, for example the collected data stack Mi includes a tile layer for each type of collected processed data and for each type of generated collected data generated during processing.

The amount of time between cadence cycles is called a cadence interval. Cadence intervals may vary based upon the configuration of the system and the current type of weather data being processed. Typical cadence intervals can be as short as 1 or 2 minutes, 5 minutes, 10 minutes, or longer. Cadence interval times are correlated to frequency of forecast, as a new forecast is generated for each cadence interval.

Since the collected and forecast generated data may be represented as a grid, individual and sets of logically related data elements can be identified as shown in Table 5 below:

TABLE 5

| General Processing | |
|---|---|
| Reference notation | Description |
| $M_i$ | Cadence instance |
| $M_i$ collected data | The collected data associated with the $M_i$ cadence instance. |
| $M_i$ collected data (tile layer name) | A named tile layer corresponding to a specific input source collected as part of the $M_i$ cadence instance. |
| $M_i$ collected data (tile layer name) tile [x, y] | A specific tile in a collected data named tile layer, identified by its location in the tile layer. Note that indexing may be [x, y, z] for 3D tile layers. |
| $M_i F_j$ | A specific forecast cycle (j) of the $M_i$ cadence instance |
| $M_i F_j$ tile layer name | A named tile layer corresponding to the output of a post-processing or forecast cycle forecast execution. |
| $M_i F_j$ tile layer name tile [x, y] | A specific tile in forecast cycle (j)'s named tile layer, identified by its location in the tile layer. Note that indexing may be [x, y, z] for 3-D tile layers. |

The table below identifies the pre-, post- and forecast processing programs and the tile layers that their output data are associated with.

TABLE 6

Processing Programs and Associated Output Data Tile Layers

| Data type | Collection Program/Data Source | Database | Post processing, estimate generation, or forecasting program | $M_i$ layer reference name | Parameters | Units | Notes |
|---|---|---|---|---|---|---|---|
| Terrestrial microwave link data (525b) | Microwave data collection program (510b) | Terrestrial microwave link attenuation database (352b) | Terrestrial microwave link data processing program (615b) | None | TSL, RSL | dB | |
| Terrestrial microwave link processed attenuation data (625b) | Terrestrial microwave link attenuation database (352b) | Terrestrial microwave link attenuation database (352b) | None | None | Attenuation | dB | |
| Terrestrial microwave link precipitation estimates (626b) | Terrestrial microwave link attenuation database (352b) | Terrestrial microwave link precipitation database (356b) | Terrestrial microwave link precipitation program (654b) | Collection: Terrestrial microwave precipitation tile layer (2022b) | a. Precipitation intensity<br>b. Precipitation type<br>c. Precipitation intensity accuracy<br>d. Precipitation intensity spatial resolution | a. mm/hr or in/hr<br>b. Hail, sleet, rain, snow<br>c. %,<br>d. m, km, ft, miles | a. At ground level<br>b. At ground level<br>c. accuracy of microwave vs. radar precipitation intensity accuracy<br>d. Function of link spacing |
| Satellite link raw data including signal attenuation information (525a) | Satellite microwave data collection program (510a) | Satellite microwave link attenuation database (352a) | Satellite microwave link data processsing program (615a) | None | TSL, RSL | dB | |
| Satellite microwave link processed attenuation data (625a) | Satellite microwave link attenuation database (352a) | Satellite microwave link attenuation database (352a) | None | None | Attenuation | dB | |
| Satellite microwave precipitation estimates (626a) | Satellite microwave link attenuation database (352a) | Satellite microwave precipitation and atmospheric water vapor database (356a) | Satellite microwave link precipitation program (654a) | Collection: Satellite microwave precipitation and atmospheric water vapor tile layer (2022a) | a. Precipitation intensity<br>b. Precipitation type<br>c. atmosphere water vapor or LWC<br>d. Precipitation intensity or atmospheric water vapor accuracy<br>e. Precipitation intensity, | a. mm/hr or in/hr<br>b. Hail, sleet, rain, snow<br>c. gr/cm³<br>d. %,<br>e. m, km, ft, miles | a. At ground level<br>b. At ground level<br>c. Ground level or selected atmospheric height<br>d. accuracy of microwave vs. radar precipitation intensity accuracy or atmospheric water vapor accuracy<br>e. Function of link spacing |

TABLE 6-continued

Processing Programs and Associated Output Data Tile Layers

| Data type | Collection Program/Data Source | Database | Post processing, estimate generation, or forecasting program | $M_i$ layer reference name | Parameters | Units | Notes |
|---|---|---|---|---|---|---|---|
| | | | | | atmospheric water vapor, or LWC spatial resolution | | |
| Weather sensor data (522) | Weather sensor data collection program (513) | Weather sensor database (323) | Weather sensor data processing program (612) | None | a. Precipitation intensity<br>b. Temperature<br>c. Humidity<br>d. Wind speed<br>e. Wind direction<br>f. Atmospheric pressure<br>g. Dew point<br>h. Visibility<br>i. Vehicle radar attenuation<br>j. Other vehicle sensor data | a. mm/hr or in/hr<br>b. ° C. or ° F.<br>c. % of saturation<br>d. km/hr, or miles/hour<br>e. Compass direction<br>f. mmHg, mPa<br>g. ° C. or ° F.<br>h. km or miles<br>i. dB<br>j. Other vehicle sensor data units | a. Ground level/altitude<br>b. Ground level/altitude<br>c. Ground level/altitude<br>d. Ground level/altitude<br>e. Ground level/altitude<br>f. Ground level/altitude<br>g. Ground level/altitude<br>h. Ground level/altitude<br>i. Can be attenuation or received signal strength<br>j. For example, sensor data needed to determine radar reflectivity factor (Z)or weather |
| Weather sensor processed data (622) | Weather sensor database (323) | Weather sensor database (323) | None | Collection: Weather sensor tile layer (2021) | a. Precipitation intensity<br>b. Temperature<br>c. Humidity<br>d. Wind speed<br>e. Wind direction<br>f. Atmospheric pressure<br>g. Dew point<br>h. Visibility<br>i. Vehicle radar attenuation<br>j. Other vehicle sensor data | a. mm/hr or in/hr<br>b. ° C. or ° F.<br>c. % of saturation<br>d. km/hr, or miles/hour<br>e. Compass direction<br>f. mmHg, mPa<br>g. ° C. or ° F.<br>h. km or miles<br>i. dB<br>j. Other vehicle sensor | a. Ground level altitude<br>b. Ground level altitude<br>c. Ground level altitude<br>d. Ground level altitude<br>e. Ground level altitude<br>f. Ground level altitude<br>g. Ground level altitude<br>h. Ground level altitude<br>i. Can be |

TABLE 6-continued

Processing Programs and Associated Output Data Tile Layers

| Data type | Collection Program/Data Source | Database | Post processing, estimate generation, or forecasting program | M$_i$ layer reference name | Parameters | Units | Notes |
|---|---|---|---|---|---|---|---|
| | | | | | | data units | attenuation or received signal strength j. For example, sensor data needed to determine radar reflectivity factor (Z) or weather |
| NWP data (526) | NWP data collection program (532) | NWP ground weather database[1] (353) NWP model atmospheric database (329) | NWP data processing program (616) | None | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. °C. or °F.<br>c. % of saturation<br>d. km/hr, or miles/hour<br>e. Compass direction<br>f. mmHg, mPa<br>g. °C. or °F.<br>h. km or miles | a. Ground level or atmospheric<br>b. Ground level or atmospheric<br>c. Ground level or atmospheric<br>d. Ground level or atmospheric<br>e. Ground level or atmospheric<br>f. Ground level or atmospheric<br>g. Ground level or atmospheric<br>h. Ground level or atmospheric |
| NWP processed ground level data (619b) | NWP ground weather database[1] (353) | NWP ground weather database[1] (353) | None | Collection: NWP weather tile layer (2024) | a. Precipitation intensity<br>b. Temperature<br>c. Humidity<br>d. Wind speed<br>e. Wind direction<br>f. Atmospheric pressure<br>g. Dew point<br>h. Visibility | a. mm/hr or in/hr<br>b. °C. or °F.<br>c. % of saturation<br>d. km/hr, or miles/hour<br>e. Compass direction<br>f. mmHg, mPa<br>g. °C. or °F.<br>h. km or miles | a. Ground level<br>b. 3 m above ground level<br>c. 3 m above ground level<br>d. 10 m above ground level<br>e. 10 m above ground level<br>f. at sea level<br>g. 10 m above ground level<br>h. 10 m above ground level |
| NWP model processed atmospheric data | NWP model atmospheric database (325) | NWP model atmospheric database (325) | None | Collection: NWP tile layer (2024) | a. Precipitation intensity<br>b. Temperature<br>c. Humidity | a. mm/hr or in/hr<br>b. °C. or °F. | a. Ground level or atmospheric<br>b. Ground level or atmospheric |

TABLE 6-continued

Processing Programs and Associated Output Data Tile Layers

| Data type | Collection Program/Data Source | Database | Post processing, estimate generation, or forecasting program | M_i layer reference name | Parameters | Units | Notes |
|---|---|---|---|---|---|---|---|
| (619a) | | | | | d. Wind speed<br>e. Wind direction<br>f. Atmospheric pressure<br>g. Dew point<br>h. Visibility | c. % of saturation<br>d. km/hr, or miles/hour<br>e. Compass direction<br>f. mmHg, mPa<br>g. °C. or °F.<br>h. km or miles | c. Ground level or atmospheric<br>d. Ground level or atmospheric<br>e. Ground level or atmospheric<br>f. Ground level or atmospheric<br>g. Ground level or atmospheric<br>h. Ground level or atmospheric |
| Forecast precipitation data (902) | One or more of:<br>a. Satellite microwave and atmospheric water vapor precipitation database (356a);<br>b. Terrestrial microwave link precipitation database (356b); and<br>One or more of:<br>c. NWP model atmospheric database (329);<br>d. Precipitation forecast database (325); and<br>e. Weather sensor database (323) | Precipitation forecast database (325) | Precipitation forecasting program (915) | Forecast (j): Forecast precipitation tile layers (2031) | a. Precipitation intensity<br>b. Precipitation type<br>c. Precipitation intensity accuracy at specified location<br>d. Precipitation intensity spatial resolution at specified location | a. mm/hr or in/hr<br>b. Hail, sleet, rain, snow<br>c. %,<br>d. m, km, ft, miles | a. At ground level<br>b. At ground level<br>c. accuracy of microwave vs. radar precipitation intensity accuracy; function of number of links per area for microwave precipitation estimates<br>d. Function of microwave link grid spacing |
| Other info data (523) | Other info data collection program (514) | Other info database (324) | Other info data processing program (613) | Optional additional collection tile layer (2025) | | | |
| Fog predictive model data (996) | One or more of:<br>a. NWP model atmospheric database (329);<br>b. NWP ground weather | Fog predictive model data database (997) | Fog predictive model program (926) | Fog predictive model data layer | Fog presence and intensity (e.g. LWC) | Yes/no; gr/cm³ | |

TABLE 6-continued

Processing Programs and Associated Output Data Tile Layers

| Data type | Collection Program/Data Source | Database | Post processing, estimate generation, or forecasting program | M$_i$ layer reference name | Parameters | Units | Notes |
|---|---|---|---|---|---|---|---|
| | database[1] (353); and c. Weather sensor database (323) | | | | | | |
| Fog inference data (999) | One or more of a. Satellite microwave precipitation and atmospheric water vapor database (356a); b. Terrestrial microwave link attenuation database (352b); and c. Satellite microwave link attenuation database (352a) | Fog inference data database (998); or one or more of: a. Satellite microwave and atmospheric water vapor precipitation database (356a); b. Terrestrial microwave link precipitation database (356b); | Fog inference Program (919); or one or more of: Terrestrial microwave link precipitation program (654b); and Satellite microwave link precipitation program (654a) | Satellite microwave precipitation and atmospheric water vapor tile layer (2022a); or one or more of: a. Satellite microwave precipitation and atmospheric water vapor database (356a); b. Terrestrial microwave link precipitation database (356b); | Fog presence and intensity (e.g. LWC) | Yes/no; gr/cm$^3$ | a. Fog inference program (919) can be a component of one or more precipitation programs (654a, 654b) b. For inference data and/or LWC or other fog intensity estimates can be stored in a dedicated fog database/tile layer or as elements of a microwave link database and tiles of a microwave precipitation tile layer |
| Fog Forecast Data (991) | Fog inference data database (998); or one or more of: a. Terrestrial microwave link precipitation database (356b); c. Satellite microwave precipitation and atmospheric water vapor database (356a) | Fog Forecast Data Database (990); or Precipitation forecast database (325) | Fog forecasting program (931) | Forecast (j): Forecast fog/LWC tile layers; or Forecast (j): Forecast precipitation tile layers (2031) | For presence and intensity (e.g. LWC) | Yes/no; gr/cm$^3$ | Fog forecast data can be stored in dedicated fog forecast database and tile layer or can be components of precipitation forecast database and tile layers |

[1]Ground level NWP data is extracted from full atmospheric NWP data set and stored in ground weather database.

Some collection processes do not organize the information collected by cadence. Often this data is configuration data that is used in the generation of pre store transforms. Examples are shown in Table 7 below:

TABLE 7

Configuration Data

| Data type | Collection program | Database | Usage notes |
|---|---|---|---|
| Map data | Map data collection program (517) | Map database (880) | Generating base maps, determining geographic features (e.g. runway locations and size/shape), and determining elevations of ground locations (e.g. elevations of microwave transmitter and receiver locations). |
| Terrestrial microwave network topology | Microwave data collection program (510b) | Terrestrial microwave link topology database (657) | Locations are used for creating terrestrial microwave precipitation grid. |
| Terrestrial microwave tower and signal characteristics | Microwave data collection program (510b) | Terrestrial microwave link topology database (657) | Terrestrial microwave precipitation grid creation; Microwave precipitation link-to-grid and grid-to-tile transforms. |
| Terrestrial microwave link status updates | Microwave data collection program (510b) | Terrestrial microwave link topology database (657) | Update terrestrial microwave precipitation grid and microwave precipitation link-to-grid and grid-to-tile transforms. |
| Satellite microwave link location and characteristics data | Satellite microwave data collection program (510a) | Satellite microwave link ephemeris information database (390) | Used to populate ephemeris data tables including orbit data and satellite locations as a function of time intervals. Satellite microwave link to tile transform. |
| Location of interest definitions | HyperCast program (890) | Location of interest database (391) | Identify locations and areas for weather information reporting. Used to create weather parameter reporting and forecasting transforms. |
| Vehicle weather sensor characteristics | Weather sensor data collection program (513) | Vehicle weather instrument characteristics database (633) | Vehicle weather parameter data processing. |
| Additional data | Other info data collection program (514) | Other info database (324) | |
| Fog time series rules ML models (984) | Fog time series analysis program (982) | Fog time series rules database (986) | Rules used by fog inference program (919) to determine if patterns of attenuation are indicative of fog. Fog time series rules ML models (984) can be pre-determined or can be calculated and/or updated during cadence operation of the precipitation modeling and forecasting system (300) |

Once the collected data is collected, filtered, pre-processed, and organized, the asynchronous collection cycle can repeat, optionally storing additional data in a cadence instance, or overwriting any previously collected data.

At the end of a collection cycle, the cadence index is incremented. Collection processes continue writing their newly collected data associated with the new cadence index. Processing of recently collected data will be completed using the previous (un-incremented) cadence index that it was assigned when collected. Subsequent data collected will be stored using the incremented cadence index. The time at which the cadence index was incremented is called the cadence timestamp, and is used in the forecasting process to adjust for collection delays.

6.4.2 Collection Post-Processing Programs

The collection post-processing programs operate on the collected data of the current cadence instance and upon the collected and forecast generated data of previous cadence instances. Post-processing operates by executing programs that read the data associated with one or more cadence instance tile layers, performing calculations on this data, and storing the data in a data type specific database so as to create one or more tile layers in the $F_0$ data stack of the current cadence instance.

Pre-processing of collected data into weather parameter data includes extrapolating collected data from native coordinate systems to the coordinate system of a tile layer of collection data tile stack Mi. Pre-processing includes, for example, extrapolating data collected from a radar data source from a coordinate system used by the radar data source to the coordinate system and scale of the forecasting system. Pre-processing further includes generating weather parameter data based on collected data, for example by transforming collected microwave attenuation data to precipitation estimates mapped to a system the layer. For example, a collection data stack Mi can include a weather sensor tile layer comprising sensor data collected during the Mi cadence cycle processed to create processed collected, weather sensor data mapped to system tile. Each collected processed or collected generated data tile layer, and data mapped to the tile layer, is tagged with the cadence identifier Mi and Mi cadence time stamp and is saved to a database specific for the type of data. For example, processed collected weather sensor data is mapped to Mi weather sensor tile layer, tagged with the Mi identifier and with the Mi cadence time stamp, and saved to a weather sensor data database.

6.4.3 Pre-Calculated Filters and Transforms

Pre-calculated and pre-stored filters and transforms, stored in transform and filter database (393) permit the efficient processing of collected data by pre-calculating aspects of the variable portions of the complex mapping and forecasting equations, which in turn simplifies the post-collection processing required. This has the effect of significantly speeding up the processing of the collected data.

Some filters and transform are provided with the system, others are calculated by information collection and normalization server (310 of FIG. 1) or offline/background processing server (330 of FIG. 1) in response to collected data, or are stored (cached) after they are computed (such as with radar transforms). The offline/background processing server (330) can periodically, for example in response to collected data, recalculate one or more filters or transforms and replace a pre-stored filter or transform with the recalculated filter or transform. The system suspends cadence post-collection processing and forecasting when offline/background processing server (330) is updating a filter or transform. A transform can include a one or more types of transforms selected from a clipping transform, data conversion transform, data mapping transform, coordinate mapping transform.

TABLE 8

Pre-Stored Filters and Transforms

| Type | Calculating program | Use program | Comments |
|---|---|---|---|
| Filter | | | |
| Terrestrial microwave link frequency filter | Terrestrial microwave link data processing program (615b) or pre-configured | Terrestrial microwave link data processing program (615b) or terrestrial microwave data collection program (510b) | Excludes non-microwave transmissions; excludes transmissions on frequencies below a specified frequency; for example below 5 GHz |
| Terrestrial microwave link received signal strength filter | Terrestrial microwave link data processing program (615b) or pre-configured | Terrestrial microwave link data processing program (615b) or terrestrial microwave data collection program (510b) | Excludes microwave link measurements with received signal strength below a specified threshold; removes inactive links and links for which signal strength was not accurately measured. |
| Satellite microwave link frequency filter | Satellite microwave link data processing program (615a) or pre-configured | Satellite microwave link data processing program (615a) or satellite microwave data collection program (510a) | Excludes non-microwave transmissions; excludes transmissions on frequencies below a specified frequency; for example below 5 GHz. |
| Satellite microwave link received signal strength filter | Satellite microwave link data processing program (615a) or pre-configured | Satellite microwave link data processing program (615a) or satellite microwave data collection program (510a) | Excludes satellite microwave link measurements with received signal strength below a specified threshold; removes inactive links and links for which signal strength was not accurately measured. |
| Vehicle weather sensor data predicted parameter filter | Weather sensor data processing program (612) or pre-configured | Weather sensor data processing program (612) or weather sensor data collection program (513) | Excludes vehicle collected data that differs by a threshold amount from predicted weather parameter data; removes possible erroneous measurements. |
| Vehicle weather sensor data collection conditions filter | Weather sensor data processing program (612) Vehicle or pre-configured | Weather sensor data processing program (612) or weather sensor data collection program (513) | Excludes vehicle collected data based on collection conditions; removes measurements made under conditions where measurements are known to not be reliable. |
| Vehicle weather sensor data radar attenuation magnitude filter | Weather sensor data processing program (612) Vehicle or pre-configured | Weather sensor data processing program (612) or weather sensor data collection program (513) | Excludes radar attenuation data with attenuation magnitude below a specified threshold; excludes radar measurements with too little attenuation to be indicative of weather-related phenomena |

TABLE 8-continued

Pre-Stored Filters and Transforms

| Type | Calculating program | Use program | Comments |
|---|---|---|---|
| Vehicle weather sensor data radar frequency filter | Weather sensor data processing program (612) Vehicle or pre-configured | Weather sensor data processing program (612) or weather sensor data collection program (513) | (precipitation, fog, etc.). Excludes non-microwave radars; excludes radars operating on frequencies below a specified frequency; for example below 5 GHz. |

Transforms

| Type | Calculating program | Use program | Comments |
|---|---|---|---|
| Terrestrial microwave link baseline transform | Terrestrial microwave link data processing program (615b) | Terrestrial microwave link data processing program (615b) | Transforms link attenuation to attenuation due to precipitation, atmospheric water vapor, or fog. |
| Satellite microwave link baseline transform | Satellite microwave link data processing program (615a) | Satellite microwave link data processing program (615a) | Transforms link attenuation to attenuation due to precipitation, atmospheric water vapor, or LWC. |
| Terrestrial microwave link-to-grid transform | Terrestrial microwave link data processing program (615b) | Terrestrial microwave link precipitation program (654b) | Transforms terrestrial microwave link measurements to weather parameter estimates on a static microwave link grid. |
| Terrestrial microwave grid-to-tile transform | Terrestrial microwave link data processing program (615b) | Terrestrial microwave link precipitation program (654b) | Transforms static grid weather parameter estimates to terrestrial microwave precipitation, atmospheric water vapor, or fog tile precipitation, atmospheric water vapor, or LWC estimates on tile layers. |
| Satellite network link-to-grid transform | Satellite microwave link data processing program (615a) | Satellite microwave link precipitation program (654a) | Transforms satellite network link measurements to satellite microwave precipitation, atmospheric water vapor, or LWC estimates on one or more static microwave grids. |
| Satellite network grid-to-tile transform | Satellite microwave link data processing program (615a) | Satellite microwave link precipitation program (654a) | Transforms satellite network grid weather parameter estimates to microwave precipitation, atmospheric water vapor, or fog tile precipitation estimates on one or more system tile layers. |
| Combined terrestrial and satellite network link-to-grid transform | Satellite microwave link data processing program (615a) or Terrestrial microwave link data processing program (615b) | Satellite microwave link data processing program (615a) or Terrestrial microwave link data processing program (615b) | Transforms combined terrestrial and satellite microwave link attenuation to combined terrestrial and satellite microwave weather parameter estimates on one or more static microwave grids. |
| Combined terrestrial and satellite network grid-to-tile transform | Satellite microwave link data processing program (615a) or Terrestrial microwave link data processing program (615b) | Satellite microwave link data processing program (615a) or Terrestrial microwave link data processing program (615b) | Transforms combined terrestrial and satellite microwave weather parameter estimates from one or more static microwave grids to one or more system tile layers. |
| NWP data transform | NWP data processing program (616) | NWP data processing program (616) | Transforms NWP data from NWP data coordinates to tiles. |
| Fog transform | Fog Inference Program (919) | Fog Inference Program (919) | Transforms microwave link attenuation data to LWC estimates |
| Vehicle weather data to tile transform | Weather sensor data processing program (612) | Weather sensor data processing program (612) | Transforms collected vehicle weather data coordinates to tiles. |

A partial list of exemplary filters and transforms is included in Table 8. Additional filters used to process vehicle weather sensor data are listed in Table 3.

6.5 OVERVIEW OF METHODS OF REDUCING COMPUTATIONAL REQUIREMENTS OF THE SYSTEM

Computational loads on weather forecasting systems are high. This high computational load prevents traditional linear processing of real time data. The techniques described in this section, when combined an optimized processing pipeline that removes processing bottlenecks, substantially reduce the real time processing loads on the system.

6.5.1 Pro Forma Microwave Link Segment Endpoint and Weather Sensor Location Grid and Pro Forma Links The system described herein operates in ways to reduce the time and computational requirements for the calculating weather parameter data based upon satellite-to-earth station microwave link attenuation. One way the system achieves this outcome is to reduce the computational requirements of calculating complex satellite to earth station geometries by pre-computing as much of the calculations as possible, and reducing the complexity of the calculations by using computational shortcuts. One such computational shortcut is the use of pro forma microwave link endpoint locations, which enables the use of pre-computed pro forma microwave links, which in turn permit the use of pre-calculated transforms that include all the necessary satellite to earth station geometries.

In an exemplary embodiments the pro forma microwave link endpoint locations include pro forma satellite and ground station locations, i.e. endpoints of pro-forma microwave satellite links. In additional embodiments, pro forma microwave link endpoint locations include pro locations of other microwave link endpoints, for example terrestrial satellite mast locations and mobile microwave link endpoint locations. Pairs of pro forma microwave link endpoint locations serve as endpoints of one or more additional types of microwave links, for example a microwave link between an antenna mast to mobile microwave link endpoint such as a vehicle mounted microwave transceiver. In still further embodiments, pro forma locations include weather sensor locations, for example vehicle-mounted weather sensor locations. In some exemplary embodiments, a weather sensor data collection or processing program (e.g., 513 or 612) maps a location of a weather sensor indicated in a location field of a collected data point to a nearby pro-forma weather sensor location.

Traditional satellite-to-earth station microwave links provide link-based attenuation data, which can be used to calculate attenuation-based weather parameter data values, for example the amount of water vapor or rainfall along the length of the link, in a manner substantially similar to that used for known tower-based microwave links. Note that a satellite-to-earth station microwave link may be transmitted from the satellite and received by the earth station, or may be transmitted by the earth station and received by the satellite, or there may be two or more microwave links the satellite and earth station, with at least one microwave link in each direction. Unlike tower-based microwave links, satellite-to-earth station microwave links may have a moving satellite or earth station endpoint, and thus have varying link lengths (and thus varying distance-related baseline attenuation). The system uses some computational shortcuts in order to pre-compute most of the complex geometry required to determine the link length and attenuation contribution of the portion of the atmosphere through which it passes.

In an exemplary embodiment, the system generates a pro forma satellite location grid across the sky, for example at an elevation corresponding to a satellite orbit, and a pro forma earth station location grid across the earth at ground level, and identifies a number of strata of interest between the pro forma location grids. The size of cells comprising pro forma location grids may vary. The grid cell size is chosen to minimize subsequent mapping to tile layers and so that the spatial geometry of a microwave link traversing from any location within a sky grid cell to any location within an earth grid cell does not significantly vary the length of the computed microwave link segments within the earth's atmosphere. The center of each grid cell (of both satellite and earth station pro forma location grids) is chosen as a pro forma location. The system pre-computes the spatial geometry between pairs of pro forma satellite location and pro forma ground station locations. This calculation is replicated for each pro forma earth station location and pro forma satellite location pair to produce a lookup table of pro forma microwave links. The system pre-computes baseline attenuation and link segmentation information for each pro forma link and stores the data in a system database. This pre-computed link data is used during processing of the satellite-to-earth station microwave link attenuation values in lieu of calculating the complex geometries and attenuation allocations each time a link attenuation value is received by the system. This approach substantially reduces the compute resources required. This section outlines how the system generates pre-calculated transforms that include the pre-computed attenuation and link segmentation data.

As mentioned above, the system pre-computes pro forma grid locations of satellite and earth station satellite microwave link endpoints and stores these grid locations in a database. It also precomputes pro forma satellite-to-earth station microwave links between all pairs of the pro forma link endpoint locations and stores this information in a database as well. Pre-computed filters and geometric transforms are calculated for each pro forma satellite-to-earth station microwave link. The filters and geometric transforms are used by the system to convert, using sets of equations encoded in the transforms, a collected microwave link attenuation measurement value into a set of attenuation-based weather parameter data estimates in regions of a plane onto which the link, or a section of the link, is projected and to transform the measurement values to system tiles and the layers corresponding to the plane. By mapping satellite and ground station locations to pro forma endpoint locations, obtaining the geometry and baseline attenuation of satellite-to-earth station microwave link between pro-forma endpoint locations becomes a simple table lookup from a pro forma link database. The precomputed transforms and filters associated with the pro forma satellite-to-earth station microwave link enables real time processing of the received attenuation data into a set of microwave link sections mapped to ground-level or atmospheric altitude level planes with a portion of the baselined attenuation allocated to each segment.

The system combines a complex set of location mapping, microwave link segmentation, and attenuation-to-weather parameter estimates and estimates to tile layer calculations required to intra a single transform. This enables the system to pass collected attenuation data for a satellite-to-earth station link through the precomputed transform once and obtain attenuation-based weather parameter data estimates, far example precipitation, atmospheric water vapor, or LWC estimates, for each affected tile of each affected tile layer by processing a single set of equations with the received attenuation as the variable. This approach provides a large improvement over known methods that require approximately four dozen discrete operations and calculations normally. This approach is also flexible, as the pro forma microwave link endpoints, pro forma microwave link data, and the associated transforms are all pre-computed and stored in a database. They may be updated as needs dictate.

This type of processing optimization, when combined with the processing architectures described herein, enable the real-time calculation of weather parameter data based upon satellite microwave link signal attenuation.

6.5.1.1 Exemplary Pro Forma Satellite Link Grids

Figure 5:
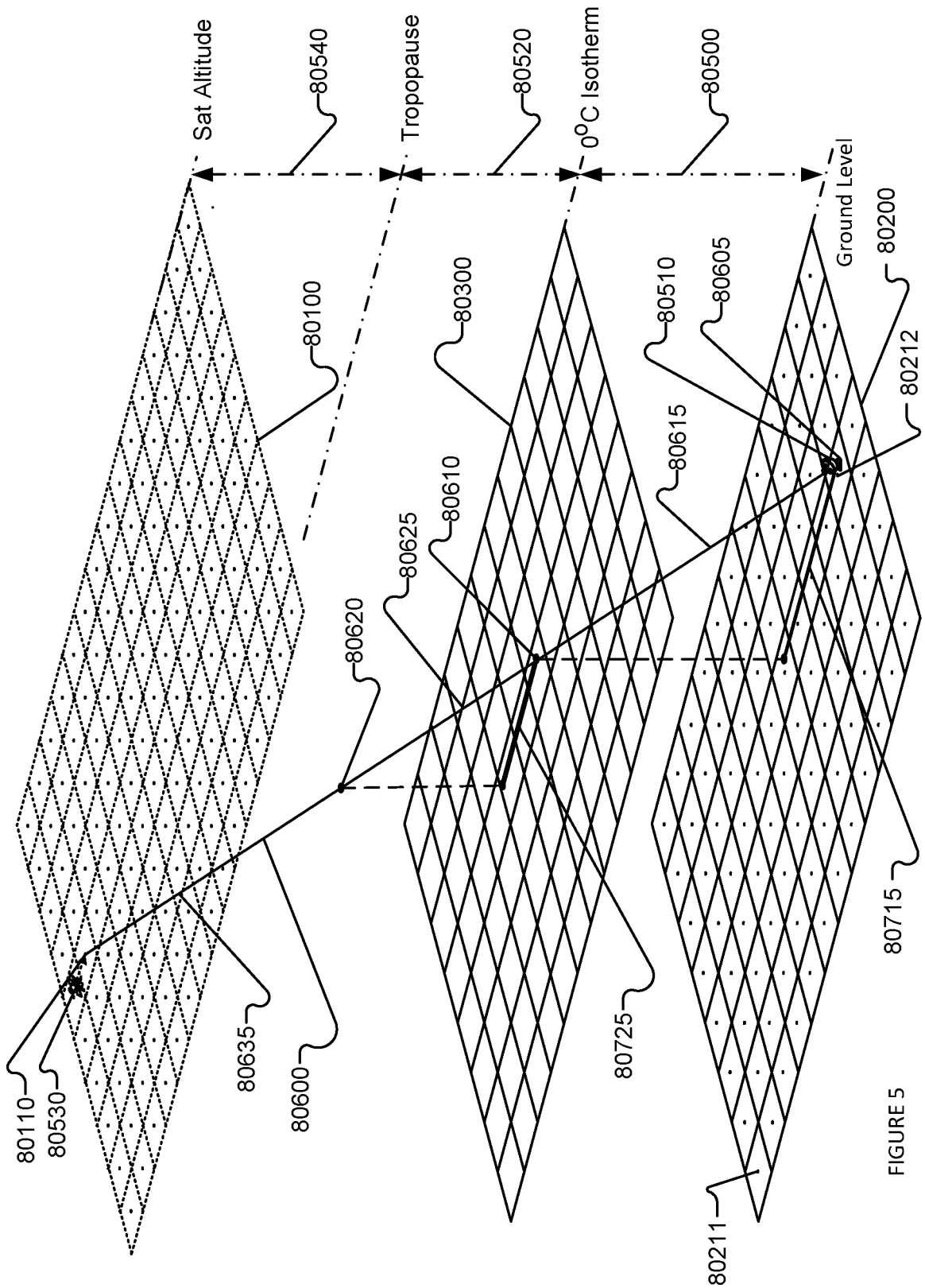
FIG. 5 depicts a perspective view of (one of many) pro forma satellite locations, pro forma satellite links, pro forma satellite link segments, etc. created for one of the satellite/earth station pairs according to an illustrative embodiment.

FIG. 5 illustrates a pro forma satellite location grid (80100) configured to divide a region of the atmosphere into grid cells to which an orbital location of a satellite, for example, a low earth orbit (LEO) or mid-earth orbit (MEO) satellite, can be mapped. In the illustrated embodiment grid cells are depicted as planar cells. In additional exemplary embodiments, grid cells are curved, curvilinear, or spherical without loss of functionality. In an embodiment, the pro forma satellite location grid divides the atmosphere into multiple roughly square cells, each comprising two degrees of latitude on one side and two degrees of longitude on a second side that is disposed normal to the first side. Other cell sizes and shapes may be used when desired. In an embodiment, pro forma satellite locations are spaced such that a satellite to earth station microwave link has at least ½° angle resolution, i.e. that a change of link angle of greater than ½° will result in change of pro forma satellite location. A pro forma satellite location, indicated by a black dot (e.g. 80110), is located at the center of each grid cell. Each pro forma satellite location can comprise a satellite endpoint of a satellite-to-earth station pro forma link.

In additional embodiments (not shown), a plurality of pro forma satellite location grids, each substantially similar to grid (80100) are each located at one of a plurality of elevations including, for example, a first pro forma satellite location grid at a LEO elevation and a second pro forma satellite location grid at a MEO elevation. In some embodiments, spacing between pro forma locations can be different in each grid, hi general, grid spacing is selected such that as few pro forma locations as possible are defined while maintaining an acceptable level of error in the resulting geometry due to satellite location and pro forma location mismatch. In some embodiments, a satellite location grid is constructed to map pro forma satellite locations for a group of earth stations, e.g., for all earth stations within a geographic region. In another embodiment the system constructs a separate pro farina satellite location grid for each of multiple earth stations.

A lower grid (80200) is located at ground level, and includes a plurality of pro forma earth station locations (e.g., 80211, 80212), each represented by a black dot in the center of a tile or cell of lower grid (80200). Each pro forma earth station location comprises an earth station end of a pro farina satellite-to-earth station link.

Upper grid (80300) is located at 0° C. isotherm. The altitude of the upper tile grid may vary depending upon the time of year or other factors. Additional grids may be used, and their altitude chosen in order to isolate particular atmospheric characteristics important for atmospheric modeling. For example, a fixed altitude such as 500 meters above ground may be used instead of or in addition to the isotherm-based altitude grid depicted. Grids (80200, 80300) may be chosen to represent satellite microwave precipitation and atmospheric water vapor tile layers of a tile stack, or an independent grid may be used and the resulting data mapped to one or more tile layers as needed. Lower grid (80200) corresponds to a satellite microwave precipitation and atmospheric water vapor tile layer for satellite microwave precipitation or atmospheric water estimates near ground level, for example, for a ground level to 500 m atmospheric layer. Upper grid (80300) corresponds to a satellite microwave precipitation and atmospheric water vapor tile layer for satellite microwave precipitation or atmospheric water estimates of an atmospheric layer bounded by the 0° C. isotherm and the upper limit of the troposphere, located at the tropopause.

As mentioned above, the pro forma microwave satellite links are precomputed by the system between each pro forma satellite location and each pro forma earth station location. For example, a pro forma satellite microwave link (e.g, 80600) is precomputed between each pro forma satellite location (e.g., 80110) and pro forma earth station location (e.g., 80212).

Because the link length from satellite to earth is relatively long, the satellite-to-earth station link geometries are similar for a locus of points around the pro forma satellite and earth station locations, and thus the length of the microwave link is therefore similar. The baseline attenuation for a microwave link is related to its length, so all links between a specific pair of earth and sky grid cells have approximately the same baseline attenuation due to the length. A pro forma location that is the average of the actual satellite location or earth station location thus can be used in lieu of the current actual location without loss of precision in the link attenuation baselining.

Pro forma satellite microwave links are divided into satellite link segments at intersection points with altitude strata. For example, pro forma satellite microwave link (80600) is divided into satellite link segments (80615, 80125, 80135) at intersection point (80610) with 0° C. isotherm and intersection point (80620) with the tropopause. A limited number of strata are shown for clarity. The system can be configured to use any number of strata without loss of functionality, resulting in more or fewer satellite link segments.

Satellite link segments are 3D structures, so they are projected onto planar grids, for elevations corresponding to the atmospheric layer that the satellite link segment traverses. As shown in FIG. 5, the first satellite link segment (80615) is projected onto lower grid (80200) as a projected satellite link segment (80715) and the second satellite link segment (80125) is projected onto upper grid (80300) as projected satellite link segment (80725).

Figure 8:
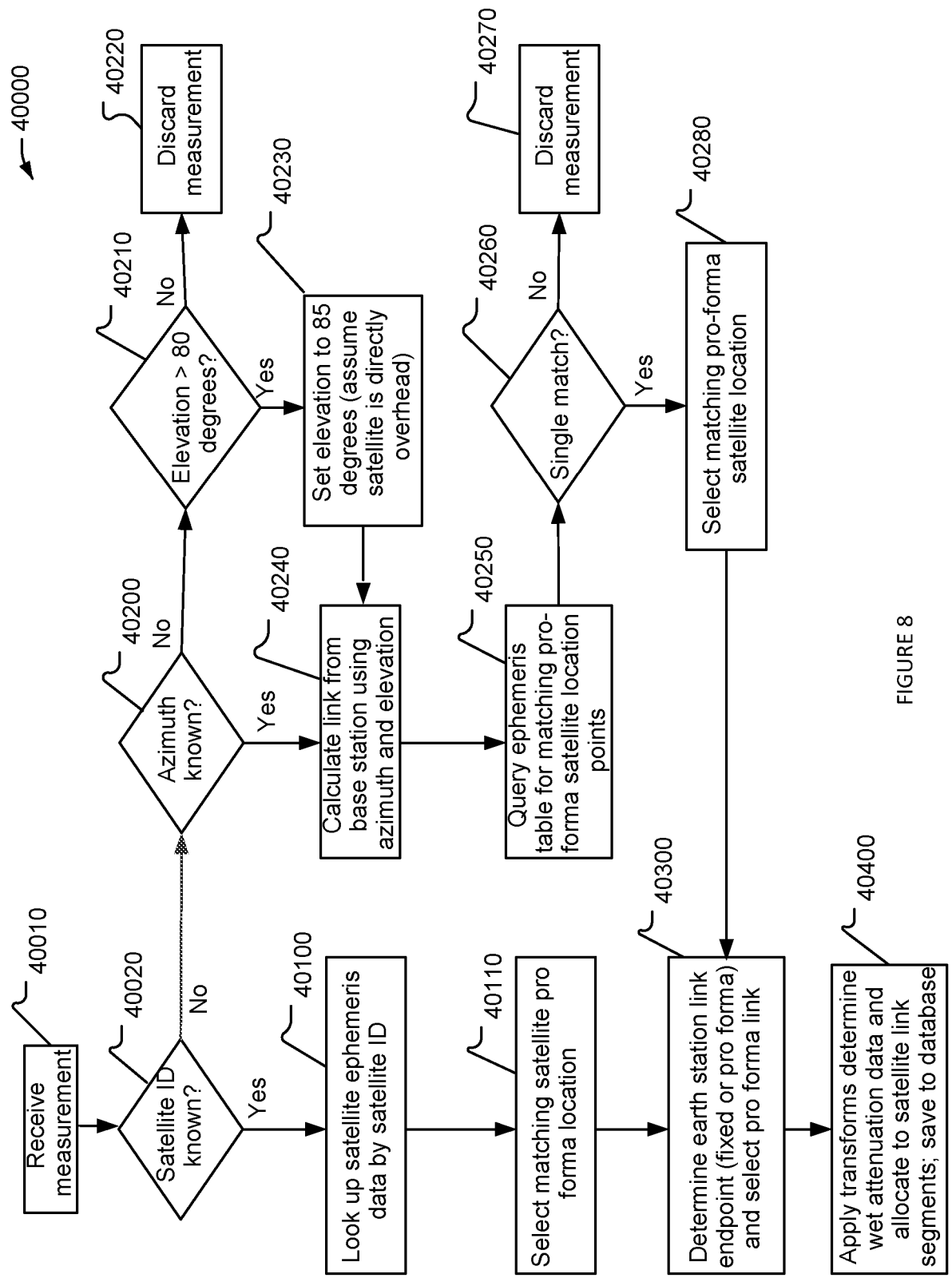
FIG. 8 depicts an illustrative flow chart of an exemplary satellite microwave link snap to grid process for processing satellite microwave signal collected data according to an illustrative embodiment.
Figure 9:
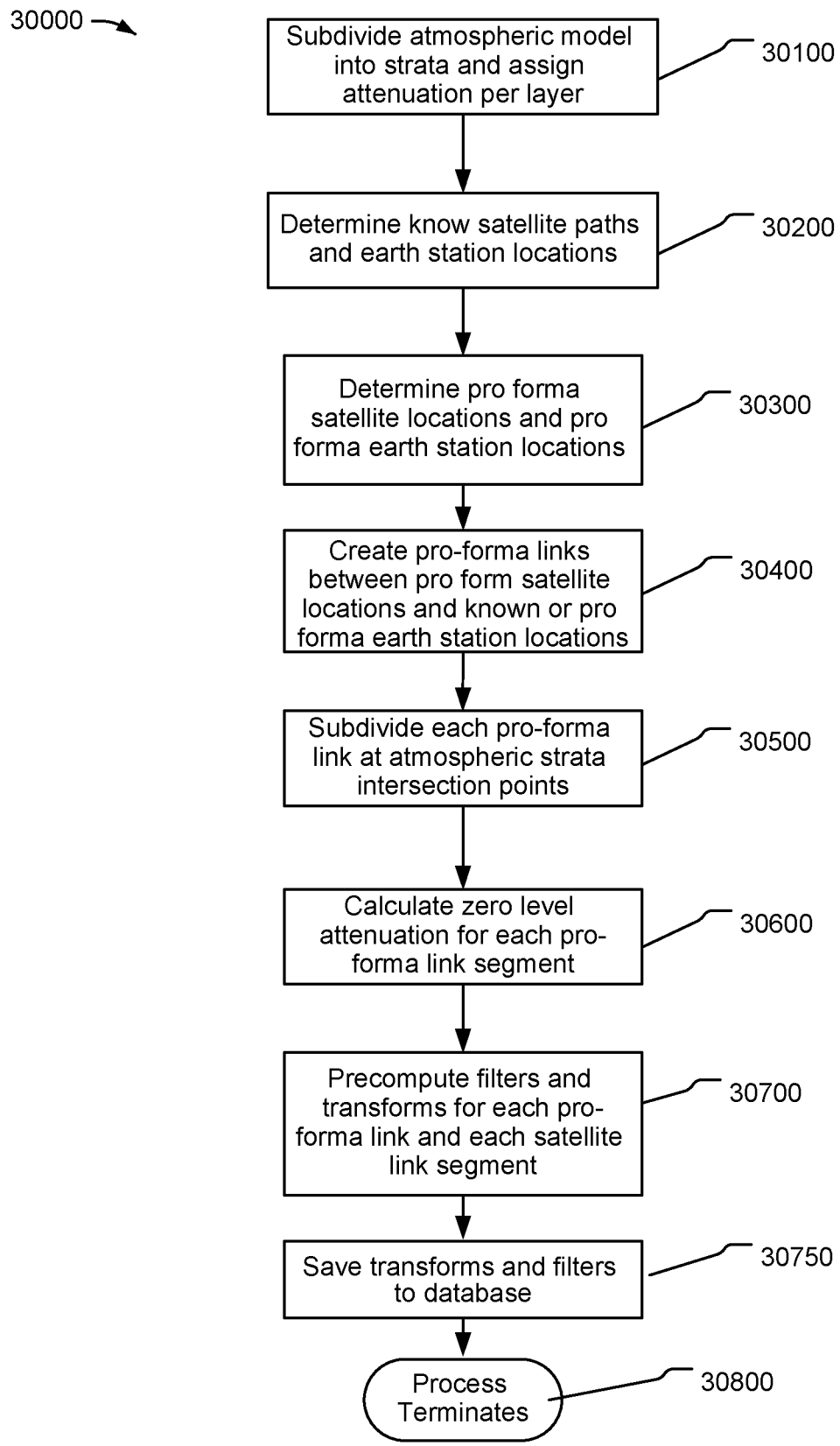
FIG. 9 depicts an illustrative flow chart of an exemplary satellite microwave link transform creation process for building pro forma satellite microwave links and pre-calculating associated filters and transforms according to an illustrative embodiment.

6.5.1.2 Illustrative Pro Forma Satellite Microwave Links, Satellite Link Segments, Satellite Link Segment Endpoints, and Wet Atmospheric Layers Referring to FIGS. 8 and 9, multiple pro forma satellite microwave links (10200-10218) are shown extending between earth station (10030) and pro forma satellite location points (1011-10118) along pro forma satellite path (10010). Each pro forma satellite location point represents a predicted location of a particular satellite along the pro forma satellite path. The system determines earth station locations creates pro forma satellite paths using satellite microwave link infrastructure data. For example, the system determines satellite location points for a particular satellite based on ephemeris data corresponding to the satellite when the ephemeris data is available. The pro forma satellite path pro forma satellite location points can be updated to reflect changes in the satellite orbital path derived from updates to satellite microwave link infrastructure data, for example from updated ephemeris data provided by a satellite microwave network data supplier. Each pro forma satellite microwave link is defined by an elevation angle, azimuth, and path length. For example, pro forma satellite microwave link (10200) is defined by elevation angle (10207) and azimuth (10209). Length of each pro forma satellite microwave link can be calculated using satellite microwave link infrastructure data including the earth station receiver altitude (1003), altitude of the satellite (which can be determined from ephemeris data), and the elevation angle of the pro forma satellite microwave link.

Each pro forma satellite microwave link is subdivided into multiple satelite link segments by intersection points with predetermined atmospheric strata (e.g. the 0° C. temperature strata or the tropopause boundary). Each satellite link segment generally corresponds to an atmospheric layer and each atmospheric layer is associated with a relative amount of atmospheric water contained within that layer. Thus, each satellite link segment may have a pre-calculated relative amount of atmospheric water (water vapor or liquid water content) by attributing a portion of link attenuation for the whole link to each link segment. Spatial distribution of atmospheric water along a pro forma satellite microwave link, and granular satellite microwave precipitation or atmospheric water estimates, can thus be determined. This differs from conventional methods which assign all attenuation to a single link or to a single portion of a link.

Similarly, intersections of the pro forma satellite microwave link with interesting atmospheric strata such as the 0° C. temperature strata can also be pre-calculated, and the resulting 3D line segment projected to a 2D plane as pan of a single unitary calculation solving the well-known intersection of a line with a plane equations combined with 3D to 2D projection of the line segment to the base of the strata. In the same equation, the link attenuation can be transformed (based upon link segment length) to an estimated atmospheric water or precipitation value.

Figure 6:
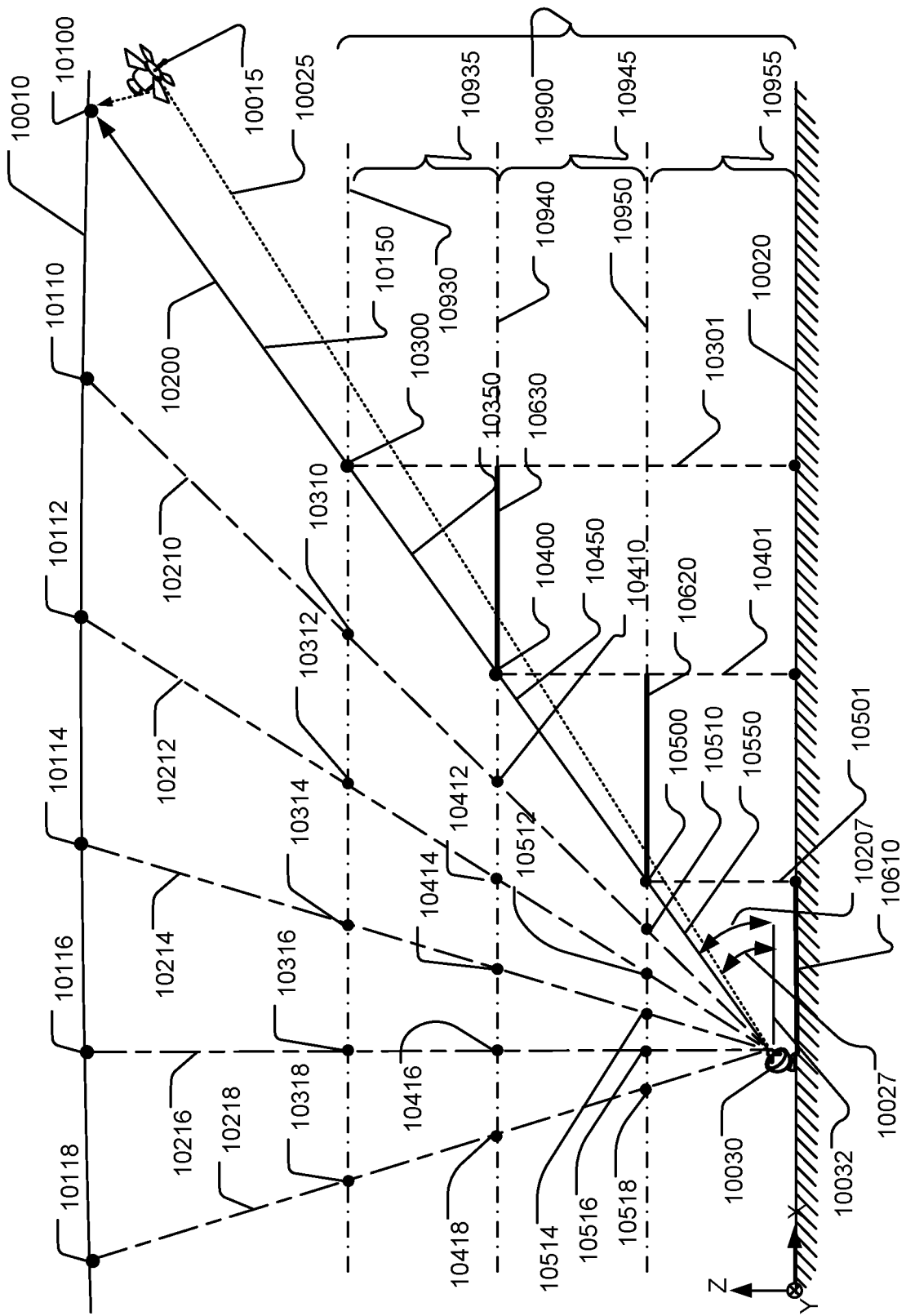
FIG. 6 depicts a side (plan) view of a single (of many) pro forma satellite paths, pro forma satellite locations, pro forma links etc created for one of the satellite/earth station pairs according to an illustrative embodiment.

The atmosphere is divided by one or more altitude strata (e.g. 10930, 10940, 10950) into multiple atmospheric layers (10935, 10945, 10935), each of which includes an associated proportion of atmospheric water. Although three atmospheric layers are illustrated in FIG. 6, the atmosphere can be divided into more layers or into fewer layers as is appropriate to model atmospheric conditions at a desired resolution.

In an embodiment, all atmospheric water is assumed to be contained below an upper altitude stratum (10930) and the remaining atmosphere above the upper altitude strata is assumed to be dry and not contribute to the link attenuation. All atmospheric water is assumed to be contained in atmospheric layer (10900), which is subdivided by altitude strata (10940, 10950) into atmospheric layers (10935, 10945, 10955). In an embodiment, atmospheric layer (10900) includes the troposphere, which may include the majority of atmospheric water, and upper altitude strata (10930) is located at the height of the tropopause (boundary between troposphere and stratosphere) corresponding to the location of earth station (10030). For example tipper altitude strata (10930) can be located at an altitude of 17-20 km of an earth station located in the mid latitudes.

In some exemplary embodiments, altitude strata (10940, 10950) are located at altitudes corresponding to relevant atmospheric conditions local to earth station (10030). For example, in an exemplary configuration in a geographic location where 90% of water vapor is typically located within 7 km of ground level and 50% of water vapor is typically located within 4 km of around level, altitude strata (10940, 10950) are located at 7 km and 4 km, respectively. In some embodiments, at least one of the altitude strata (10940, 10950) are located at an elevation of an isotherm or isobar such as, for example, at the estimated, calculated, or actual elevation of a 0° C. isotherm.

Altitude strata (10940, 10950) are determined, in some embodiments, based on measurements of ground temperature and pressure combined with interpolation of stratification of atmospheric pressure and temperature within a column of air above the location of the ground temperature and pressure measurement. Atmospheric pressure, saturation vapor pressure, atmospheric water vapor pressure or partial pressure, and dew point vary with temperature and in some embodiments are used by the system to determine altitude strata (10940, 10950) such that atmospheric layers (10935, 10945, 10955) correspond to water vapor content based on these values.

Figure 7:
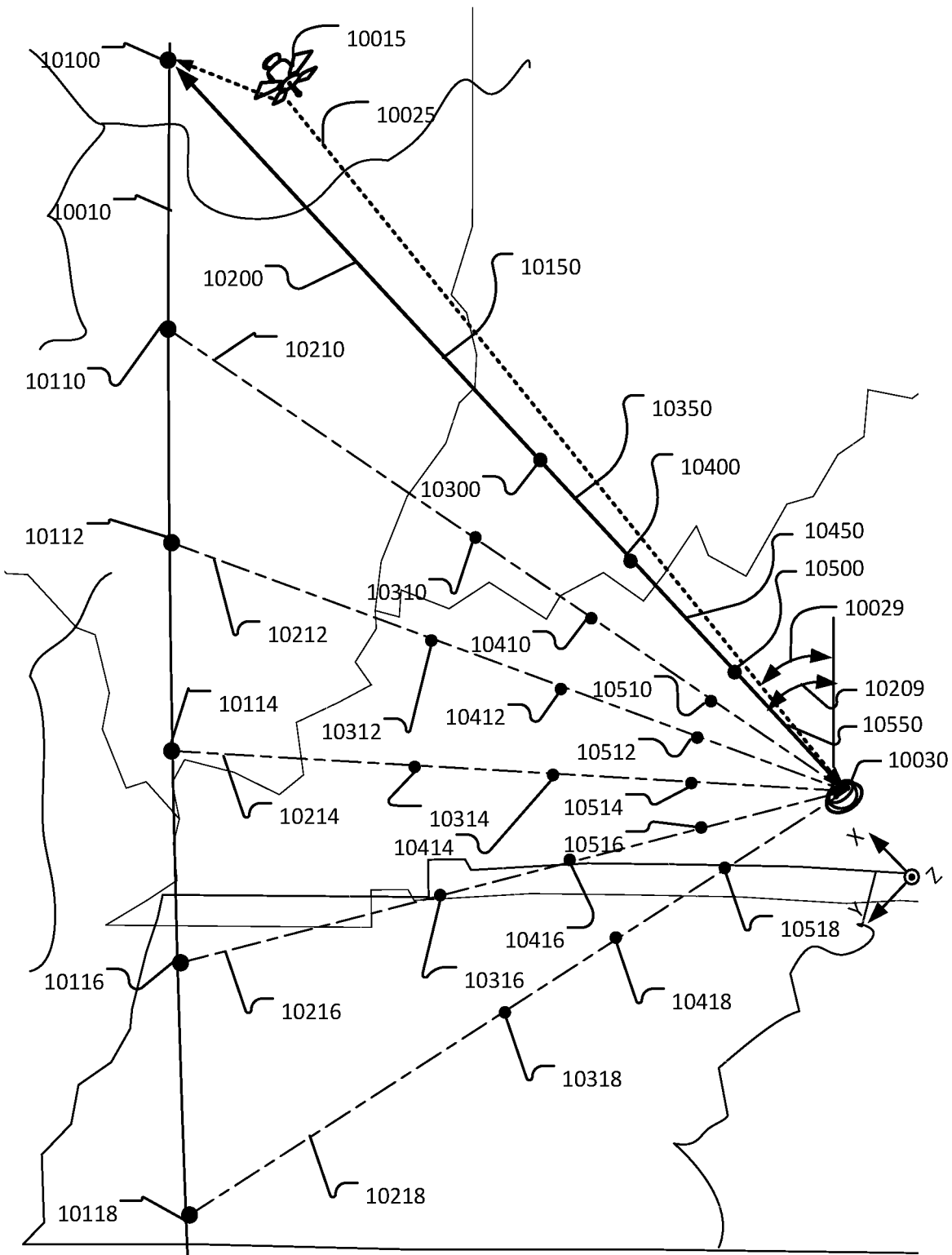
FIG. 7 depicts a top (plan) view of (one of many) pro forma satellite paths, pro forma satellite locations, pro forma links, etc. created for one of the satellite/earth station pairs according to an illustrative embodiment.

Referring to FIG. 6, each pro forma satellite microwave link (10200-10218) intersects the altitude strata at intersection points that divide each link into multiple satellite link segments. For example, pro forma satellite link (10200) intersects the altitude strata at intersection points (10300-10500) which divide it into multiple satellite link segments (10150, 10350, 10450, 10550). Each intersection point is projected vertically onto ground level (10020), as represented by projection lines (10301, 10401, 10501). Referring to FIG. 7, which is a top view of FIG. 6, the intersection points (10500-10518, 10400-10418, and 10300-10318) are projected onto ground location coordinates, i.e. each intersection point is mapped to an X, Y location corresponding ground level elevation. Intersection points can be projected onto planes at ground level and onto planes at elevations corresponding to the atmospheric strata that define the intersection points. Pro forma satellite link segments (e.g, satellite link segments 10550, 10450, 10350, 10150) are also mapped to X, Y ground coordinates.

Each satellite link segment is projected to a plane at a vertical height corresponding to atmospheric layers which the satellite link segment traverses. Pro forma satellite microwave links and satellite link segments can be projected to ground level and atmospheric elevation level planes using projection techniques such as perspective projection or a graphical clipping method such as viewport clipping. A collected satellite microwave precipitation and atmospheric water vapor tile layer (2022*a*) is associated with each plane onto which satellite link segments are projected. Each measured satellite microwave precipitation and atmospheric water vapor tile layer is populated with data from a corresponding atmospheric layer. For example, as shown in FIG. 6, satellite link segment (10550) is projected as first satellite link projection (10610) onto a plane at ground level corresponding to atmosphere layer (10955) and generated collected data based upon collected data from the satellite link segment collected in a satellite microwave precipitation and atmospheric water vapor tile layer corresponding to atmospheric layer (10955). In a similar manner, satellite link segments (10450 and 10350) are projected as second and third satellite link projections (10620 and 10630) and weather parameter data from the satellite link segments are transformed to satellite microwave precipitation and atmospheric water vapor tile layers associated with the atmospheric layer through which each satellite link segment traverses.

Satellite microwave link attenuation collected data is used to calculate precipitation and atmospheric water vapor values corresponding to satellite link segment. Because each satellite link segment corresponds to a particular altitude layer, precipitation and atmospheric water vapor estimates corresponding to a particular X, Y ground coordinate include estimates of atmospheric water at the corresponding altitude layer above the X, Y ground coordinate. The disclosed system can map multiple satellite links and constituent satellite link segments to a particular ground location. Each satellite link segment can correspond to a different altitude layer. This enables the system to rapidly map atmospheric water in three dimensions (X, Y ground coordinates plus altitude) without requiring use of computationally expensive and time consuming tomographic reconstruction techniques. Satellite microwave link attenuation collected data can be used to determine additional or other atmospheric conditions including, for example, precipitation rate and cloud water content, without departing from the disclosed technology.

6.5.2 Snap to Grid 6.5.2.1 Microwave Link Snap to Grid

The system also implements a "snap-to-grid" method for estimating satellite and earth station locations in order to reduce the number of computations required for calculating the satellite-earth station link geometry. As has been previously described, the system can predetermine sets of pro forma microwave link endpoints at ground level and at one or more atmospheric levels (i.e. determine potential endpoints of sender-to-receiver links before collected data from an actual "live" link is received) as well as the associated geometries, baseline attenuation, and transforms required to convert received attenuation values to precipitation or water vapor values. The microwave signal attenuation measurements are, processed, using the predefined transforms and filters associated with the microwave link, to determine precipitation and atmospheric water vapor estimates at specific locations and to map precipitation and atmospheric water estimates to specific one or more tile layers.

When a satellite microwave signal attenuation measurement is received, a location of the associated satellite at the time the signal was received or transmitted by the satellite is determined or estimated from ephemeris data. The satellite location is mapped to the nearest pre-computed pro forma satellite grid location. The earth station location is similarly determined from a lookup table of satellite microwave link infrastructure data (for fixed location earth stations) or by GPS coordinates (for either a mobile earth station or a fixed location earth station) and is mapped to the nearest pro forma ground level grid location. The pro forma microwave link and pre-calculated transforms associated with these two pro forma endpoints is used to process the received attenuation values. Received satellite signal measurements can be associated with pre-computed link geometries even when incomplete satellite location information is received. This allows the system to rapidly process satellite measurement signals and calculate atmospheric weather information from signal measurements without requiring precise satellite location or timing information.

In a similar manner, the technology described herein can be used to snap one or both endpoint transceivers and/or receivers of any microwave signal for which attenuation collected data is received to pre-determined pro forma locations, associate the collected data with a pre-computed pro forma link extending between the two pro forma endpoints and rapidly process the received collected data using transforms and filters that have been pre-calculated for and associated with the pro forma link.

6.5.2.2 Exemplary Satellite Microwave Link Soap to Grid Process

FIG. 8 includes a flowchart depicting, an exemplary satellite microwave link snap to grid process (40000) which the satellite microwave link data processing program (615a) implements to process satellite link data including signal attenuation information (525a) to generate satellite microwave link processed attenuation data (625a). The satellite microwave link data processing program implements the microwave link snap to grid process to satellite microwave link endpoints to pro forma locations and to select a pro-forma link as associated pre-calculated satellite microwave link transform for use in processing satellite microwave link attenuation data.

At step (40010) the satellite microwave link data processing program begins processing a satellite microwave link attenuation measurement. If, at step (40020), the satellite microwave link data processing program determines that an identification of a subject satellite corresponding to the collected data is known, for example the collected data includes a data field indicating the subject satellite ID, satellite microwave link data processing program looks up subject satellite ephemeris data by satellite ID (40100). At step (40110), satellite microwave link data processing program selects the nearest pro forma satellite location (e.g., pro forma location (10100) on pro forma path (10010) or to forma location (80110) on atmospheric grid (80100)). The nearest pro forma location is selected in relation to a satellite position determined from ephemeris data based on subject satellite ID and a timestamp indicating signal transmission time. If signal transmission timestamp is not available, satellite microwave link data processing (915) program can use a signal reception time stamp to estimate satellite position, optionally including a correction factor to account for satellite movement during and estimated period of time for the signal to travel from the satellite to a receiving earth station.

If, at step (40020), the identification of a satellite associated with the satellite microwave link attenuation measurement is not known, the satellite microwave link data processing program determines at step (40200) if an azimuth (e.g., 10029 of FIG. 7) associated with the measurement is known. If an azimuth is not known, the satellite microwave link data processing program determines, at step (40210), whether elevation is greater than 80°. If elevation is not greater than 80°, the measurement is discarded (40220). If elevation is greater than 80°, the satellite microwave link data processing program assumes that the satellite is substantially directly overhead and sets elevation to 85°.

At step (40240), the satellite microwave link data processing program calculates geometry of the satellite-to-earth station link using known or assumed (85°) elevation angle of the link. For example, the satellite microwave link data processing program calculates geometry of link (10025) using elevation (10027) and azimuth (10029).

At step (40250), satellite microwave link data processing program (615a) queries atmospheric grid (80100) or pro forma satellite path (10010) for pro forma satellite location points that correspond to calculated link geometry. If, at step (40260), the calculated link geometry matches more than one pro forma satellite location point, the measurement is discarded (40270). If the calculated link geometry matches a single pro forma satellite location, the matching pro forma satellite location is selected (40280).

At step (40300), the satellite microwave link data processing program determines an earth station location, either exact (e.g. location of 10003 of FIG. 6) or pro forma (e.g.

80211, 80212 of FIG. 5), of the satellite microwave attenuation measurement being processed and then selects a pro forma link that extends between the pro forma satellite location determined in either of steps (40110) or (40280) and the earth station location. When processing mobile dynamic satellite microwave links (i.e. links between a satellite and mobile earth station) satellite microwave link data processing program can select a pro forma earth station location closest to the position of the mobile earth station at the time of the attenuation measurement timestamp (or, alternatively signal receive time). Snapping a mobile earth station measurement to a pro forma earth station location requires that position information of the mobile earth station latitude and longitude) is associated with the measurement. If position information is not available, the measurement is discarded. At the completion of step (40300), the satellite microwave precipitation program has snapped both ends of the microwave satellite link being processed to a selected pro forma link.

At step (40400), the satellite microwave precipitation program retrieves, from the transform and filter database (393), pre-calculated transforms and filters associated with the selected pro forma link and uses the transforms and filters to process the satellite microwave link attenuation measurement. Processing of the attenuation measurements can include applying pre-calculated filters to eliminate measurements from links with link characteristics that indicated erroneous or out of band measurements or that are otherwise not useful for calculating satellite microwave precipitation or atmospheric water estimates. Processing of the attenuation measurement further includes using pre-calculated transforms to determine wet attenuation and assign percentage of the calculated wet attenuation is assigned to each satellite link segment that traverses a wet atmosphere layer. Satellite microwave link processed attenuation data (625a) is saved to satellite microwave link attenuation database (352a) and the satellite microwave link snap to grid process (40000) ends.

In an alternative exemplary embodiment, satellite microwave data collection program (510a), operating on information collection and normalization server (310), performs one or more of the satellite microwave link data pre-processing operations described in this section.

6.5.2.3 Mobile Weather Sensor Snap to Grid

The technology described herein can also snap collected data corresponding to a point location (i.e. measurements at a discrete location such as mobile weather sensor collected data) to nearby pro forma locations and process the collected data with transforms and filters associates with the pro forma location or with sets of pro forma locations such as, for example, filters to exclude possibly erroneous or extraneous measurements and transforms to bin, average, map-to-tiles, and perform other data processing operations on the measurements.

6.6 PROCESSES OPERATING ON THE OFFLINE/BACKGROUND PROCESSING SERVER 6.6.1 Filter and Transform Calculations
6.6.1.1 Illustrative Baseline Transform Creation Process The baseline attenuation determination program (1641) determines "clear air" attenuation adjustments for microwave links, including pro forma microwave links, in order to calibrate the attenuation for each link based upon the power law equation and general weather conditions. As discussed in previously referenced U.S. Pat. No. 10,078,155, the baseline attenuation determination program calculates a baseline "clear air" attenuation for microwave links and encodes the calculated baseline attenuations in baseline transforms. The baseline transforms include equations to generated baselined attenuation values for calculating precipitation estimates from measured attenuation. In a similar manner, baseline attenuation determination program (641), satellite microwave link data processing program (615a), and terrestrial microwave link data processing program (615b) are configured to determine a baseline or "dry air" attenuation for use in calculations related to fog inference, e.g., for fog LWC calculations. The fog baseline attenuation includes attenuation when no fog and no precipitation is present. The programs encode the baseline "dry air" attenuation in fog baseline transforms and save the transforms to the transform and filter database.

In a similar manner, satellite microwave link data processing program (615a) can determine a baseline signal propagation for a microwave link, including an expected propagation due to ionosphere and dry troposphere. The baseline signal propagation can be used to determine an expected "dry delay" between a signal transmission time and signal reception time which. The "dry delay" can be used to determine, from a particular satellite microwave link propagation measurement, a "wet delay" that can be caused by an atmospheric hydrometer including, for example, atmospheric water vapor, atmospheric liquid water or fog, or precipitation. The program encodes the baseline signal propagation wet and dry delay in fog baseline transforms and saves the transforms to the transform and filter database.

6.6.1.2 Illustrative Satellite Microwave Link Transform Creation Process

FIG. 9 depicts a flowchart illustrating an exemplary satellite microwave link transform creation process (30000) performed by the satellite microwave link data processing program (615a) to create and store, in transform and filter database (393), pre-calculated filters and transforms for use in processing satellite link data including signal attenuation values in satellite microwave raw data (525a). The satellite microwave link data processing program performs this process prior to receiving satellite link collected data including signal attenuation information for processing. In an alternate embodiment, a filter and transform program (not shown), distinct from the satellite microwave link data processing program and operating on the background/processing server, executes satellite microwave link transform creation process (30000) to create and store the filters and transforms. The pre-computed filters and transforms are stored in in transform and filter database (393). Process (30000) is repeated for each satellite and earth station location pair in a geographic region within which satellite microwave atmospheric precipitation and water vapor estimates are calculated.

Satellite microwave link transform creation process (30000) begins at step (S31000) with the satellite microwave link data processing program dividing a representation of the atmosphere into layers by one or more altitude strata. For example, referring to FIG. 6, the satellite microwave link data processing program calculates wet layer (10900) and dry layer (10990) and wet sub-layers (10935, 10945, 10955) divided by altitude strata such as altitude strata (10930, 10940, 10950).

The wet sub-layers can each include a different proportion of the water vapor contained in the wet layer. Measured or estimated altitude strata such as the 0° C. isotherm, the tropopause, and altitude strata (10930, 10940, 10950) can be selected by the satellite microwave link data processing program to divide wet layer (10900) into sub-layers that correspond to atmospheric conditions local to earth station (10030) or local to a geographic region covered by a ground level grid (80200) and atmospheric grid (80100). Atmospheric conditions used to select altitude strata can include, for example, historic data including vertical distribution of water vapor in the atmosphere for a location or usual cloud density and height for a location, and NWP collected processed data or weather parameter data including atmospheric pressure and temperature variation by altitude and modeled or predicted local cloud cover.

In an exemplary embodiment, the satellite microwave link data processing program assigns each wet sublayer a percentage amount of satellite microwave link wet attenuation. In an illustrative example, if the wet layer (10900) represents the troposphere, 90% of atmospheric water vapor is located below altitude strata (10940), and 50% of atmospheric water is located below the first altitude strata (10950), then 50% of wet attenuation is assigned to the first wet sub-layer (10955), 40% of wet attenuation is assigned to the second wet sub-layer (10945), and 10% of wet attenuation is assigned to the third wet sub-layer (10935). Assigning proportional attenuation amounts to atmospheric layers enables the precipitation modeling and forecasting system to estimate atmospheric water in each atmospheric layer that a satellite microwave link passes through.

Referring to FIG. 5, in another example embodiment the satellite microwave link data processing program divides the atmosphere into layers bounded by ground level, 0° C. isotherm, and the tropopause. In this example, the atmosphere is divided into a first, 500 meter, layer (80500) between ground level and a 0° C. isotherm, a second, isotherm layer (80520) between the 0° C. isotherm and tropopause and a third, upper atmosphere, layer (80540) between the tropopause and a satellite. In this example, the 500 meter and isotherm layers are wet sub layers and the upper atmosphere layer is dry. In an exemplary embodiment the satellite microwave link data processing program assumes that the majority of wet attenuation, for example 90% of wet attenuation, is caused by 500 meter layer, the remainder of wet attenuation, for example 10%, is caused by the isotherm layer, and that the remainder of the atmosphere between the tropopause and the satellite does not cause any wet attenuation.

At step (30200) the satellite microwave link data processing program retrieves satellite microwave link infrastructure data including, from the satellite microwave link ephemeris information database, ephemeris data defining satellite path (10010) and fixed earth station locations (latitude, latitude, altitude). If, as depicted in FIG. 5, pro forma satellite locations are defined relative to an atmospheric grid (80100) rather than a pro forma satellite path (10100), the satellite microwave link data processing program does not retrieve satellite ephemeris data and step (30200) is skipped.

At step (30300) the satellite microwave link data processing program determines satellite pro forma locations (e.g., 10100-10118, 80110) and pro forma earth station locations (e.g., 80211, 80212). Referring to FIG. 5, the satellite microwave link data processing program subdivides a ground level area, of a geographic region into cells of a ground level grid (80200) with pro forma earth station locations located within each cell. In a similar manner, the satellite microwave link data processing program divides an atmospheric area above the ground level grid into an atmospheric grid (80100), located at a typical satellite orbit elevation (e.g. at about 500 miles for a LEO satellite orbit), and populates the atmospheric grid (80100) with a plurality of satellite pro forma locations (e.g. pro forma location (80110)). The satellite microwave link data processing program can create multiple atmospheric grids, for example atmospheric grids located at both LEO and MEO elevations (not shown).

Referring to FIGS. 8 and 9, in an alternate embodiment, the satellite microwave link data processing program subdivides a pro forma satellite path (10010) by multiple pro forma satellite locations (10100-10118), wherein each pro forma satellite location corresponds to a location of the subject satellite at an incremental point in time. In an embodiment, pro fora satellite locations are separated by 1 minute time intervals. In other words, a distance between pro forma location (10100) and pro forma location (10110) is a distance that the subject satellite travels in one minute's time. The satellite microwave link data processing program can also populate a ground level grid (not Shown) with pro forma earth station locations (e.g., 80211, 80212).

At step (30400) the satellite microwave link data processing program pre-calculates the 3D geometry of each of multiple pro forma satellite microwave links (e.g., 10200-10218, 80600). Each pro forma satellite microwave link extends between a known earth station location (e.g., 10030, 80510) or a pro forma earth station location and one of the multiple pro forma satellite locations (e.g., 10100-10118, 80110).

At step (30500) the satellite microwave link data processing program subdivides each pro forma satellite microwave link into multiple satellite link segments at atmospheric strata intersection points. For example, satellite microwave link data processing program (615a) subdivides pro forma link (80600) into satellite link segments (80615, 80625, and 80635) at intersection points (80605, 80610, and 80110).

At step (30600) the satellite microwave link, data processing program calculates a baseline, or dry, attenuation for each pro forma satellite microwave link and satellite link segment as previously discussed in relation to FIG. 4. In an embodiment, a baseline attenuation is calculated for each satellite link segment. The satellite microwave link data processing program creates baseline attenuation transforms, using calculated baseline attenuations, for each pro forma satellite microwave link and/or satellite link segment and stores the baseline transforms in the transform and filter database (393).

At step (30700) the satellite microwave link data processing program precomputes additional filters and transforms that can be used by the satellite microwave data collection program (511) to associate microwave link characteristics to pro forma links. The satellite microwave link data processing program creates filters that can be used by the satellite microwave data collection program to exclude collected data based on selected criteria. For example, a filter can exclude attenuation measurements from satellite to earth station links with an elevation angle of 5 degrees or lower and measurements that include less than a threshold amount of attenuation or wet attenuation. Filters can also exclude measurements from satellite to earth station links where the earth station is located greater than a threshold distance from the center of a satellite signal footprint. Filters can exclude measurements based on additional criteria. The satellite microwave link data processing program stores satellite microwave link filters are in the transform and filter database (393).

The satellite microwave link data processing program calculates satellite network link-to-grid transforms and satellite network grid-to-tile transforms for use by satellite microwave link precipitation program (654a) when calculating satellite microwave weather parameter data, for example precipitation, LWC, or atmospheric water estimates from wet attenuation, i.e. from baselined attenuations, and when mapping the calculated estimates to tiles of one or more satellite microwave precipitation and atmospheric water vapor tile layers (2022*a*) and LWC tile layers (2048). In an exemplary embodiment, the satellite microwave link precipitation program generates a link-to-grid and grid-to-tile transform that includes each pro forma satellite microwave link in a geographic region. In an exemplary method, wet attenuation is assumed to be due to effects of the wet atmosphere layer (10900) and the link-to-grid and grid-to-tile transform transforms are determined for each satellite link segment that passes through the wet atmosphere layer. Link-to-grid transforms include attenuation-to-weather parameter equations with variable that are dependent on one or more microwave link characteristics, for example one more of: microwave link signal frequency; microwave link transmit power; and microwave link polarization satellite link segment path length through atmosphere layer; and atmospheric temperature.

Link-to-grid transforms include graphical clipping or projection transforms to project each satellite link segment to a corresponding plane. For example, and referring to FIG. 5, satellite link segment (80615), which traverses the 500 meter atmospheric layer, is projected to a 500 meter plane, which is co-located with lower grid (80200) and satellite link segment (80625), which traverses the 0° C. isotherm layer, is projected onto a 0° C. isotherm plane, which is co-located with upper grid (80300). The satellite microwave link data processing program pre-calculates transforms to project satellite link segment (80615) onto the 500 meter plane and satellite link segment (80625) onto the 0° C. isotherm plane.

In an embodiment, the satellite microwave data processing program generates link-to-grid transforms for use in satellite microwave link precipitation attenuation-based weather parameter data calculations in a manner similar to that described for antenna mast based link to grid transforms in previously referenced U.S. Pat. No. 10,078,155, which is incorporated herein by reference in its entirety and for all purposes. A typical length of a satellite microwave link segment, or segments, that traverse wet atmosphere layers (e.g. satellite link segments 80615, 80625) are substantially similar to lengths of terrestrial satellite network backhaul microwave link and therefore the method that described in U.S. Pat. No. 10,078,155 is appropriate. The described method is used to generate equations to transform attenuation associated with each satellite link segment one or more of precipitation, atmospheric water content, and LWC on a static microwave grid corresponding to the plane onto which the satellite link segment is projected.

The satellite microwave link data progressing program pre-calculates equations to associate a portion of the satellite link attenuation with each of the satellite link segments. The satellite microwave link data progressing program then subdivides each satellite microwave link or link segment into multiple equal length sub segments, with a link point at each end of the sub-segment. The satellite microwave link processing program associates a portion of the link segment attenuation with each link point, and pre-calculates an area of influence for each link point. The satellite microwave link data progressing program pre-calculates equations to transform pre-processed attenuation measurements to grid points of a static microwave grid associated with the plane on which the link segment has been projected. The equations transform microwave attenuation measurement values for each atmospheric link segment to weather parameter data at static microwave grid points covered by the area of influence of the link point. For example, the satellite microwave precipitation program pre-calculates equation to transform an attenuation measurement for satellite link segment (80615) to precipitation, atmospheric water vapor, and fog LWC estimates on a 500 meter static microwave grid, or alternatively on a ground level static microwave grid, based on determining, grid points of the static microwave grid that are located with areas of influence of one or more satellite link segment link points. Similarly, attenuation collected data for satellite link segment (80625) can be transformed to precipitation, atmospheric water vapor, and LWC estimates on a 0° C. isotherm static microwave grid. The satellite microwave link data processing program pre-calculates, for all pro forma link segments and for all wet atmospheric layers, link-to-grid transforms that are used by the satellite microwave precipitation program to generate precipitation, LWC, and atmospheric water vapor estimates at grid points of static microwave grids corresponding to each atmospheric wet sub-layer.

In an additional exemplary embodiment, the transforms are configured to generate gridded microwave attenuation measurements as well as gridded estimates calculate based on precipitation. In an embodiment the gridded microwave attenuation is used by other processing programs to generate atmospheric weather parameter data, for example by the fog inference program to generate atmospheric fog LWC.

The satellite microwave link data processing program pre-calculates grid-to-tile transforms to transform gridded precipitation, atmospheric water vapor, and fog LWC estimates to satellite microwave precipitation and atmospheric water vapor collected data tile layers. A collected data tile layer is associated with each static microwave grid and equations to transform gridded estimates to tiles the associated collected data tile layer are pre-calculated. For example, a grid-to-tile transforms include pre-calculated equations to transform measurements from the 0° C. isotherm grid to a 0° C. isotherm collected data tile layer and pre-calculated equations to transform measurements from the 500 meter gird to a 500 meter collected data tile layer.

The satellite microwave link data processing program can calculate multiple transforms for each pro forma microwave satellite link and satellite link segment including, for example, transforms that each include one of multiple possible downlink signal frequencies and signal polarizations. This enables the system to calculate precipitation, atmospheric water vapor, and LWC estimates when and attenuation measurement and signal characteristics data including, for example signal polarization, is received without requiring advance knowledge of the transmitted signal characteristics. If a satellite changes signal transmit frequency or polarization, for example, the system can retrieve transforms that correspond to the new frequency and/or polarization.

At step (30750) the satellite microwave link data processing program saves transforms and filters to transform and filter database (393) following which, at (30800) the satellite microwave link transform creation program (30000) ends.

An alternative exemplary process (not shown), substantially similar to satellite microwave link transform creation program (30000), can be used to calculate satellite microwave attenuation-to-cloud water content transforms useful, for example, for determining atmospheric cloud water content estimates.

The satellite microwave link data processing program also performs consistency checking of microwave link information in the databases. For example, if a microwave link is added or removed from the database, but the precipitation models rely on microwave link information from that link, the link coverage models need to be updated for the new link topology. The consistency checking component performs these updates. Similarly, if a microwave link is not reporting link attenuation information for a period of time, the satellite microwave link data processing program identifies this link for investigation, and optionally removes the link from the link topology models until the problem can be identified and fixed. Similarly, if a microwave link frequency or polarization changes, the link topology models are updated as necessary. These changes to the underlying link topology models are made on an as-needed basis.

The satellite microwave link data processing program also pre-calculates transforms and filters for pruning erroneous or non-useful measurements 6.6.1.3 Illustrative Combined Terrestrial and Satellite Microwave Link Transform Creation Process In an exemplary embodiment, the system implements a combined satellite and terrestrial microwave link transform creation process substantially similar to satellite microwave link transform creation process (30000) to pre-calculate transforms for calculating weather parameter data based on combined microwave link attenuation measurements from two or more microwave network data sources. By combining microwave link attenuation measurements from multiple types of networks, for example from a terrestrial microwave data source and from a satellite microwave data source, the system can achieve greater coverage than it would with any particular microwave link network or network type alone. This provides additional accuracy improvement in area there a single microwave link network is sparse. Embodiments of the system described herein dramatically increase geographic coverage by combining terrestrial microwave link collected data with satellite microwave link collected data, thereby enabling generation of weather parameter data—estimates in regions not covered by terrestrial microwave links. In additions, combining satellite and terrestrial microwave link data increases the number of overlapping links, for example satellite microwave links overlapping terrestrial microwave links, providing the system with increased information about attenuation conditions and thereby enabling the system to generate precipitation estimates with increases associated confidence metrics.

Figure 10:
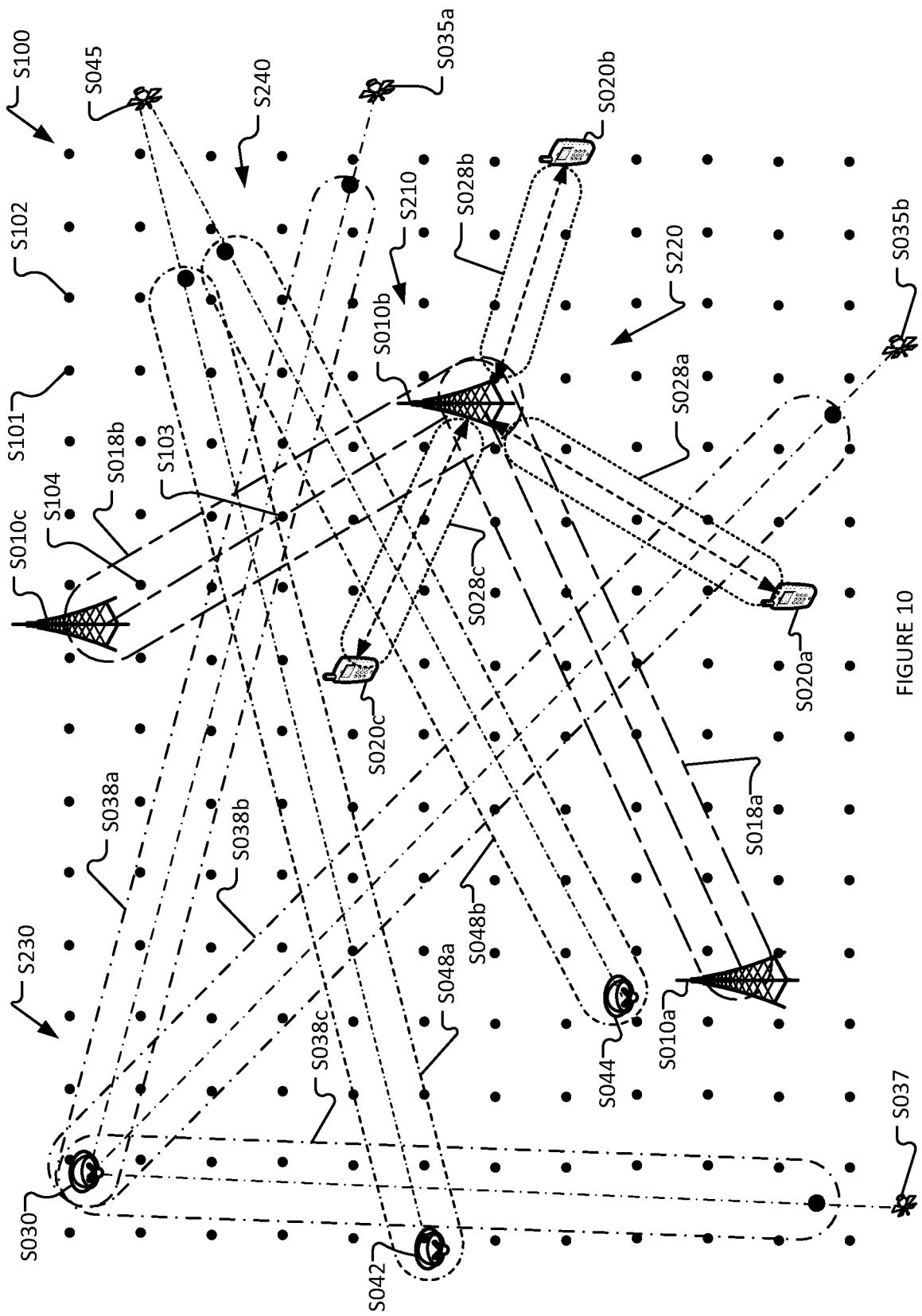
FIG. 10 depicts a portion of a satellite microwave network overlapping a portion of a terrestrial microwave network. Both networks are shown overlaying a ground level static microwave grid of grid points according to an illustrative embodiment.

Referring to FIG. 10, portions four types of overlapping microwave networks are shown: a portion of a terrestrial point-to-point microwave network (S210); a portion of a dynamic terrestrial microwave network (S220); a portion of a mobile satellite microwave network (S230); and a portion of a stationary satellite network (S240). The microwave networks are shown overlaying a ground level static microwave grid (S100) of grid points, each grid point represented by a solid circle. Ground level static microwave and (S100) includes, for example, grid points (S101, S102, S103, and S104).

Each satellite microwave network includes-multiple microwave links and link segments, for example terrestrial point-to-point link (S018b) and stationary satellite microwave link segment (S048a). Each microwave link is illustrated as a dash or dash-dot formatted straight line surrounded by a similarly formatted oblong shape that represents an area of influence of each microwave link or link segment. Weather parameter data values, for example one or more of precipitation, atmospheric water vapor, and LWC estimates, calculated based on measured attenuation of a particular microwave link, are mapped to static microwave grid points that are enclosed by the microwave link's area of influence. For example, weather data parameter values, e.g. atmospheric water vapor estimates, calculate from attenuation of microwave link (S018b) are mapped to static microwave grid cells within the area of influence of the link, for example grid cell (S104).

Stationary satellite microwave link segments and mobile satellite microwave link segments (e.g. 5038a) each represent a lower atmosphere portion of a satellite microwave link projected onto ground level. For example, referring to FIG. 6, each satellite microwave link segment is similar to satellite link projection (10610) of satellite link segment (10550) passing through first wet sub-layer (10955) and projected onto ground level. In additional embodiments, satellite microwave link segments can represent projections of different segments of satellite microwave links projected to ground level. For example, a ground level satellite microwave link segment can represent a portion of a satellite microwave link passing through the first and second wet sublayers (10955, 10945) or through the entire wet layer (10900).

The terrestrial point-to-point microwave network (S210) includes antenna masts (S010a, S010b, and S010c) which are interconnected via terrestrial microwave links (S018a, S018b). Terrestrial dynamic, microwave network (S220) includes mobile microwave link endpoints (S020a, S020b, S020c) each with at least one terrestrial microwave link (S028a, S028b, S028b) with antenna mast (S010b). Each mobile microwave link endpoint can represent, for example, a person or vehicle carried mobile microwave transceiver. In additional embodiments, not shown, the terrestrial dynamic microwave network includes additional mobile microwave link endpoints and mobile microwave link endpoints with microwave links to one or more additional antenna masts. Terrestrial microwave networks can include many more mobile microwave link endpoints and/or antenna masts. By way of example and not limitation, the networks can include hundreds of antenna masts and mobile microwave link endpoints, and can further include additional network elements, for example small-cell/base stations and CPE routers.

The mobile satellite microwave network includes earth station (S030) and three ground level mobile satellite microwave link segments (S038a, S038b, and S038c) which are projections of low atmosphere segments of microwave satellite links between the ground station and mobile satellite locations (5035a, 5035b, 5035c). Mobile satellite locations can represent locations of different mobile satellites or different locations of a single mobile satellite as it moves. For clarity only a limited number of ground level mobile satellite microwave links are illustrated. A mobile satellite microwave network can include many more earth stations and many more ground level satellite microwave links. By way of example and not limitation, the network can include hundreds of ground stations.

The stationary satellite microwave network includes earth stations (S042 and S044) and two ground level stationary satellite link segments (5048a, 5048b) which are projections of low atmosphere segments of microwave satellite links between the ground stations and stationary satellite location (5045). A stationary satellite microwave network can include many more earth stations and many more ground level satellite microwave links. By way of example and not limitation, the network can include hundreds of ground stations.

In a first exemplary embodiment, a microwave link data processing program (615a,b) carries out the combined satellite and terrestrial microwave link transform creation process. The microwave link data processing program pre-calculates link-to-grid transforms that map weather parameter data estimates from terrestrial microwave links and from weather parameter data estimates based on attenuation measurements from ground level satellite microwave link to grid points of the ground level static microwave grid. The link-to-grid transforms include equations to aggregate weather parameter data values from two of more overlapping microwave links at individual static microwave grid points. In an exemplary embodiment, the microwave link data processing program determines that two or more microwave links overlap a particular ground level static microwave grid point if areas of influence associated with each of the two or more microwave links encompass the grid point. For example, static microwave grid point (S103) is located with areas of influence of terrestrial point-to-point microwave link segment (S018b), stationary satellite ground level microwave link segment (S048a), and mobile satellite ground level microwave link segment (5038a). The microwave link data processing calculates equations to aggregate weather parameter data values based on each of these links at grid point (S103).

In an embodiment, the microwave link data processing program constructs a combined link-to-grid transforms that include microwave links from all networks that overlay a particular geographic area. For example, the microwave link data processing program can construct a link-to-grid transform that includes all microwave links and link segments illustrated in FIG. 10. In an alternative embodiment, the microwave link processing program selects some available microwave links and link segments for inclusion in a combined link-to-grid transform while excluding. The microwave link data processing program can select microwave links for inclusion based on, for example, one or more of microwave network type an individual or group microwave link characteristics. For example, the microwave link processing program can construct a link-to-grid transform using only links with stationary link endpoints, for example using links of terrestrial point-to-point microwave network (S210a) and stationary satellite microwave network (S240).

Weather parameter data estimated values based on attenuation of multiple microwave links are aggregated at a static microwave grid point, for example by calculating an average value, e.g. an average weighted by confidence metrics associated with microwave link data sources or based on characteristics of individual microwave links. For example, in an exemplary embodiment static terrestrial microwave links are associated with a higher confidence than satellite microwave links and confidence is increased for shorter distance microwave links as compared to longer microwave links. In another exemplary embodiments, link-to-grid transforms encode one or more additional or alternative weather parameter data value aggregation schemes, for example selecting a most common value or selecting a value corresponding to the source associated with the highest confidence level. In some embodiments, the link-to-grid transforms include equations for calculating a confidence metric associated with a calculated weather parameter data value, for example a confidence a precipitation estimate value, based on one or more criteria including, for example, a number of overlapping microwave links at a static microwave grid point and confidence metrics associated with each overlapping microwave link. The program calculates transforms to transform combined terrestrial and satellite attenuation-based weather parameter data at static microwave grid points to system tiles, for example to a ground level precipitation tile layer (2022a,b) and LWC tile layer (2048). In an exemplary embodiment the grid-to-tile transforms include equations to calculate a confidence metric associated with a weather parameter data value of each tile based on confidence metrics associated with weather parameter data values that are transformed from one or more static microwave grid points to that tile.

In a second exemplary embodiment, a microwave link processing program pre-calculates a lint-to-grid transform that maps attenuation-based weather parameter data estimates to separate terrestrial static microwave and satellite ground level static microwave grids. The program pre-calculates grid-to-tile transforms to transform weather parameter data values to system tiles. In some exemplary embodiments the link-to-grid transforms include equations to compute confidence metrics associated with weather parameter data values at each static microwave grid point and the grid-to-tile transforms include equations to calculate a confidence metric associated with each tile based on confidence gridded weather parameter value confidence metrics.

6.6.1.4 Illustrative Fog Transform Creation Process

Figure 11:
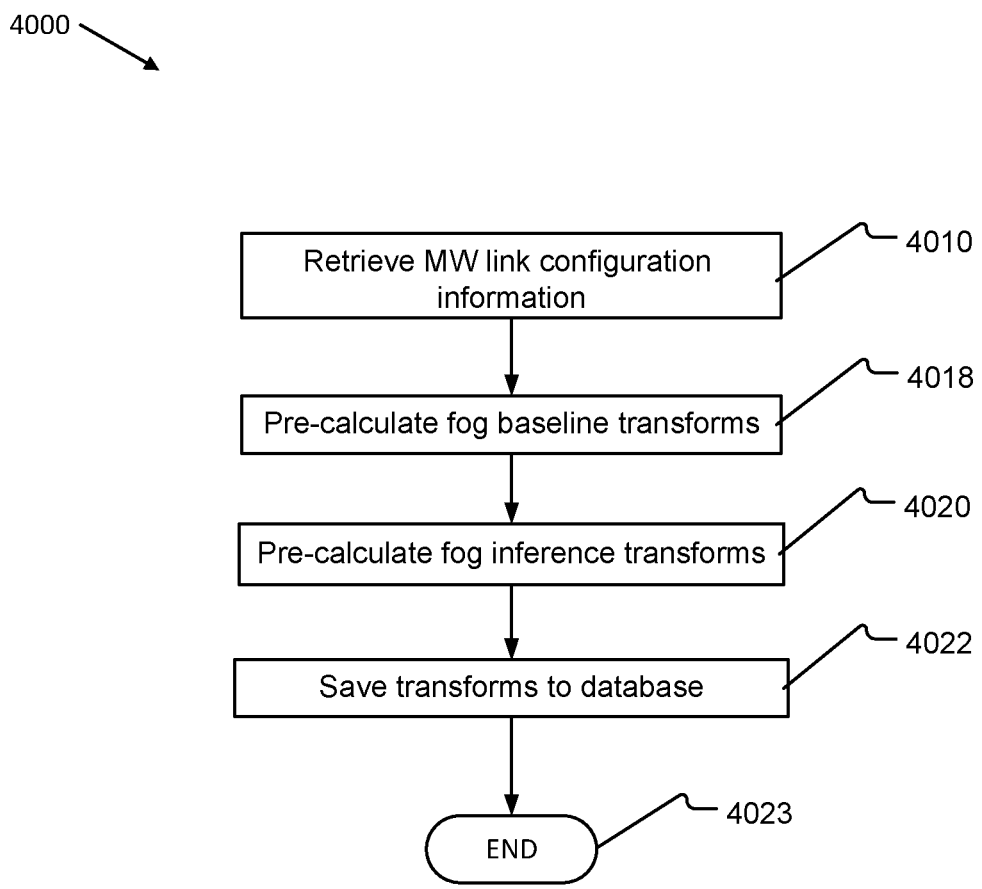
FIG. 11 depicts an illustrative flowchart of an exemplary fog transform creation process for building fog transforms, according to an illustrative embodiment.

Referring to FIG. 11, an illustrative fog transform creation process (4000) is shown for pre-calculating fog baseline and fog transforms. It comprises steps to pre-calculate fog-specific transforms to be used for flag inference generation and LWC calculation. One or more programs that generate fog-specific transforms, collectively called fog transform generation programs, perform steps of the fog transform creation process (4000). For example, baseline attenuation determination program (641) and/or one or more microwave link data processing programs (e.g. 615a, 615b) and dedicated fog transform program (995) can perform the steps to generate transforms for determining fog-specific baselined attenuation and the microwave data processing programs or fog transform program can perform steps to generate fog transforms.

At step 4010 a fog transform generation program retrieves, from a terrestrial or satellite information database (e.g. 390, 657), satellite and terrestrial microwave link infrastructure data including link endpoint locations, link transmit power, and link polarization. The microwave link infrastructure data can include satellite microwave link location and characteristics data and terrestrial microwave network topology microwave tower and signal characteristics data (and link status update information). In some exemplary embodiments, the fog transform generation program retrieves pro-forma link endpoint locations and pro-forma link information.

At step 4018, the fog transform generation program pre-calculates fog-specific baseline attenuation transforms. Fog-specific baseline attenuation transforms include transforms for separating, from satellite or terrestrial microwave link attenuation measurements, baseline attenuation when no fog and no precipitation is present. Baseline attenuation determination is discussed in further detail herein in relation to baseline attenuation determination program (641).

At step 4020, a fog transform generation program pre-calculates fog transforms including link-to-grid and grid-to-tile transforms. The fog transform uses the retrieved microwave link configuration information to pre-calculate link-to-grid and grid-to-link transforms, as described earlier.

In an exemplary embodiment, a fog transform includes a well-known LWC estimation model to estimate a liquid water content (LWC) of fog including, for example, a model that can be used to estimate LWC as a function of ambient temperature, microwave attenuation and microwave frequency.

In additional exemplary embodiments, a fog transform includes one or more additional models to estimate additional atmospheric conditions based on microwave link attenuation measurements, for example a well-known atmospheric water vapor estimation model to estimate atmospheric water vapor density. In a further embodiment, fog transforms include equations or algorithms for calculating precipitation estimates and for transforming LWC and precipitation estimates to a separate LWC tile layer (2048) and microwave precipitation tile layers (2022a,b) or to combined LWC and precipitation tile layers.

In some embodiments, fog transforms are encoded with threshold values of LWC and/or precipitation estimate values for fog yes/no inference decision making by the fog inference program. For example, an exemplary fog transform includes a maximum LWC magnitude above which a presence of fog is not inferred or a range of LWC values within which a LWC estimate value must fall to generate a fog inference based on the LWC estimate value.

In an embodiment, a fog-specific baseline transform and a fog transform are configured as a unitary transform, i.e. a single transform that determines both a baselined or fog-specific attenuation and a fog LWC.

In an additional exemplary embodiment, microwave link precipitation programs (654a, and 954) perform fog inference and microwave link precipitation transforms, i.e. precipitation link-to-grid and grid-to-tile transforms, include transforms for calculating LWC as well as for generating precipitation, estimates and transforms for mapping generated data to a grid and to tiles. In this additional embodiment, separate fog transforms are not created and step 4020 includes calculating fog-specific components of microwave link precipitation transforms.

At step 4022, the fog transform program saves fog baseline and fog transforms to the filter and transform database, after which the process ends (4023).

6.6.1.5 Illustrative RVR Transform Creation Process

Figure 12:
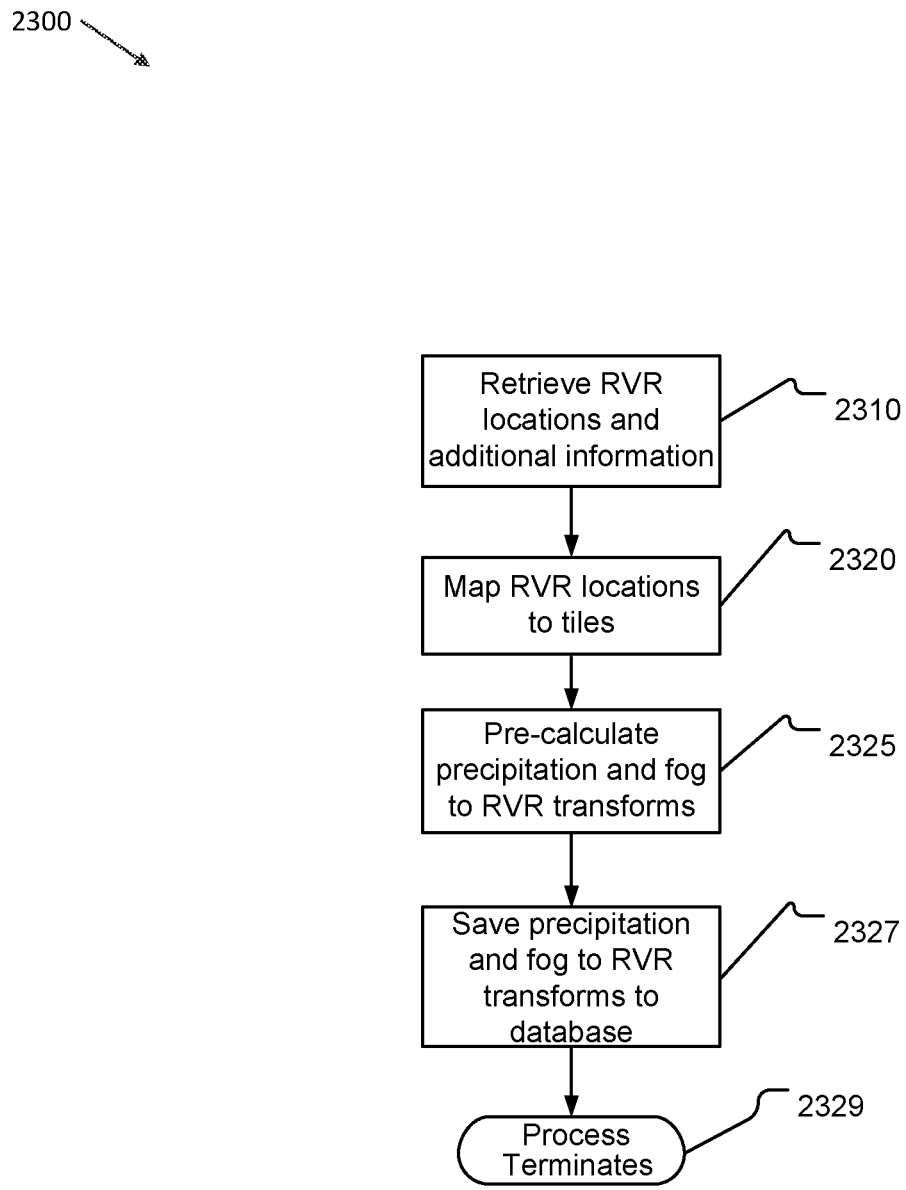
FIG. 12 depicts an illustrative flowchart of an exemplary RVR transform creation process for building RVR transforms, according to an illustrative embodiment.

Referring to FIG. 12, an illustrative RVR transform creation process (2300) is shown for pre-calculating RVR transforms. It comprises steps to pre-calculate RVR transforms that are used for calculating and forecasting RVR at one or more pre-selected locations of interest, for example at airports, runways, or other locations. The RVR transform program (324), performs steps of method (2300). In an exemplary implementation of method (2300), the RVR transform program retrieves one or more user-selected locations of interest from location of interest database (391), pre-calculates mapping of each location of interest, e.g. a selected RVR forecast location, to system tiles, retrieves location-specific ancillary data for RVR forecasting, and pre-calculates precipitation-to-RVR equations and log-to-RVR equations for each retrieved location of interest. Pre-calculating RVR equations includes retrieving, and associating with retrieved location of interest, e.g., RVR forecast locations, values of parameters used for calculating Va and Vk and other measures of visibility corresponding to the locations of interest. The RVR transform programs creates RVR transforms that include the pre-calculated mappings, equations, and ancillary data and saves the RVR transforms to a transform and filter database.

At step (2310), the RVR transform program retrieves one or more locations of interest, for example airport and/or airport and runway location information, from the location of interest database (391) and maps each RVR forecast location to one or more tiles of input precipitation and/or fog forecast tile layer(s) and output RVR forecast tile layer(s). The RVR transform program can prompt the RVR ancillary data collection program (519) to collect and store any additional airport or other RVR location-specific information needed for pre-calculating RVR transforms. The RVR ancillary data collection program retrieves the additional information and stores it, as RVR ancillary data (529), to the RVR location and ancillary data database (929). The RVR ancillary data may include current runway light luminosity (I), current and historical Vk measured by RVR sensors (245-248) at the airport, and background light intensity (BL) data. In an alternative embodiment, the RVR transform program uses estimated values of one or more of the variable. For example, in one embodiment, the RVR transform program assumes a value for airport current runway light luminosity I based on standards and estimates Et, which is a function of BL, rather than calculating and estimated Et using measured BL. In an exemplary operating method, the RVR ancillary data collection program collects, processes, and stores airport location, runway locations and length data, RVR sensor location, and other information from or corresponding to an airport. This information is stored in the RVR location and ancillary data database. Step (2310) can be initiated when a user selects one or more runways or airports for RVR report generation while further process steps to generate the RVR report are deferred until a user-defined RVR forecast reporting time.

At step (2320), the RVR transform program maps one or more retrieved locations of interest, for example one or more RVR forecast locations, to tiles comprising one or more tile layers of forecast stack MiFj. Referring to FIGS. 13A-B, the RVR transform program maps airport and runway polygons (3010, 3012) retrieved from the location of interest database to tiles (3050) from a tile layer of a collection data stack Mi or forecast stack MiFj by determining which tiles correspond to each polygon. Referring to FIG. 13A, a first location of interest include an airport polygon (3010) enclosing airport (3015) and a second location of interest includes a runway polygon (3012) enclosing runway (3016). Referring to FIG. 13B, the RVR transform program determines an airport RVR location tile set (3020) that corresponds to the airport polygon and a runway RVR location tile set (3022) that corresponds to the runway polygon. The airport and runway RVR location tile sets are indicated by outlines with dark border and filled with cross hatching. The RVR transform program maps an airport location, and optionally the runway location(s) to tiles (3050) by determining which tiles correspond to the location of the airport and known locations along the runway (such as touchdown and rollout areas of each runway). In an exemplary embodiment, when mapping the runway to tiles (2320), the RVR transform program determines tiles that correspond to locations of RVR sensors (e.g., 245, 246, 247, 248) along the runway and, in some embodiments, determines a set of tiles that are within a threshold distance of the runway. These tiles represent the set of tiles that can be queried to determine precipitation rate or fog LWC and other atmospheric parameters along the length of the runway.

When a retrieved location of interest includes a flag indicating a specific location, the RVR transform program can determine a flag RVR location tile set (not shown), including one or more tiles, by mapping a nearest tile to the flag RVR forecast location. Alternatively, the RVR transform program can map multiple tiles surrounding the flag RVR forecast location, for example a set of tiles within a threshold distance of the RVR forecast location, to a flag RVR forecast location. The RVR transform program can combine data corresponding to the set of tiles by, for example, calculating an average of RVR at each of the tiles in the set of tiles wherein the individual tile RVR values are weighted by distance.

In a non-limiting implementation wherein a retrieved location of interest includes an RVR location other than a flag or polygon, for example an airport name and a particular runway at the airport, the RVR transform program prompts the RVR ancillary data collection program to retrieve runway data including the geographical location and length of the runway from an RVR ancillary data source or from another data source such as map data source (348). The RVR transform program determines an airport RVR location tile set that corresponds to the airport and a runway RVR location tile set that corresponds to runway based on the retrieved information.

The RVR transform program stores the data corresponding to runway tiles, including associated luminosity and other collected data, in the RVR location and ancillary data database where it can be accessed by the RVR transforms program, by other servers, and by programs running on other servers.

At step (2325), the RVR transform program uses the RVR location tile sets and RVR ancillary data to pre-calculate RVR transforms that are used to calculate RVR. The RVR transforms are pre-calculated prior to the RVR forecasting program (920) retrieving forecast precipitation data art for forecast fog data that are used to generate forecast RVR data. This allows the RVR forecasting program to rapidly process forecast precipitation data to generate RVR forecasts when precipitation forecast data is received. The RVR transform program retrieves the airport RVR location tile set (3020) and runway RVR location tile set (3022), and flag RVR location tile set (not shown) from RVR location and ancillary data database (929) and pre-configures precipitation-to-RVR and fog-to-RVR equations for each tile set by retrieving location specific parameters (BL, I, etc.) and associating the location specific parameters with the location tile sets and RVR equations. The RVR transform program pre calculates RVR transforms that include a runway precipitation-to-RVR and/or fog-to-RVR transform and airport precipitation-to-RVR and/or fog-to-RVR transforms. The RVR transform can pre-calculate additional or alternative RVR transforms for determining RVR based on other parameters such as for, example, another visibility measures (other than RVR), LWC, smoke, and other atmospheric conditions. The RVR transform program stores the RVR transforms in transform and filter database (393).

6.7 CONCLUSION

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and implementations where it is desirable to improve the accuracy and timeliness of precipitation forecasts. Accordingly, the claims set forth below should be construed in view of the full breadth and spirit of the technology as disclosed herein.

What is claimed is:

1. A method of determining localized weather data by processing microwave receiver detection datums detected by at least one earth station microwave radio receiver, the microwave receiver detection datums representing signal strength and/or attenuation of microwaves transmitted over satellite microwave paths, the method-comprising performing, with at least one processor, operations comprising:
   predefining pro forma satellite microwave paths between earth station endpoints and endpoints representing pro forma satellite locations outside of earth's atmosphere;
   pre-calculating at least one transform for each predefined pro forma satellite microwave path, including defining at least one satellite link segment based on a point of intersection of the predefined pro forma satellite microwave path with at least one stratum and pre-calculating a transform for the at least one satellite link segment, the pre-calculated at least one transform predefining virtual microwave signal path attributes including (a) satellite microwave path geometry, and (b) at least one signal attenuation over the satellite microwave path geometry; and
   processing datums detected by at least one ground station radio receiver, representing signal strength and/or attenuation of microwaves transmitted by a satellite, by performing operations comprising:
      associating the radio receiver-detected datums with at least one predefined pro forma satellite microwave path; and
      using the pre-calculated at least one transform—to project the at least one satellite link segment onto at least one projection and to transform plural detected radio receiver-detected datums into attenuation-based geographically localized weather data corresponding to geographical regions of the at least one projection.

2. The method of claim 1 wherein the earth station endpoints comprise pro forma endpoints representing terrestrial earth station receiver locations on a terrestrial map.

3. The method of claim 1 wherein using comprises reusing the pre-calculated at least one transform to transform sets of microwave receiver detection datums received at different times.

4. The method of claim 1, wherein the at least one satellite link segment has a pro-forma endpoint representing the point of intersection with the at least one stratum.

5. The method of claim 1 wherein the at least one stratum comprises an isotherm and/or the tropopause.

6. The method of claim 1, further including choosing the at least one stratum and an elevation thereof based on at least one of (i) a zero degree Centigrade line and/or (ii) a tropopause boundary and/or (iii) a fixed elevation above ground level and/or (iv) known and/or calculated atmospheric characteristics.

7. The method of claim 1, further including determining microwave path endpoints representing pro forma satellite locations from satellite ephemeris data corresponding to satellite locations at varying points in time.

8. The method of claim 1, further including applying the precalculated at least one transform to convert the microwave receiver detection datums into one or more weather data elements associated with one or more grid locations on the earth's surface.

9. The method of claim 1 wherein pre-calculating the at least one transform comprises:

pre-computing a first transform for generating weather data at one or more ground and atmospheric elevations; and pre-computing a second transform for converting the generated weather data to one or more system tiles.

10. The method of claim 1, wherein using comprises applying the precalculated at least one transform to convert microwave receiver detection datums into tile-based weather data.

11. The method of claim 1, wherein using includes omitting at least one microwave receiver detection datum from being transformed into attenuation-based geographically localized weather data corresponding to geographical regions of the at least one projection.

12. A method of determining localized weather data comprising performing, with at least one processor, operations configured to process microwave receiver detection datums detected by at least one earth station microwave radio receiver, the microwave receiver detection datums representing signal strength and/or attenuation of microwaves transmitted by a satellite over satellite microwave paths, the operations including:

associating the microwave receiver detection datums with predefined pro forma satellite microwave paths between earth station endpoints and endpoints representing pro_forma satellite locations outside of earth's atmosphere; and using pre-calculated transforms for the predefined pro forma satellite microwave paths including satellite link segments based on points of intersection with at least one stratum, the pre-calculated transforms predefining virtual microwave signal path attributes including satellite microwave path geometry and microwave signal attenuation over the satellite microwave path geometry, and signal attenuations over the satellite microwave path geometry, to project at least one satellite link segment onto at least one projection and to transform the microwave receiver detection datums into attenuation-based geographically localized weather data corresponding to geographical regions of the at least one projection.

13. The method of claim 12 wherein using comprises reusing the pre-calculated transforms to transform sets of microwave receiver detection datums received at different times.

14. The method of claim 12, wherein the at least one satellite link segment has a pro-forma endpoint representing the point of intersection with the at least one stratum.

15. The method of claim 14 wherein the at least one stratum comprises an isotherm and/or the tropopause.

16. The method of claim 12, further including choosing the at least one stratum and an elevation thereof based on at least one of (i) a zero degree Centigrade line and/or (ii) a tropopause boundary and/or (iii) a fixed elevation above ground level and/or (iv) known and/or calculated atmospheric characteristics.

17. The method of claim 12, further including determining microwave path endpoints representing pro forma satellite locations from satellite ephemeris data corresponding to satellite locations at varying points in time.

18. The method of claim 12, further including applying the precalculated transforms to convert the microwave receiver detection datums into one or more weather data elements associated with one or more grid locations on the earth's surface.

19. The method of claim 12 further including pre-calculating the transforms, comprising:

pre-computing a first transform for generating weather data at one or more ground and atmospheric elevations; and pre-computing a second transform for converting the generated weather data to one or more system tiles.

20. The method of claim 12, wherein using comprises applying the precalculated transforms to convert microwave receiver detection datums into tile-based weather data.

21. The method of claim 12, wherein using includes omitting at least one microwave receiver detection datum from being transformed into attenuation-based geographically localized weather data corresponding to geographical regions.

* * * * *